US008593976B2

(12) United States Patent
Kishigami et al.

(10) Patent No.: US 8,593,976 B2
(45) Date of Patent: Nov. 26, 2013

(54) WIRELESS BASE STATION AND TERMINAL EQUIPMENT

(75) Inventors: Takaaki Kishigami, Tokyo (JP); Shutai Okamura, Tokyo (JP); Hidekuni Yomo, Tokyo (JP); Yoshihito Kawai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1523 days.

(21) Appl. No.: 11/814,774

(22) PCT Filed: Jan. 25, 2006

(86) PCT No.: PCT/JP2006/301145
§ 371 (c)(1),
(2), (4) Date: Jul. 25, 2007

(87) PCT Pub. No.: WO2006/080352
PCT Pub. Date: Aug. 3, 2006

(65) Prior Publication Data
US 2009/0016263 A1  Jan. 15, 2009

(30) Foreign Application Priority Data

Jan. 26, 2005 (JP) ................................. 2005-018083
Jan. 18, 2006 (JP) ................................. 2006-010170

(51) Int. Cl.
*G08C 15/00* (2006.01)
(52) U.S. Cl.
USPC ............. 370/252; 370/329; 455/65; 455/450; 375/148
(58) Field of Classification Search
None
See application file for complete search history.

(56) References Cited

U.S. PATENT DOCUMENTS 5,592,490 A  1/1997 Barratt et al.
(Continued)

FOREIGN PATENT DOCUMENTS

JP  2001-268006 A  9/2001
(Continued)

OTHER PUBLICATIONS

Takeo Ohgane et al; "A Study on a Channel Allocation Scheme with an Adaptive Array in SDMA"; IEEE; 1997; pp. 725-729; Hokkaido University, Sapporo, Japan.
Japanese International Search Report; May 16, 2006.

* cited by examiner

*Primary Examiner* — Chi Pham
*Assistant Examiner* — Mohammad Adhami
(74) *Attorney, Agent, or Firm* — Pearne & Gordon LLP

(57) ABSTRACT

It is an object to provide a wireless base station and a terminal equipment capable of shortening the processing time by not requiring the detection of the spatial correlation coefficient, which is required in general technology, and simplifying the selection process for terminal equipments to be connected to each other in a wireless base station that performs spatial multiplexing transmission to a plurality of terminal equipments and a terminal equipment responding for spatial multiplexing transmission.

A terminal equipment 12 includes an interference cancellation capability information data maintaining section 20 that maintains interference cancellation capability information data indicating the interference cancellation capability of the terminal equipment 12 and signals the interference cancellation capability information data to a wireless base station 1. The wireless base station 1 includes a control signal extracting unit 3 and a spatial multiplexing controller 4, and the spatial multiplexing controller 4 selects one or more terminal equipments 12 for spatial multiplexing connection on the basis of the interference cancellation capability information data extracted from a reception signal from the terminal equipment 12.

3 Claims, 26 Drawing Sheets

(56) References Cited

U.S. PATENT DOCUMENTS

| | | | |
|---|---|---|---|
| 7,072,315 B1* | 7/2006 | Liu et al. | 370/329 |
| 7,620,019 B1* | 11/2009 | Smith et al. | 370/334 |
| 2004/0127223 A1* | 7/2004 | Li et al. | 455/446 |
| 2005/0160181 A1* | 7/2005 | Kwon et al. | 709/238 |
| 2006/0046662 A1* | 3/2006 | Moulsley et al. | 455/69 |
| 2009/0274059 A1* | 11/2009 | Xing et al. | 370/252 |
| 2011/0261899 A1* | 10/2011 | Walton et al. | 375/295 |

FOREIGN PATENT DOCUMENTS

| | | |
|---|---|---|
| JP | 2001-274738 A | 10/2001 |
| JP | 2003-23380 | 1/2003 |
| JP | 2004-23716 | 1/2004 |
| JP | 2004-201296 | 7/2004 |
| JP | 2006-501783 A | 1/2006 |
| WO | 2004-042955 A2 | 5/2004 |

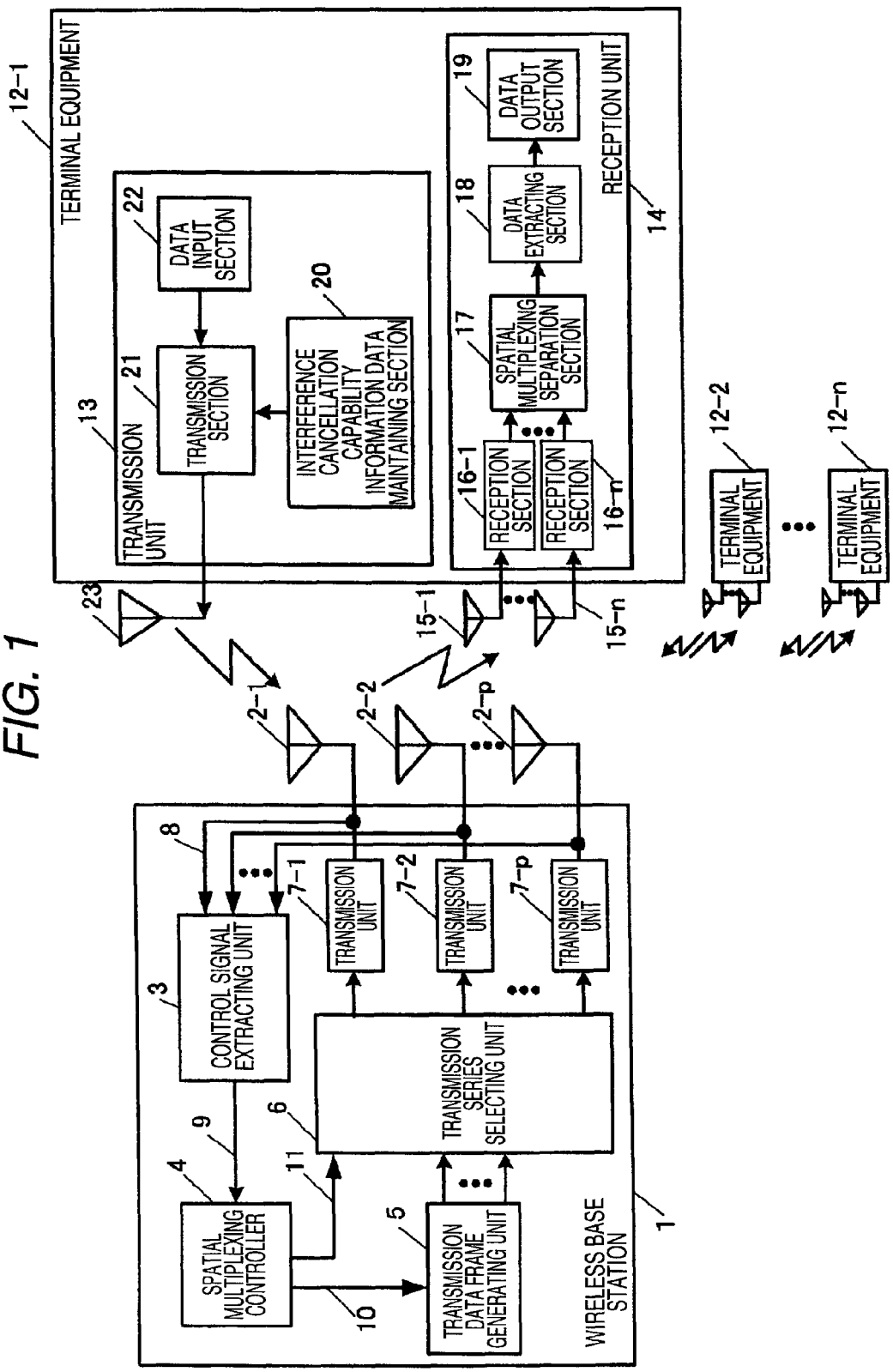

FIG. 3

GROUPING TABLE (300)

| GROUP NUMBER | TERMINAL EQUIPMENT ID |
|---|---|
| 0 | #1、#2 |
| 1 | #3、#4、#5、#6、#7、#8 |
| 2 | #5、#6、#7、#8 |
| 3 | #7、#8 |
| 4 | #8 |

FRAME FORMAT OF TRANSMISSION PACKET

FRAME FORMAT OF RTS

FRAME FORMAT OF CTS

FRAME FORMAT OF ACK

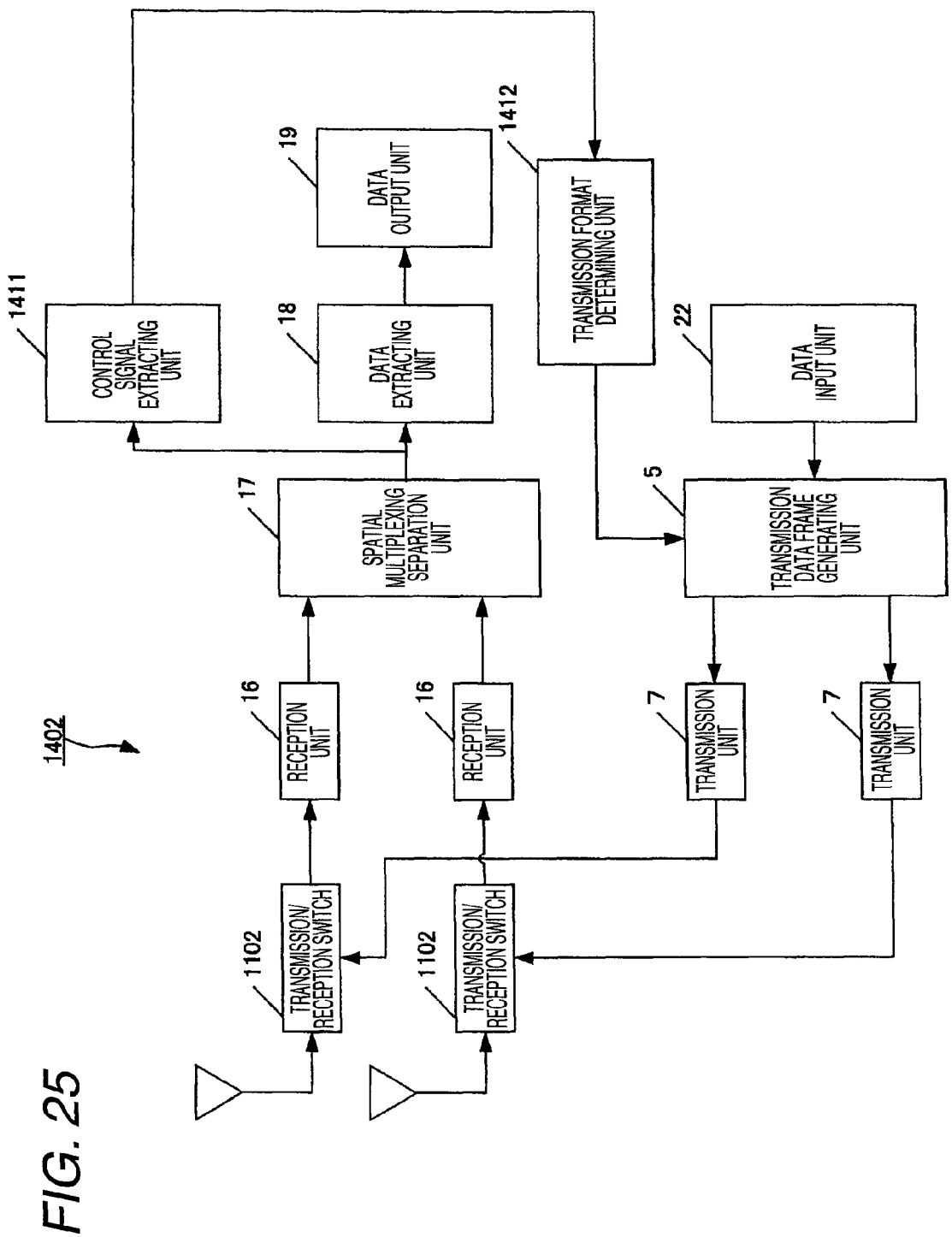

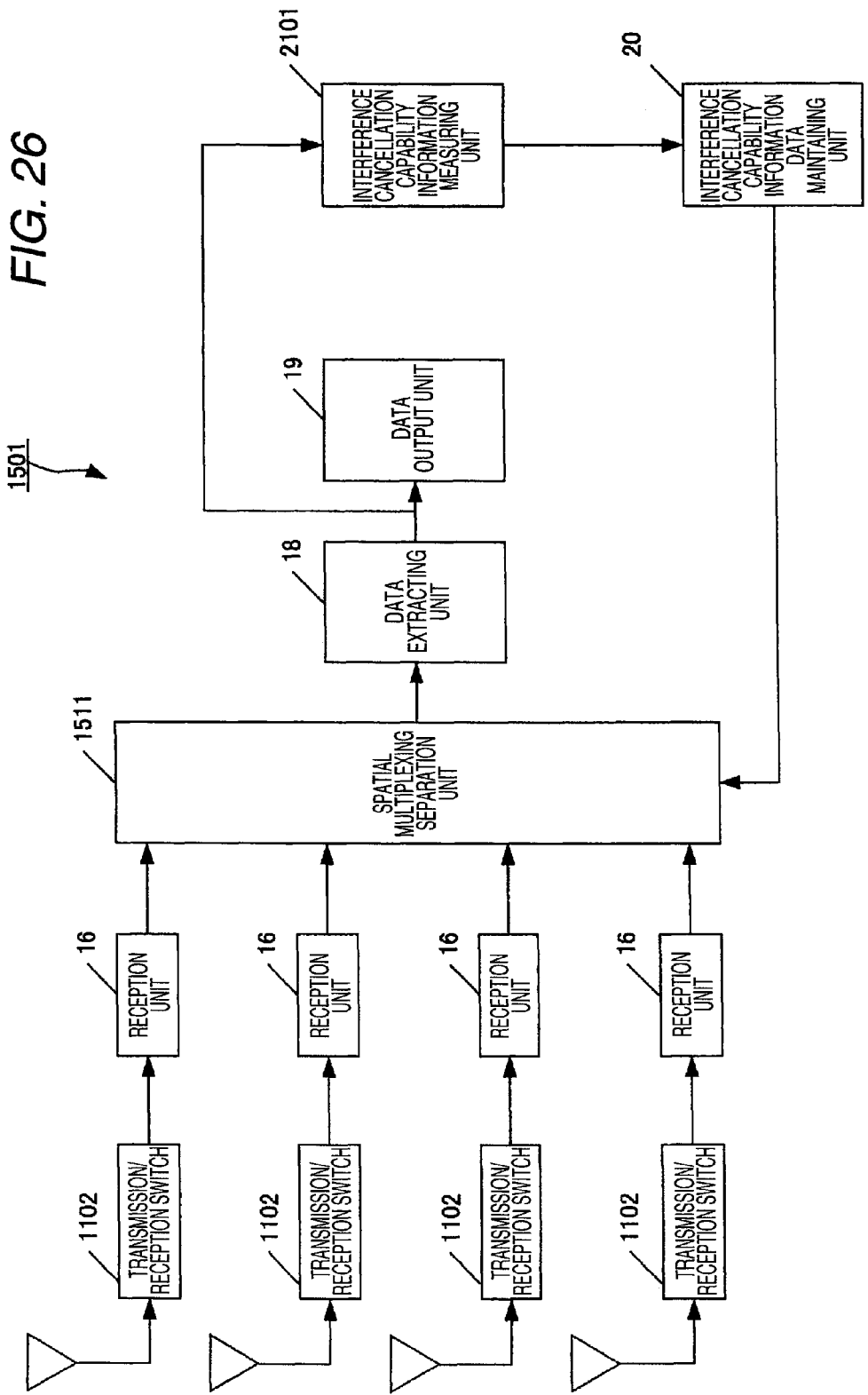

WIRELESS BASE STATION AND TERMINAL
EQUIPMENT

TECHNICAL FIELD

The present invention relates to a wireless base station performing spatial multiplexing and a terminal equipment responding to the spatial multiplexing.

BACKGROUND ART

Recently, the request for implementing high capacity and high speed in wireless communication has been rapidly increased, and thus researches for methods of improving the use efficiency of limited frequency resources have been actively performed. As one of the methods, a method of using a spatial region has attracted attention.

One of the technologies using the spatial region is an adaptive array antenna (adaptive antenna). By using this technology, a desired wave signal is received with a high intensity while suppressing an interference wave signal by adjusting the amplitudes and phases of wave signals using weighting coefficients (hereinafter, referred to as weights) which are multipliers for received signals, whereby the co-channel interference is reduced, and accordingly, the system capacity can be improved.

In addition, a different technology using the spatial region is a spatial multiplexing technology which uses physical channels having the same frequency and the same sign at the same time by using spatial orthogonality in a propagation channel for transmitting different data series to different terminal equipments.

The spatial multiplexing technology is disclosed in Non-Patent Document 1, etc. In a spatial multiplexing wireless base station and a terminal equipment which use this technology, a spatial multiplexing transmission can be performed in a case where a spatial correlation coefficient between terminal equipments is less than a predetermined value, whereby the throughput and the number of simultaneous users of the wireless communication system can be improved.

Non-Patent Document 1: T. Ohgane et al, "A study on a channel allocation sc heme with an adaptive array in SDMA," IEEE 47th VTC, Page. 725-729, vol. 2(1997)

DISCLOSURE IF THE INVENTION

Problem that the Invention is to Solve

However, the above described configuration in which the general spatial multiplexing wireless base station and terminal equipments are used, a control of detecting a spatial correlation coefficient between the terminal equipments in advance and selecting terminal equipments having a spatial correlation coefficient less than a predetermined value as terminal equipments for spatial multiplexing connection is required in the wireless base station for reducing the mutual interference between the terminal equipments.

In addition, since the spatial correlation coefficient varies by time due to a change in propagation environment accompanied by the movement of the terminal equipment or peripheral objects, it is required to detect the spatial correlation coefficient frequently or regularly.

Accordingly, there is a problem of complication in the detection process of the spatial correlation coefficient and the selection process of the terminal equipments for spatial multiplexing connection. In addition, there is a problem that the process delay is lengthened due to the complex process.

The present invention is to solve the above-mentioned problems, and the object of the invention is to provide a wireless base station and a terminal equipment capable of shortening the processing time by not requiring the detection of the spatial correlation coefficient and simplifying the selection process for terminal equipments to be connected to each other.

Means for Solving the Problem

In order to solve the above-mentioned problems, according to an aspect of the present invention, there is provided a terminal equipment which performs communication with a wireless base station controlling other terminal equipments for spatial multiplexing connection by using interference cancellation capability information included in reception signals from the other terminal equipments. The terminal equipment includes an interference cancellation capability information data maintaining unit which maintains interference cancellation capability information data indicating the interference cancellation capabilities of the other terminal equipments and a transmission unit which transmits the interference cancellation capability information data to the wireless base station.

In the terminal equipment since the interference cancellation capability information data which indicates the interference cancellation capability of the terminal equipment can be signaled to the wireless base station, the selection of terminal equipments for spatial multiplexing connection which satisfies a condition that the interference among terminal equipments can be eliminated, for example, on the basis of the grouping information of terminal equipments can be easily performed. Accordingly, the spatial multiplexing transmission with the interference cancellation capability considered can be performed.

According to another aspect of the present invention, there is provided a terminal equipment which performs communication with a wireless base station controlling other terminal equipments for spatial multiplexing connection by using interference cancellation capability information included in reception signals from the other terminal equipments. The terminal equipment includes a spatial multiplexing separation unit which receives a desired signal sent to the terminal equipment by suppressing a spatially multiplexed signal toward the other terminal equipments on the basis of a spatial stream number signaled from the wireless base station and known signals added to each spatial stream that have been transmitted using spatial multiplexing.

In the terminal equipment, the variance in the propagation channel for a desired signal transmitted from the wireless base station and signals for other terminal equipments can be detected, and thus, the desired signal can be received by suppressing interference signals from other terminal equipments which are connected using spatial multiplexing. Therefore, it becomes possible to effectively suppress the interference signals from other terminal equipments.

The terminal equipment may include a spatial multiplexing separation unit which outputs a desired signal by suppressing spatially multiplexed signals sent toward other terminal equipments on the basis of a spatial stream number and modulation format information which are signaled from the wireless base station and known signals added to each spatial stream that are transmitted using spatial multiplexing.

In this case, a desired signal sent to the terminal equipment can be received/output by suppressing interference signals on the basis of a spatial stream number and modulation format information which are signaled from the wireless base station and known signals added to each spatial stream that are transmitted using spatial multiplexing. Accordingly, it becomes possible to effectively suppress the interference signals from other terminal equipments.

According to another aspect of the present invention, there is provided a terminal equipment which performs communication with a wireless base station controlling other terminal equipments for spatial multiplexing connection by using interference cancellation capability information included in reception signals from the other terminal equipments. The terminal equipment includes a separation characteristic detecting unit detecting a separation characteristic among spatial streams which have been sent using spatial multiplexing; and a transmission unit which transmits a request for changing a combination of other terminal equipments required to be connected to the wireless base station using spatial multiplexing in a case where a detected value of a predetermined level is not acquired by the separation characteristic detecting unit.

In the terminal equipment, it can be detected in advance that a sufficient characteristic is not acquired. When a sufficient characteristic is not acquired, the communication quality of terminal equipments in spatial multiplexing transmission can be acquired by requesting the wireless base station for changing a combination of terminal equipments for spatial multiplexing connection and a transmission delay in data transmission can be reduced by decreasing the number of times of repeats. Accordingly, even when terminal equipments having high spatial correlation with one another are selected for terminal equipments for spatial multiplexing connection by the wireless base station, the reception quality in repeat can be improved without increasing the number of times of repeat by requesting the wireless base station for changing a combination of terminal equipments for spatial multiplexing connection, whereby the throughput of the system can be improved.

In the terminal equipment, the separation characteristic detecting unit may detect the separation characteristic on the basis of a channel estimation matrix which is used for separately receiving spatial multiplexing streams.

In addition, in the terminal equipment, the separation characteristic detecting unit may detect the separation characteristic on the basis of the determinant of the channel estimation matrix.

In this case, the separation characteristic detecting unit may compare the reception signal quality in the spatial multiplexing transmission with that in a case where the spatial multiplexing transmission is not performed in which the maximum ratio combining is used and request for changing a combination of terminal equipments for spatial multiplexing connection in a case where the deterioration amount of the reception quality of the desired signal in the spatial multiplexing transmission is larger than a predetermined value.

According to another aspect of the present invention, there is provided a terminal equipment which performs communication with a wireless base station measuring interference cancellation capability on the basis of reception signals from other terminal equipments and controlling other terminal equipments for spatial multiplexing connection. The terminal equipment includes a control signal extracting unit extracting the interference cancellation capability information of the wireless base station which is transmitted from the wireless base station, a transmission format determining unit switching a transmission format on the basis of the interference cancellation capability information acquired by the control signal extracting unit, and a transmission unit transmitting a signal in accordance with the transmission format determined by the transmission format determining unit.

Since the terminal equipment can acquire the interference cancellation capability information of the wireless base station in a situation of communicating with a specific terminal equipment, the terminal equipment in communication can adaptably change the transmission format on the basis of the interference capability information. Accordingly, communication effectively utilizing the spatial interference cancellation capability of the wireless base station can be performed, whereby the increase in data transmission speed or the improvement of the communication quality and the reduction in power consumption of the terminal equipment can be achieved.

In the terminal equipment, the transmission format determined by the transmission format determining unit may include transmission power of the transmission signal and a transmission format which decreases the transmission power in the transmission unit may be used in a case where the interference cancellation capability information is larger than a predetermined value. In this case, the terminal equipment can satisfy the communication quality required, and the power consumption of the terminal equipment can be lowered.

In the terminal equipment, the transmission format determined by the transmission format determining unit may include modulation schemescheme of the transmission signal and a transmission format which increases the modulation schemescheme may be used in a case where the interference cancellation capability information is larger than a predetermined value. In this case, the terminal equipment can suppress the deterioration of the communication quality, whereby the data transmission rate can be increased.

In the terminal equipment, the transmission format determined by the transmission format determining unit may include an encoding rate of the transmission signal and a transmission format which increases the encoding rate may be used in a case where the interference cancellation capability information is larger than a predetermined value. In this case, the terminal equipment can suppress the deterioration of the communication: quality, whereby the data transmission rate can be increased.

In the terminal equipment, the transmission format determined by the transmission format determining unit may include a transmission mode which is determined by a modulation method and an encoding rate of the transmission signal and a transmission format that switches the transmission mode to a transmission mode increasing the transmission speed may be used in a case where the interference cancellation capability information is larger than a predetermined value. In this case, the terminal equipment can suppress the deterioration of the communication quality, whereby the data transmission rate can be increased.

In the terminal equipment, the transmission format determined by the transmission format determining unit may include a guard interval length of an OFDM signal to be transmitted in a case where the signal is transmitted using the OFDM signal and a transmission format which shortens the guard interval may be used in a case where the interference cancellation capability information is larger than a predetermined value. In this case, the terminal equipment can suppress the deterioration of the communication quality due to multi-path interference, whereby the data transmission rate can be increased.

In the terminal equipment, the transmission format determined by the transmission format determining unit may include the number of spatial multiplexing of the transmission signal and a transmission format that switches the transmission mode to a transmission mode increasing the number of the spatial multiplexing may be used in a case where the interference cancellation capability information is larger than a predetermined value. In this case, the terminal equipment can suppress the deterioration of the communication quality, whereby the data transmission rate can be increased.

According to another aspect of the present invention, there is provided a wireless base station including a control signal extracting unit extracting interference cancellation capability information data, indicating interference cancellation capability of a terminal equipment, which is included in a reception signal transmitted from the terminal equipment, and a spatial multiplexing controller selecting one or more terminal equipments for spatial multiplexing connection on the basis of the interference cancellation capability information data.

In the wireless base station, the terminal equipments for spatial connection can be selected on the basis of the interference cancellation capability information data indicating interference cancellation capability for each terminal. Thus, since the detection of the spatial correlation coefficient which is required in a general technology is not required, whereby the selection process of terminal equipments for spatial multiplexing connection can be simplified. In addition, the simplification of the configuration of the wireless base station is achieved. In addition, a wireless base station which has an advantage that a processing time for controlling for spatial multiplexing transmission can be shortened can be provided.

In the wireless base station, the interference cancellation capability information data may be information data indicating the number of interference signals which can be interfered/suppressed by the terminal equipment.

In the wireless base station, the interference cancellation capability information data may be information data indicating the interference suppression ratio which is required for the terminal equipment to extract an arbitrary data signal from spatial multiplexing signals and to identify the data signal.

In the wireless base station, the spatial multiplexing controller may generate grouping information in which terminal equipments are divided into groups having one or more terminal equipments on the basis of the interference cancellation capability information data and select one or more terminal equipments required to be connected to the wireless base station using spatial multiplexing on the basis of the grouping information by using a predetermined selection criterion.

In the wireless base station, the selection of terminal equipments for spatial multiplexing connection which satisfy a condition that the interference among terminal equipments can be eliminated on the basis of the interference cancellation capability information data can be easily performed.

In the wireless base station, the spatial multiplexing controller may generate grouping information in which terminal equipments are divided into groups having one or more terminal equipments on the basis of the interference cancellation capability information data and select one or more second terminal equipments required to be connected to the wireless base station using spatial multiplexing together with the first terminal equipment for preferential connection from a group to which the first terminal equipment belongs by using a predetermined criterion.

In the wireless base station, the spatial multiplexing controller may generate grouping information in which terminal equipments are divided into groups having one or more terminal equipments on the basis of the interference cancellation capability information data and select one or more terminal equipments which are included in a first group and in a second group having interference cancellation capability higher than a first group using a predetermined selection criterion in selecting one or more second terminal equipments for spatial multiplexing connection from the first group to which the first terminal equipment belongs.

In the wireless base station, the spatial multiplexing controller may select one or more terminal equipments for spatial multiplexing connection by using a criterion that the total sum of transmission streams transmitted to all the terminal equipments for spatial multiplexing connection is not greater than the value of the degree of freedom of antennas of a group having a lowest interference cancellation capability in a case where the terminal equipments for spatial multiplexing connection belong to a first group and there are one or more terminal equipments in the first group which also belong to other groups having the interference cancellation capability lower than the first group as the selection criterion.

In the wireless base station, the selection of terminal equipments for spatial multiplexing connection which satisfy a condition that the interference among the terminal equipments for spatial multiplexing can be eliminated using grouping information on the terminal equipments based on the interference cancellation capability information data of the terminal equipments can be performed.

In the wireless base station, the spatial multiplexing controller may generate grouping information in which terminal equipments are divided into groups having one or more terminal equipments on the basis of the interference cancellation capability information data and determine a first terminal equipment to be preferentially connected to the wireless base station and have a spatial expansion detecting unit for detecting the spatial expansion of the first terminal equipment and a function of selecting one between transmission only to the first terminal equipment and spatial multiplexing transmission to the first terminal equipment and one or more terminal equipments on the basis of the information acquired by the spatial expansion detecting unit.

In the wireless base station, the spatial multiplexing controller may select one or more second terminal equipments for spatial multiplexing connection, in addition to a first terminal equipment for preferential connection, in a second group having interference cancellation capability higher than a first group to which the first terminal equipment for preferential connection belongs using a predetermined criterion for performing spatial multiplexing transmission using a combination of terminal equipments other than a combination used for previous spatial multiplexing transmission in a case where a repeat request is made from a terminal equipment for spatial multiplexing connection after the spatial multiplexing transmission is performed on the terminal equipment for spatial multiplexing connection by the wireless base station.

The wireless base station can increase the transmission power allocation to the first terminal equipment for preferential connection using a high reception characteristic of a terminal equipment having high interference cancellation capability by connecting to the terminal equipment having the high interference capability in repeat using spatial multiplexing, whereby the communication quality of the terminal equipment in repeat for preferential connection can be improved.

The wireless base station may be configured to determine to perform transmission only to the terminal equipment for preferential connection without re-performing spatial multiplexing transmission when a repeat request is made from a terminal equipment after the base station performs spatial multiplexing transmission for the terminal equipment for spatial multiplexing connection.

In the wireless base station, the spatial multiplexing controller may be configured to select one or more second terminal equipments for spatial multiplexing connection together with a first terminal equipment for preferential connection from a second group having interference cancellation capability higher than a first group to which the first terminal equipment for preferential connection belongs using a predetermined criterion for performing spatial multiplexing transmission using a combination of terminal equipments other than a combination used for previous spatial multiplexing transmission in a case where a request for changing the combination of the terminal equipments is made from a terminal equipment for spatial multiplexing connection after the spatial multiplexing transmission is performed on the terminal equipment for spatial multiplexing connection by the wireless base station.

In the wireless base station, the spatial multiplexing controller may determine to transmit only to the terminal equipment for preferential connection without re-performing the spatial multiplexing transmission when a request for changing the combination of the terminal equipments for spatial multiplexing connection is made from a terminal equipment for spatial multiplexing connection after spatial multiplexing transmission is performed on the terminal equipment for spatial multiplexing connection by the wireless base station.

In this case, the communication quality of the terminal equipment for preferential connection can be improved in repeat, whereby the transmission delay in data transmission can be reduced.

The wireless base station may further include one or more space-time encoding units for performing space-time encoding process on signals toward the one or more terminal equipments which have been selected by the spatial multiplexing controller.

In this case, the space-time encoding process can be performed on signals toward the one or more terminal equipments selected by the spatial multiplexing controller, whereby a transmission diversity gain is acquired by the space-time encoding process, and the improvement of the reception quality can be achieved, whereby the communication quality between the terminal equipment and the wireless base station can be improved.

In the wireless base station, the space-time encoding units may perform space-time encoding processes on the signals toward the one or more terminal equipments for spatial multiplexing connection.

In the wireless base station, the transmission diversity gain is acquired by the space-time block encoding, and the improvement of the reception quality is achieved, whereby the communication quality between the terminal equipment and the wireless base station can be improved The wireless base station may further include an electric wave incoming direction estimating unit estimating the incoming direction of an electric wave from a terminal equipment and a directivity control unit performing a control process for directional transmission on the basis of information on the incoming directions of electric waves from one or more terminal equipments which are selected by the spatial multiplexing controller.

In this case, the wireless base station can perform a control operation for directional transmission on the basis of information on the incoming directions of electric waves from one or more terminal equipments selected by the spatial multiplexing controller by estimating the incoming directions of the electric waves from the terminal equipments. Accordingly, the directional transmission toward the incoming direction of the electric waves can be performed, and a directional gain is acquired, whereby the communication quality between the terminal equipment and the wireless base station can be improved. Accordingly, the improvement of directional gains toward the one or more terminal equipments for spatial multiplexing connection can be achieved. In addition, depending on the incoming directions of the one or more terminal equipments for spatial multiplexing connection, the mutual interference may be decreased, whereby the reception quality can be improved further.

According to another aspect of the present invention, there is provided a wireless base station which performs spatial multiplexing transmissions for a plurality of terminal equipments for spatial multiplexing connection. The wireless base station includes a spatial multiplexing controller which performs spatial multiplexing transmission using a combination of terminal equipments other than a combination used for the previous spatial multiplexing transmission in a case where there are repeat requests of a predetermined number of times or more times from a terminal equipment which has received a signal transmitted using spatial multiplexing.

In the wireless base station, it becomes possible to statistically reduce the mutual inference among terminal equipments by performing spatial multiplexing using a changed combination of terminal equipments in a case where there have been repeat requests of a predetermined number of times or more times from a terminal equipment that has received a spatially multiplexed signal. Accordingly, the communication quality such as reception quality in re-transmission using spatial multiplexing transmission can be improved, whereby the transmission delay in data transmission can be reduced.

According to another aspect of the present invention, there is provided a wireless base station which performs spatial multiplexing transmissions for a plurality of terminal equipments for spatial multiplexing connection. The wireless base station includes a spatial multiplexing controller which performs transmission only to a terminal equipment for preferential connection without re-performing the spatial multiplexing transmission in a case where there are repeat requests of a predetermined number of times or more times from a terminal equipment that has received a signal transmitted using the spatial multiplexing.

In wireless base station, the signal transmission is performed only using the terminal equipment for preferential connection without performing spatial multiplexing in a case where there have been repeat requests of a predetermined number of times or more times from a terminal equipment that has received a spatially multiplexed signal. Accordingly, the co-channel interference can be reduced, and communication quality such as reception quality of the terminal equipment for preferential connection in re-transmission can be improved, whereby the transmission delay in data transmission can be reduced.

According to another aspect of the present invention, there is provided a wireless base station which performs spatial multiplexing transmissions for a plurality of terminal equipments for spatial multiplexing connection. The wireless base station includes a spatial multiplexing controller which performs the spatial multiplexing using a combination of terminal equipments other than a combination used for the previous spatial multiplexing transmission in a case where there a request for changing the combination of the terminal equipments for spatial multiplexing connection from a terminal equipment that has received a signal transmitted using the spatial multiplexing.

In the wireless base station, it becomes possible to statistically reduce the mutual inference among terminal equipments by performing spatial multiplexing using a changed combination of terminal equipments in a case where there is a signaling for requesting to change the combination of the terminal equipments for spatial multiplexing connection from a terminal equipment that has received a spatially multiplexed signal. Accordingly, the communication quality such as reception quality in re-transmission using spatial multiplexing transmission can be improved, whereby the transmission delay in data transmission can be reduced.

According to another aspect of the present invention, there is provided a wireless base station which performs spatial multiplexing transmissions for a plurality of terminal equipments for spatial multiplexing connection. The wireless base station includes a spatial multiplexing controller which performs transmission only to a terminal equipment for preferential connection without re-performing the spatial multiplexing transmission in a case where there is a request for changing a combination of terminal equipments for spatial multiplexing connection from a terminal equipment that has received a signal transmitted using the spatial multiplexing.

In the wireless base station, it becomes possible to reduce the co-channel interference by not re-performing spatial multiplexing transmission in a case where there is a request for changing the combination of the terminal equipments for spatial multiplexing connection from a terminal equipment that has received a spatially multiplexed signal. Accordingly, the communication quality of the terminal equipment for preferential connection in re-transmission can be improved, whereby the transmission delay in data transmission can be reduced. Thus, even when terminal equipments having high spatial correlation with one another are selected for terminal equipments for spatial multiplexing connection by the wireless base station, the reception quality in retransmission can be improved without increasing the number of times of: retransmission by not performing the spatial multiplexing transmission for a plurality of terminal equipments for spatial multiplexing connection and performing signal transmission only to the terminal equipment for preferential connection, whereby the throughput of the system can be improved.

According to another aspect of the present invention, there is provided a wireless base station including an interference cancellation capability measuring unit which measures interference cancellation capability on the basis of a signal received from a terminal equipment, an interference cancellation capability information data maintaining unit which maintains the interference cancellation capability information measured by the interference cancellation capability measuring unit, and a transmission data frame generating unit which generates a transmission data frame on the basis of the information from the interference cancellation capability information data maintaining unit.

Since the wireless base station terminal equipment can measure interference cancellation capability information during communication with a specific terminal equipment and generates a transmission data frame on the basis of the interference cancellation capability information, and accordingly, accesses from other terminal equipments other than the terminal equipment in communication can be made, whereby the system capacity can be increased.

In the wireless base station, the transmission data frame generating unit may generate a transmission data frame which includes in a signal section transmission prohibition signaling information for terminal equipments in the communication area of the wireless base station in a case where the interference cancellation capability information is smaller than a predetermined value on the basis of the interference cancellation capability information.

In this case, the wireless base station can generate a transmission data frame prohibiting access from terminal equipments other than the terminal equipments currently in communication with the wireless base station by determining that there is not any remaining capacity in the interference cancellation capability in a situation that the wireless base station communicates with specific terminal equipments, and the access from terminal equipments exceeding the spatial interference cancellation capability of the wireless base station disappears, whereby the deterioration of the communication quality can be suppressed.

In the wireless base station, the transmission data frame generating unit may generate a transmission data frame which includes notification information for providing a change for transmission for terminal equipments in the communication area of the wireless base station in a signal section in a case where the interference cancellation capability information is equal to or larger than a predetermined value on the basis of the interference cancellation capability information.

In this case, the wireless base station can generate a transmission data frame permitting access from terminal equipments other than the terminal equipments currently in communication with the wireless base station by determining that there is remaining capacity in the interference cancellation capability in a situation that the wireless base station communicates with specific terminal equipments, and the communication with other terminal equipments other than the terminal equipments currently in communication can be performed using the spatial interference cancellation capability of the wireless base station, whereby the capacity of the system can be increased.

In the wireless base station, the transmission data frame generating unit may generate a data frame of a CTS (Clear To Send) signal in which the value of NAV (Network Allocation Vector) is set to zero or a time length of a preamble section period included in a transmission packet on the basis of the interference cancellation capability information when the interference cancellation capability information is larger than a predetermined value.

In the wireless base station, the transmission data frame generating unit may generate a data frame of an ACK signal in which the value of NAV is set to zero or a time length of a preamble section period included in a transmission packet on the basis of the interference cancellation capability information when the interference cancellation capability information is larger than a predetermined value.

In the wireless base station, the transmission data frame generating unit may generate a transmission data frame which includes the interference cancellation capability information in a signal section.

Since the wireless base station can signal to terminal equipments whether there is any remaining capacity in the interference cancellation capability of the wireless base station in a status that the wireless base station communicates with specific terminal equipments, the terminal equipments currently in communication with the wireless base station can adaptively change the transmission format in accordance with the signaling. Accordingly, communication utilizing the spatial interference cancellation capability of the wireless base station can be performed, whereby the power consumption of the terminal equipments is reduced by increasing the data transmission speed or reducing the transmission power.

According to another aspect of the present invention, there is provided a wireless base station including an interference cancellation capability measuring unit which measures interference cancellation capability on the basis of a signal received from a terminal equipment, an interference cancellation capability information data maintaining unit which maintains the interference cancellation capability information measured by the interference cancellation capability measuring unit, and a spatial multiplexing separation unit which separately receives a signal transmitted using spatial multiplexing, wherein the spatial multiplexing separation unit changes a separation method for a spatially multiplexed signal on the basis of the information from the interference cancellation capability information data maintaining unit.

The wireless base station can change the separation method of spatial multiplexing signals on the basis of the interference cancellation capability information, and accordingly, the access control with the reception characteristic, calculation amounts, the number of multiple access terminal considered can be performed.

In the wireless base station, the spatial multiplexing separation unit may be configured to change the separation method of spatial multiplexing signals to a separation method requiring less calculation amount when the interference cancellation capability information is larger than a predetermined value.

In this case, the spatial multiplexing separation unit may be configured to use a ZF (Zero Forcing) technique or an MMSE (Minimum Mean Square Error) technique as the separation method of spatial multiplexing signals in a case where the interference cancellation capability information is larger than a predetermined value and to use an MLD technique in a case where the interference cancellation capability information is smaller than a predetermined value.

ADVANTAGE OF THE INVENTION

According to an embodiment of the present invention, since the detection of the spatial correlation coefficient which is required in general technology is not required, whereby the selection process of terminal equipments for spatial multiplexing connection can be simplified, and accordingly, it becomes possible to provide a wireless base station and a terminal equipment capable of shortening the processing time.

In addition, according to an embodiment of the present invention, there can be provided a wireless base station and a terminal equipment capable of increasing the system capacity by allowing accesses from terminal equipments other than a terminal equipment in communication on the basis of the interference cancellation capability of the wireless base station in a status that the wireless base station communicates with a specific terminal.

BRIEF DESCRIPTION OF THE DRAWINGS

FIG. 1 is a diagram showing configurations of a wireless base station and a terminal equipment according to Embodiment 1 of the present invention.

FIG. 3 is a diagram showing a configuration of a grouping table 300 according to Embodiment 1 of the present invention.

FIG. 25 is a diagram showing a configuration of a terminal equipment according to modified examples of Embodiment 6.

FIG. 26 is a diagram showing a configuration of a wireless base station according to Embodiment 7 of the present invention.

Figure 2A:
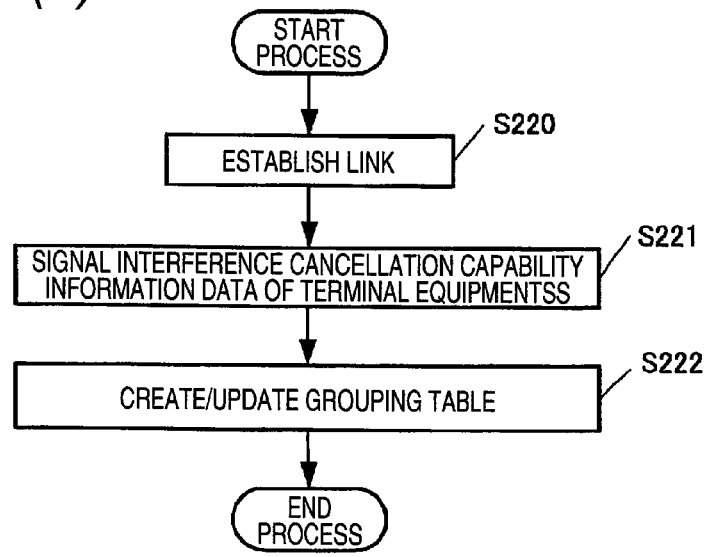
FIG. 2(a) is a flowchart showing an operation of an initial setting process of the wireless base station and the terminal equipment according to Embodiment 1 of the present invention.

DESCRIPTION OF REFERENCE NUMERALS AND SIGNS 1, 70, 90, 100, 120, 1001, 1301, 1401, 1501: WIRELESS BASE STATION
2-1~2-n: WIRELESS BASE STATION ANTENNA
3: CONTROL SIGNAL EXTRACTING UNIT
4: SPATIAL MULTIPLEXING CONTROLLER
5: TRANSMISSION DATA FRAME GENERATING UNIT
6: TRANSMISSION SERIES SELECTING UNIT
12-1~12-n, 1002, 1003, 1402: TERMINAL EQUIPMENTS
13, 96, 106: TRANSMISSION UNIT
14, 92, 102: RECEPTION UNIT
15-1~15-n: RECEPTION UNIT ANTENNAS
16-1~16-n: RECEPTION SECTIONS
17, 1511: SPATIAL MULTIPLEXING SEPARATION SECTION
18: DATA EXTRACTING SECTION
20: INTERFERENCE CANCELLATION CAPABILITY INFORMATION DATA MAINTAINING SECTION
21: TRANSMISSION SECTION
71: ELECTRIC WAVE INCOMING DIRECTION ESTIMATING UNIT
72: DIRECTIVITY CONTROL UNIT
94: SEPARATION CHARACTERISTIC DETECTING SECTION
104: SPATIAL EXPANSION DETECTING SECTION
121: SPACE-TIME BLOCK ENCODING UNIT
1304: REPLICA SIGNAL GENERATING SECTION
1305: RECEPTION BEAM FORMING SECTION
1411: CONTROL SIGNAL EXTRACTING UNIT
1412: TRANSMISSION FORMAT DETERMINING UNIT
2101: INTERFERENCE CANCELLATION CAPABILITY INFORMATION MEASURING UNIT

BEST MODE FOR CARRYING OUT THE INVENTION

Hereinafter, the embodiments of the present invention will be described with reference to the accompanying drawings.

Embodiment 1

FIG. 1 is a diagram showing configurations of a wireless base station and a terminal equipment according to Embodiment 1 of the present invention.

Hereinafter, a communication method using spatial multiplexing in the transmission from the wireless base station to the terminal equipment (hereinafter, referred to as downlink) according to Embodiment 1 will be described.

The wireless base station 1 shown in FIG. 1 includes a plurality of wireless base station antennas 2, a control signal extracting unit 3, a spatial multiplexing controller 4, a transmission data frame generating unit 5, a transmission series selecting unit 6, and a plurality of transmission units 7.

A reception unit 14 of the terminal equipment 12 includes one or more reception unit antennas 15, one or more reception sections 16, a spatial multiplexing separation section 17, a data extracting section 18, and a data output section 19. A transmission unit 13 of the terminal equipment 12 includes transmission unit antennas 23, an interference cancellation capability information data maintaining section 20, a transmission section 21, and a data input section 22.

Here, for constituent sections, units, or devices which have a plurality of the same constituent elements, the same numbers are used for description in a case where a specific constituent section, unit, or device is not required to be identified. When description is difficult to be understood without attaching numbers to each constituent section, unit, or device, a hyphen is attached to a first number, and then a second number is attached thereto.

For example, when a specific constituent section, unit, or device is not required to be identified, they will be referred to as reception sections 16, reception units 13, or devices 12, and when description is difficult to be understood without attaching numbers to each constituent section, unit, or device, they will be referred to as reception units 16-1 to 16-n, reception unit antennas 15-1 to 15-n, or terminal equipments 12-1 to 12-n.

Although the wireless base station 1 according to Embodiment 1 is not shown in FIG. 1, the wireless base station includes a decoding unit performing error-correction encoding on transmission data series, an interleaving unit performing interleaving on the transmission data series, and a modulation unit generating modulation symbol data of a base band obtained by performing a modulation process using a predetermined modulation method on the transmission data series.

At first, in the transmission unit 13 of the terminal equipment 12, interference cancellation capability information data which is maintained in the interference cancellation capability information data maintaining section 20 is added to a control channel signal or a signaling channel signal together with a unique identification umber (hereinafter, referred to as an ID number) assigned for identifying a terminal equipment in advance in the transmission section 21, is guided to the transmission antenna 23, and is radiated from the transmission unit antenna 23 to a propagation channel (not shown).

Here, the control channel or the signaling channel is a communication channel for exchanging information for effectively operating the wireless base station 1 and the terminal equipment 12 and means a communication channel different from a communication channel through which information to be sent/received by a user using the terminal equipment 12 is exchanged.

The information to be sent by the user using the terminal equipment 12 is output from the data input section 22, passes through the transmission section 21, and is sent to the wireless base station 1 via the transmission unit antenna 23.

Next, the control signal extracting unit 3 of the wireless base station 1 extracts interference cancellation capability information data and the ID number information 9 assigned to each of the terminal equipments 12 from the control channel signal or the signaling channel signal 8 which is sent from a plurality of terminal equipments 12 toward the base station antennas 2 and outputs the interference cancellation capability information data and the ID number information to the spatial multiplexing controller 4.

The spatial multiplexing controller 4 creates grouping information that divides one or more terminal equipments into groups on the basis of the interference cancellation capability information data. FIG. 3 is a grouping table 300 showing an example of the grouping information.

Thereafter, the spatial multiplexing controller 4 respectively outputs a transmission data frame generating unit control signal 10 and a transmission series selecting unit control signal 11 to the transmission data frame generating unit 5 and the transmission series selecting unit 6 in a predetermined order for spatial multiplexing transmission.

The transmission data frame generating unit 5 generates transmission data frame series, the number of which corresponds to the number of spatial multiplexing in accordance with the transmission data frame generating unit control signal 10 and outputs the generated transmission data frame series to the transmission series selecting unit 6. Here, the transmission data frame series is transmission data series divided into a predetermined number of bits to which known pilot signal series (hereinafter, referred to as a spatial stream pilot signal) are added.

The transmission series selecting unit 6 selectively inputs the received transmission data frame series to the transmission units 7 on the basis of the transmission series selecting unit control signal 11.

The transmission units 7 convert the input transmission data frame series into high frequency signals of a carrier frequency band and outputs the high frequency signals to the wireless base station antennas 2. The input high frequency signals are radiated from the wireless base station antennas 2.

The reception sections 16 respectively convert the high frequency signals received by the reception unit antennas 15 into digital base band signals (hereinafter, referred to as complex digital base band signals) each of which includes orthogonal detected I and Q signals after analog/digital conversion, and outputs the digital base band signals to the spatial multiplexing separation section 17.

The spatial multiplexing separation section 17 suppresses spatial multiplexing signals sent to other terminal equipments 12, that is, removes/suppresses interference signals from the input one or more complex digital base band signals, whereby a desired signal is output.

The data extracting section 18 restores the desired signal to a reception data series by performing a demodulation process and a decoding process. The restored reception data series is output to another device through the data output section 19 or the information is sent to a user using the terminal equipment.

Here, although the transmission unit antennas 23 and the reception unit antennas 15 are regarded as different antennas, the same antennas may be commonly used.

FIG. 2(*a*) is a flowchart showing an operation of an initial setting process of the wireless base station 1 and the terminal equipment 12. FIG. 2(*b*) is a flow chart showing an operation of spatial multiplexing transmission of the wireless base station 1 and the terminal equipment 12 in a downlink. Hereinafter, the detailed operations of the wireless base station 1 and the terminal equipment 12 according to Embodiment 1 will be described with reference to FIGS. 1 to 3.

At first, the operation of the initial setting process of the wireless base station 1 and the terminal equipment 12 shown in FIG. 2(*a*) will be described. After a link between the wireless base station 1 and the terminal equipment 12 is set (step S220), information data indicating the degree of freedom of antenna indicating the number of interference signals which can be interfered/suppressed by the terminal equipment 12 is signaled to the wireless base station 1 through the control channel or the signaling channel as the interference cancellation capability information data that is maintained by the terminal equipment 12 (step S221).

Then, the wireless base station 1 extracts the interference cancellation capability information data of the terminal equipment 12 and the ID number information assigned to the terminal equipment 12 from the signal received from the terminal equipment 12, that is, the control channel signal or the signaling channel signal by using the control signal extracting unit 3.

The spatial multiplexing controller 4 performs grouping on the basis of the interference cancellation capability information data that is maintained by a plurality of the terminal equipments 12 existing in a communication area (not shown) and maintains the information as a grouping table 300 (step S222).

FIG. 3 is an example of the grouping table 300 in a case where eight terminal equipments 12 exist in the communication area of the wireless base station 1. It is assumed that numbers #1 to #8 are respectively assigned to the terminal equipments 12 existing in the communication area as the ID numbers.

In the grouping table 300, a group number column in the left side represents the interference cancellation capability information data that is maintained by each terminal equipment 12, that is, the degree of freedom of antenna, here. In FIG. 3, the maximum value of the degree of freedom is set to "4." The degree of freedom of antenna is a value resulting from subtracting one from the number of antennas of the reception unit of the terminal equipment 12.

In a column of the terminal equipment ID in the right lower end of the terminal equipment ID of the table, the ID number of the terminal equipment 12 that maintains interference cancellation capability information data, that is, the degree of freedom of antenna, equal to or greater than each group number is registered. For example, since the terminal equipment 12 having ID number #8 transmits the information of the degree of freedom=4 toward the wireless base station 1, the terminal equipment is registered in the whole groups of group numbers 1 to 4. When the degree of freedom of the terminal equipment is not zero, the terminal is configured to be registered in a group corresponding to the degree of freedom among groups having a group number one or more.

When the maximum number of spatial multiplexing that can be used for the spatial multiplexing transmission performed by the wireless base station 1 is set to Nmax, the maximum value of the group numbers becomes Nmax−1. In FIG. 3, a case where the maximum number of spatial multiplexing that can be used for the spatial multiplexing transmission is "5" is shown.

When the terminal equipment 12 moves out of the communication area of the wireless base station 1, the operation of removing the ID number of the terminal equipment 12 from the grouping table 300 is performed. When a new terminal equipment 12 moves in the communication area of the wireless base station 1, the operation of newly adding the ID number of the new terminal equipment 12 to the grouping table 300 is performed.

Accordingly, when there is not increase or decrease of the terminal equipment 12 in the communication area, the update of the grouping table 300 is not needed.

This operation is repeated each predetermined interval or intermittently, but the operation may be performed continuously.

The operation described above is the initial operation in a case where a terminal equipment 12 is newly registered in the communication area.

After this initial operation, an arbitrary number of the terminal equipments 12 are selected in a population of terminal equipment groups belonging to each group number of the grouping table 300 in performing the spatial multiplexing transmission.

Next, the operation of the spatial multiplexing transmission process of the wireless base station 1 and the terminal equipments 12 in a downlink will be described with reference to FIG. 2(b). At first, a terminal equipment 12 for preferential connection in the downlink is determined by a predetermined packet scheduling for a plurality of the terminal equipments 12 (step S223).

As an example, it is assumed that the k-th terminal equipment, that is, a terminal equipment 12 having a terminal ID=#k is determined to be the terminal equipment 12 for preferential connection. As a method of the scheduling, a Maximum CIR method or a Proportional Fairness method which is a packet scheduling method on the basis of reception quality of the terminal equipment 12 is disclosed in a document of A. Jalali et al, "Data Throughput of CDMA-HDR a High Efficiency High Data Rate Personal Communication Wireless System," IEEE VTC2000 Spring, pp. 1854-1858.

The above-described technology can be applied to Embodiment 1 of the present invention without changing any aspect of the invention, and here, the above-described technology is used. The detailed description about the packet scheduling is omitted.

As the reception quality of the terminal equipment 12 which is used in the step S223 of determining a terminal equipment 12 for preferential connection, for example, a signal to interference ratio (hereinafter, referred to as SIR), a carrier to interference electric power ratio (hereinafter, referred to as CIR), a signal to noise ratio (hereinafter, referred to as SNR), a desired-component to undesired-component electric power ratio (hereinafter, referred to as DUR), or the like may be used.

In this case, it is assumed that corresponding reception quality information is signaled to the wireless base station 1 through a control channel or a signaling channel for each terminal equipment in advance.

Next, one or more second terminal equipments 12 to be connected to the wireless base station 1 using the spatial multiplexing, along with the first terminal equipment 12 to be preferentially connected to the wireless base station 1, is selected by using a predetermined selection criterion on the basis of the grouping table 300 (step S224).

As the selection criterion, Nu terminal equipments 12 are set to be selected from a same group number C(k). The following two selection criteria may be used on the basis of the relationship among the total number of spatial streams Nt, the number of terminal equipments Nu to be simultaneously connected to the wireless base station using spatial multiplexing, and the maximum number Nmax of spatial multiplexing of the wireless base station 1 in performing the spatial multiplexing transmission.

The case where a k-th terminal equipment, that is, a terminal equipment 12 of which terminal ID=#k belongs to a group number C(k) will be described.

(Selection Criterion 1)

As a terminal equipment 12 to be connected to using the spatial multiplexing, Nu second terminal equipments 12 are selected from a group of group number C(k) which is the same as the group number of the group including the first terminal equipment 12 for preferential connection. Nu is set to satisfy a condition of Nu☐C(k), and the total number Nt of all the spatial streams is set to be equal to the number Nu of terminal equipments to be simultaneously connected to using the spatial multiplexing. However, when C(k)=0, the spatial multiplexing connection is not performed.

As an example, in the grouping table 300 shown in FIG. 3, a case where the terminal ID of the first terminal equipment 12 for preferential connection is #7 is considered. In this case, the terminal equipment 12 having the terminal ID #7 is registered in three groups of the group numbers C(k)=1, C(k)=2, or C(k)=3. One of the three group numbers is selected, and Nu second terminal equipments 12 are selected from a group of the selected group number such that the number of selected terminal equipments is equal to or less than the value of the selected group number C(k). One spatial stream is assigned to each of the selected second terminal equipments 12 or the first terminal equipment 12 for preferential connection.

(Selection Criterion 2)

As a terminal equipment 12 to be connected to using the spatial multiplexing, Nu second terminal equipments 12 are selected from a group of group number C(k) which is the same as the group number of the group including the first terminal equipment 12 for preferential connection. When Nu<C(k), a plurality of spatial streams are set to be assigned to the selected terminal equipments 12 or the first terminal equipment 12 for preferential connection. In addition, when the total number of the spatial streams for all the terminal equipments 12 to be connected to by using the spatial multiplexing is set to Nt, Nt is set to satisfy the condition of Nt☐C(k). When C(k)=0, the spatial multiplexing connection is not performed.

As an example, in the grouping table 300 shown in FIG. 3, a case where the terminal ID of the first terminal equipment 12 for preferential connection is #7 and a second terminal equipment 12 to be connected to by using the spatial multiplexing is selected from a group of group number C(k)=3 is considered. In this case, the second terminal equipment 12 which can be selected is the terminal equipment 12 of terminal ID #8.

Accordingly, when one spatial stream is assigned to each of the second terminal equipment 12 to be selected and the first terminal equipment 12 for preferential connection, two spatial streams resulting from the equation C(k)−Nu=3−1=2 are not to be used.

Therefore, a plurality of spatial streams are assigned to the first terminal equipment 12 for preferential connection or the selected second terminal equipment 12. As an assigning method, the spatial streams may be assigned such that the increment of the spatial stream of each of the terminal equipments 12 of terminal IDs #7 and #8 becomes symmetrical or non-symmetrical within a range satisfying conditions that Nt☐C(k) and the total number of the spatial streams assigned to the terminal equipments 12 is not more than the group number C(k)+1.

As a method of selecting the Nu second terminal equipments 12 from a group of a same group number C(k), any technique among Technique 1 to Technique 3 described below may be applied.

(Technique 1)

A terminal equipment 12 having a high reception SIR is preferentially selected among the terminal equipments 12.

(Technique 2)

One or more terminal equipments 12 which are included in a first group to which the first terminal equipment 12 to be preferentially connected to the wireless base station 1 belongs and are included in a second group having interference cancellation capability of the terminal equipments 12 higher than that of the first group are preferentially selected. In other words, terminal equipments 12 having high interference cancellation capabilities are preferentially selected.
(Technique 3)

The terminal equipments 12 which are included in a first group to which the first terminal equipment 12 to be preferentially connected to the wireless base station 1 belongs and are not included in a second group having interference cancellation capability of the terminal equipments 12 higher than that of the first group are preferentially selected. In other words, terminal equipments 12 having low interference cancellation capabilities are preferentially selected.

As an example, in the grouping table 300 shown in FIG. 3, a case where the terminal ID of the first terminal equipment 12 for preferential connection is #7 and the group number C(k)=2 is considered. The terminal equipments 12 having terminal IDs #7 and #8 are also registered in a group having group number C(k)=3. The terminal equipments 12 having terminal IDs #5 and #6 are not registered in a group having group number C(k)=3.

Accordingly, when the above-described technique (Technique 2) is applied, the terminal equipments 12 of terminal IDs #7 and #8 become targets for preferential connection. On the other hand, when the above-described technique (Technique 3) is applied, the terminal equipments 12 of terminal IDs #5 and #6 become preferential selection target.

By applying the above-described Technique 1 or Technique 2, the chance for spatial multiplexing connection is increased and the improvement of the communication quality is precipitated, whereby it becomes possible to increase the throughput of the whole system.

By applying the above-described Technique 3, the chances for communication between each terminal equipment 12 and the wireless base station 1 in the signal transmission between the wireless base station 1 and a plurality of terminal equipments 12 can approach equally.

By selecting one or more terminal equipments 12 to be connected to by using the spatial multiplexing from a group of a predetermined group number C(k), a complex configuration of an algorithm or conditions for the terminal equipments 12 is not required. Accordingly, it can be easily predictable that the configuration of a program for selecting terminal equipments for spatial multiplexing connection can be simplified, whereby an advantage of reducing the processing time is acquired. Thus, an advantage that the throughput of the whole system is improved is also acquired.

Although a case where the terminal equipments 12 to be connected to by using spatial multiplexing are selected from a group of the same group number C(k) is described above, the terminal equipments 12 to be connected to by using spatial multiplexing may be selected from a group other than the group of group number C(k) In this case, the terminal equipments 12 to be connected to by using spatial multiplexing are selected from a group having a higher group number.

Accordingly, the phenomenon that terminal equipments 12 under a specific condition becomes to have more chances to preferentially connect to the wireless base station 1 can be suppressed, and thus it becomes possible to increase the chances of terminal equipments 12 under other conditions for connecting to the wireless base station 1.

As a result, an advantage that the chances of the connection between terminal equipments 12 under each condition and the wireless base station 1 are equalized. In addition, there is an advantage that complaints such as "the connection is bad" can be decreased and the satisfaction or credit of the user can be acquired.

Generally, there is a tradeoff relationship between the number of spatial multiplexing connections and the reception quality in which the reception quality is deteriorated as the number of spatial multiplexing connections, that is, the transmission rate, increases. Accordingly, it is preferable that one process of the following Process 1 and Process 2 or a combined process of Process 1 and Process 2 is performed in consideration with the tradeoff relationship.
(Process 1)

The number of terminal equipments 12 for spatial multiplexing connection is increased or decreased on the basis of the amount of transmission data of the terminal equipment 12 for preferential connection. In other words, the number of terminal equipments 12 for spatial multiplexing connection is increased as the amount of transmission data of the terminal equipment 12 for preferential connection decreases. Accordingly, the ratio of overheads such as control information or a pilot signal in the spatial stream on the basis of the whole spatial streams can be decreased. In addition, by setting a low-modulation high-encoding ratio having a higher error resistance for transmission with consideration of the resultant decrease in the overhead ratio, the transmission quality can be improved.
(Process 2)

The number of terminal equipments 12 for spatial multiplexing connection is increased or decreased on the basis of the desired request rate of the terminal equipment 12 for preferential connection. In other words, the number of terminal equipments 12 for spatial multiplexing connection is increased as the desired rate of the terminal equipment 12 for preferential connection decreases. Accordingly, since the request rate is decreased, low-modulation multi-level high encoding rate which has higher error resistance can be set, whereby the transmission quality can be improved.

Next, a signaling for performing data transmission and a signaling for spatial stream numbers 1 to n including data to be sent to the terminal equipments 12-1 to 12-n, that is, the number information of transmission antennas from which data to be sent to the terminal equipments 12-1 to 12-n is radiated among wireless base station antennas 2-1 to 2-n are given to the terminal equipments 12-1 to 12-n for spatial multiplexing connection (Step S225).

The signalings are sent through a control channel or a signaling channel of the down link, which is commonly used, other than the spatial multiplexing transmission.

After the signaling for performing data transmission is made (step S225), the wireless base station 1 performs data transmission on the terminal equipments 12-1 to 12-n for spatial multiplexing connection (step S226). For the data transmission, the transmission data frame generating unit 5 generates transmission data frame series to which pilot signal series known in advance have been added on the basis of the spatial stream number.

Figure 4A:
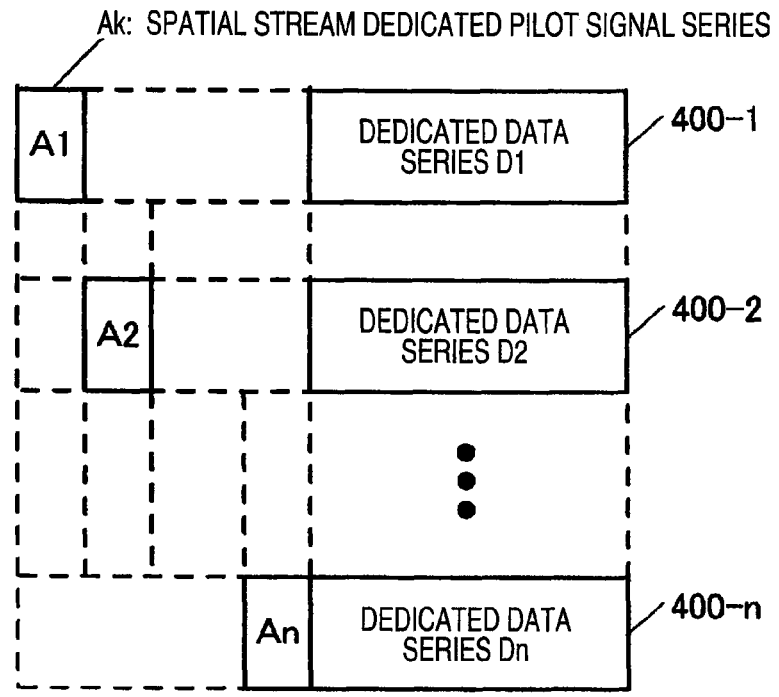
FIG. 4(a) is a diagram showing a configuration of time-division dedicated pilot signal added transmission data frame series according to Embodiment 1 of the present invention.
Figure 4B:
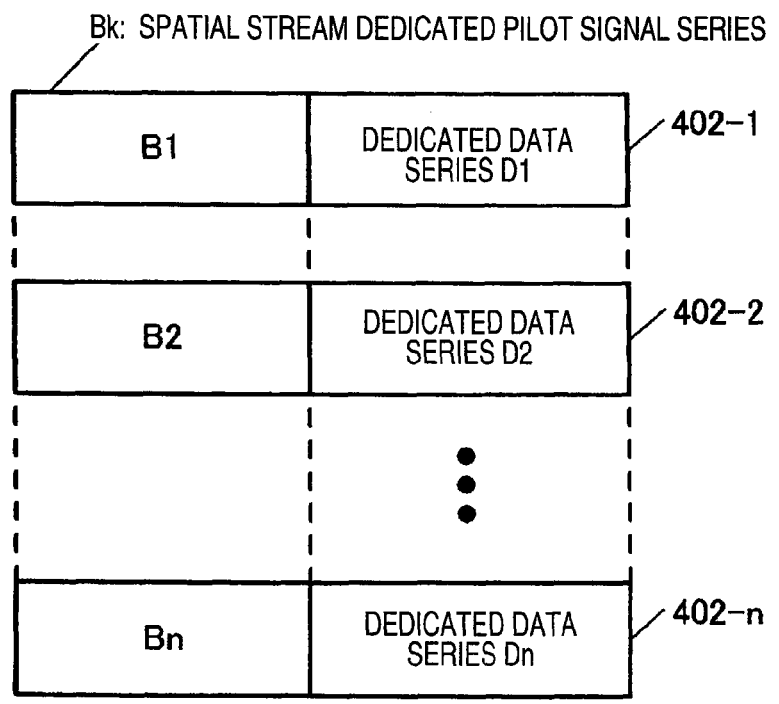
FIG. 4(b) is a diagram showing a configuration of code-division dedicated pilot signal added transmission data frame series according to Embodiment 1 of the present invention.

FIGS. 4(a) and 4(b) are examples of configurations of transmission data frame series. FIG. 4(a) shows a configuration of transmission data frame series 400-1 to 400-n by adding pilot signals (hereinafter, referred to as spatial stream dedicated pilot signals Ak or A1 to An) discrepant in time to dedicated data series D1 to Dn.

In FIG. 4(a), the transmission data frame series 400-1 to 400-n of spatial stream numbers 1 to n respectively include dedicated data series D1 to Dn, spatial stream dedicated pilot signal series A1 to An, and parts in which data does not exist (surround by dotted lines). The dedicated data series D1 to Dn are obtained by dividing the transmission data series to be sent to each terminal equipment by a predetermined bit number.

The dedicated pilot signal series A1 to An are signal series known in advance and may be the same signal series or different signal series.

The transmission data frame series 400-1 to 400-$n$ are respectively transmitted from the wireless base station antennas 2-1 to 2-$n$.

The transmission data frame series 400-1 to 400-$n$ have the same frame lengths. The spatial stream dedicated pilot signal series A1 to An are arranged to be discrepant in time on the basis of the spatial stream numbers, so that the spatial stream dedicated pilot signal series are not overlapped with each other in a same time.

FIG. 4($b$) shows a configuration of the transmission data frame series by adding pilot signals (hereinafter, referred to as spatial stream dedicated pilot signal series Bk or B1 to Bn) including pilot symbol series which are orthogonal between the spatial stream numbers on the basis of the spatial stream numbers.

The transmission data frame series 402-1 to 402-$n$ of the spatial stream numbers 1 to n include dedicated data series D1 to Dn and spatial stream dedicated pilot signal series B1 to Bn.

The spatial stream dedicated pilot signal series B1 to Bn are known signal series progressing straight. The transmission data frame series 402-1 to 402-$n$ have a same frame length.

The transmission data generating unit 5 performs on the transmission data frame series error-correction/encoding by using a transmission line encoding unit which is not shown in the figure and an interleaving process by using an interleaving unit which is not shown in the figure. Thereafter, the transmission data generating unit generates modulation symbol data of the base band modulated by a modulation unit, which is not shown in the figure, using a predetermined modulation method.

The encoding rate in performing error correction/encoding and the modulation schemescheme in the modulation unit may be fixed or be adaptively changeable in accordance with the propagation environment. In the case where the encoding rate and the modulation schemescheme are adaptively changeable, a configuration in which the propagation environment information indicated by a reception SIR, a CIR, an SNR, or a DUR in the terminal equipments 12 is feedback in advance may be used. In the case where the encoding rate and the modulation schemescheme are changeable, information on the modulation scheme such as the encoding rate and the modulation multi levels is signaled to the terminal equipments 12.

The transmission series selecting unit 6 selects the transmission units 7-1 to 7-$n$ of which number corresponds to a number required to perform spatial multiplexing transmission on the all the terminal equipments 12 for spatial multiplexing connection and respectively inputs transmission data frame series to the selected transmission units 7-1 to 7-$n$.

The transmission units 7-1 to 7-$n$ perform digital/analog conversion on digital data which is modulation symbol data of the base band, perform an amplification process on the transmission data frame series with the band limited, and output high-frequency signals on which frequency conversion into a carrier frequency band has been performed to the wireless base station antennas 2-1 to 2-$n$. The high-frequency signals are radiated from the wireless base station antennas 2-1 to 2-$n$ toward the terminal equipments.

Next, a reception process of a signal transmitted from the wireless base station 1 in the terminal equipment 12 will be described (step S227). Hereinafter, it is assumed that the synchronization, that is, frame synchronization and symbol synchronization, has been setup with the wireless base station 1, and operations after the synchronization setup will be described.

At first, the high-frequency signals received from the reception unit antennas 15-1 to 15-$n$ are respectively input to the reception sections 16-1 to 16-$n$. The reception sections 16-1 to 16-$n$ filter a desired band from the high-frequency signals, perform frequency conversion into a base band signal on which orthogonal detection is performed, and output complex base band signals by digital/analog conversion.

The spatial multiplexing separation section 17 outputs a data signal of a spatial stream number which has been signaled to the terminal equipment from one or more input complex base band signals and performs the following operation in order to remove data signals of spatial stream numbers other than the spatial stream number for the terminal equipment, that is, interference signals or suppress the interference signals to the degree that the signal quality necessary and sufficient for communication can be acquired.

At first, the spatial multiplexing separation section 17 separates/extracts all the spatial stream dedicated pilot signal series included in each spatial stream and calculates an estimated channel value of the propagation channel. Here, it is assumed that the m-th terminal equipment 12-$m$ receiving the transmitted signal using spatial multiplexing includes Ns(m) reception unit antennas 15-1 to 15-Ns(m) and Ns(m) reception units 16.

An estimated channel value "Equation 4" of the propagation channel, as shown in "Equation 3," is calculated by performing calculation of correlation between "Equation 2" that is an output signal resulting from reception of the k-th spatial stream dedicated pilot signal series "Equation 1" in the j-th reception unit antenna 15-$j$ and reception section 16-$j$ of the m-th terminal equipment 12-$m$ and "Equation 1" that is generated inside the terminal equipment 12-$m$.

$$AP_k(t) \qquad \text{[Equation 1]}$$

$$r_{j,k}^{(m)}(t) \qquad \text{[Equation 2]}$$

Here, j=1, ..., Ns(m), and Ns(m) is a natural number.

[Equation 3]

$$h^m(j,k) = \sum_{t=1}^{Np} AP_k^*(t) r_{j,k}^{(m)}(t)$$

Here, Np is the number of symbols of the spatial stream dedicated pilot signal series, and the superscript "*" is an operator that calculates a "complex conjugate."

$$h^m(j,k) \qquad \text{[Equation 4]}$$

In addition, the results of the reception of the spatial stream dedicated pilot signal series "Equation 1" for a plurality of times may be stored and an equalization process may be performed. In the case, when the moving speed of the terminal equipment 12-$m$ is sufficiently low, the effect of noises can be reduced, and accordingly, it becomes possible to improve the estimated channel quality of the propagation channel.

Finally, the total estimated channel values "Equation 5" of the propagation channel of which number is Nt×Ns(m) are calculated as estimated channel values of the propagation channel performed by the m-th terminal equipment 12-$m$.

$$Hm(j,k) \qquad \text{[Equation 5]}$$

Here, Nt is the number of spatial streams, and Ns(m) is the number of reception unit antennas of the terminal equipment 12-*m*.

Here, the channel estimation matrix "Equation 6" for the terminal 12-*m* is defined as "Equation 7."

$$H^m \quad \text{[Equation 6]}$$

[Equation 7]

$$H^m = \begin{bmatrix} h^m(1,1) & h^m(1,2) & \ldots & h^m(1,N_t) \\ h^m(2,1) & h^m(2,2) & \ldots & h^m(2,N_t) \\ \vdots & \vdots & \vdots & \vdots \\ h^m(N_s^{(m)},1) & h^m(N_s^{(m)},2) & \ldots & h^m(N_s^{(m)},N_t) \end{bmatrix}$$

Next, the separation of spatial multiplexing channels is performed by using the acquired estimated channel matrix "Equation 6." Here the separation of spatial multiplexing channels means an operation such as the separation and extraction of data signals included in the spatial streams from the spatial multiplexing streams.

As the separation method, the case where ZF (Zero Forcing) or MMSE (Minimum Mean Square Error) that is a method using an inverse matrix of the estimated channel matrix is used will be described.

At first, the case where the ZF technique is used will be described. In the ZF technique, a row vector V(Bm) including the Bm-th row of "Equation 9" that is an inverse matrix of "Equation 6" for a terminal equipment dedicated data reception signal "Equation 8" is calculated by the j-th reception unit antenna 15-*j* and the reception section 16-*j* of the m-th terminal equipment 12-*m* and sets a reception weight used for receiving a data signal of a desired spatial stream number to the row vector V(Bm).

$$r_j^{(m)}(t) \quad \text{[Equation 8]}$$

Here, j=1, . . . , Ns(m), and Ns(m) is a natural number.

$$(H^m)^{-1} \quad \text{[Equation 9]}$$

Here, Bm is a spatial stream number, that is, a transmission antenna number, which is signaled from the wireless base station 1 to be sent to the terminal equipment 12-*m*. The data signal of the Bm-th spatial stream number, as shown in "Equation 10," can be extracted as a desired signal in which interference signals from other spatial streams are suppressed by multiplying the terminal equipment dedicated data reception signal "Equation 11" by the reception weight.

$$z_{B_m}^m(t) = V(B_m) r^m(t) \quad \text{[Equation 10]}$$

$$r(m) \quad \text{[Equation 11]}$$

Next, the case where MMSE technique is used will be described. In this case, like the case of ZF technique, a row vector V(Bm) including the Bm-th row of the reception weight matrix W calculated by MMSE rule is calculated and sets a reception weight used for receiving a desired spatial stream number to the row vector V(Bm).

The Bm-th spatial stream, as shown in "Equation 10," can be received as a desired signal in which interference signals from other spatial streams are suppressed by multiplying dedicated data reception signal "Equation 11" of the terminal equipment 12-*m* by the reception weight When the information on the encoding rates of the data signals included in the spatial streams of terminal equipments other than the terminal equipment 12-*m*, an encoding method such as modulation schemescheme, and a modulation method is already known, a technique such as maximum-likelihood estimation (coupling estimation) or sequential interference canceller (V-BLAST, etc.) can be applied.

When there are a plurality of spatial stream numbers to be sent to the same terminal equipment 12, a desired signal in which interference signals from other spatial streams are suppressed by generating reception weights for receiving data signals of each stream number and multiplying the terminal equipment dedicated data reception signal "Equation 11" by the reception weights can be received.

In this case, the wireless base station 1 divides the transmission data series to be transmitted corresponding to the number of the spatial multiplexing streams, for example n, to be assigned in advance, and a space division multiplexing (SDM) technology in which the generated n-divided transmission data frame series are transmitted to n spatial streams may be used for the transmission.

After the spatial multiplexing separation section 17 extracts divided data signals of each spatial stream number from a signal received in the terminal equipment 12, the received signal is combined to the original data signal series to be restored. For example, by loading divided data signal of 10 Kbit/s for each spatial stream and transmitting the data using three spatial streams, signals three times more than the signals by using one spatial stream for data transmission can be transmitted for a same time. In other words, it becomes possible to increase the transmission rate for each terminal equipment.

The data extracting section 18 performs a demodulation process and a decoding process on the data signal of the desired spatial stream which has been divided and extracted from the spatial multiplexing streams and restores the data signal as the desired reception data series.

By performing the above-described operations, in Embodiment 1 of the present invention, the terminal equipments 12 for spatial multiplexing connection can be easily selected by informing the interference cancellation capability information data indicating the interference cancellation capability of the terminal equipment 12 to the wireless base station 1 in advance and performing a grouping operation on the terminal equipments 12 on the basis of the interference cancellation capability information data.

In related art, when the spatial multiplexing connection is to be performed on K terminal equipments 12 out of total N terminal equipments 12, the total number T of combinations for selecting K terminal equipments 12 out of the N terminal equipments is "Equation 12." As in an example in the related art, when spatial correlation coefficients between terminal equipments are to be calculated, for example, in order to detect a combination of which the correlation coefficient is the minimum, the channel status should be detected on the basis of feedback information and the like from each terminal equipment 12 and thereafter, the total number "Equation 12" of the combinations of times of calculations of the spatial correlation coefficients are required.

$$nCk \quad \text{[Equation 12]}$$

Here, C is a function for calculating combinations.

In this case, when the total number of the wireless base station antennas 2 is Nt, the required number of times of multiplications for calculating the spatial correction coefficients becomes 3×Nt, and accordingly, the total number of times of 3×Nt×T of multiplications are required.

According to Embodiment 1 of the present invention, it is possible to eliminate the need for calculating the above-described spatial correlation coefficients, and the combination of the terminal equipments 12 for spatial multiplexing connection can be easily selected on the basis of a grouping table 300.

Accordingly, the need for detecting the spatial correlation coefficients can be eliminated, whereby the simplification of the configuration of the wireless base station 1 can be achieved together with reducing the processing delay.

In addition, in Embodiment 1 of the present invention, equal power transmission or control of transmission power for each spatial stream may be applied to the transmission power for each spatial stream in the range that the total transmission power of the spatial multiplexing streams is within a normal value.

The application of the control of the transmission power for each spatial stream can be implemented by feedbacking the reception quality of the terminal equipment 12 which becomes the recipient of each spatial stream to the wireless base station 1 and performing power distribution in proportion to the reception quality within the range of the total normal transmission power.

Embodiment 1 of the present invention may be applied to both the single carrier transmission and the multi carrier transmission. In a case where the multi carrier transmission is used, a data signal included in a desired spatial stream can be extracted from the spatial multiplexing stream by calculating estimated channel values of the propagation channel for each sub-carrier.

Embodiment 1 of the invention may be implemented without following a duplex mode of TDD or FDD. In addition, Embodiment 1 of the invention may be implemented without following an access mode of TDMA, FDMA, or CDMA.

In Embodiment 1 of the invention, although the information data indicating the degree of freedom of antenna is used as interference cancellation capability information data representing the interference cancellation capability of the terminal equipment 12, information data indicating an interference suppression ratio, an SIR, an CIR, an SNR, or a DUR other than the degree of freedom of antenna may be used.

In addition, the interference suppression rate, the SIR, the CIR, the SNR, or the DUR may have a value observed in real-time at an arbitrary time and may have an average value for a period, has a value required for acquiring a signal level sufficiently recognizable by extracting a desired data signal from spatial multiplexing transmission signals, and may be set to a value when the system is designed or after the system has been manufactured.

Figure 2B:
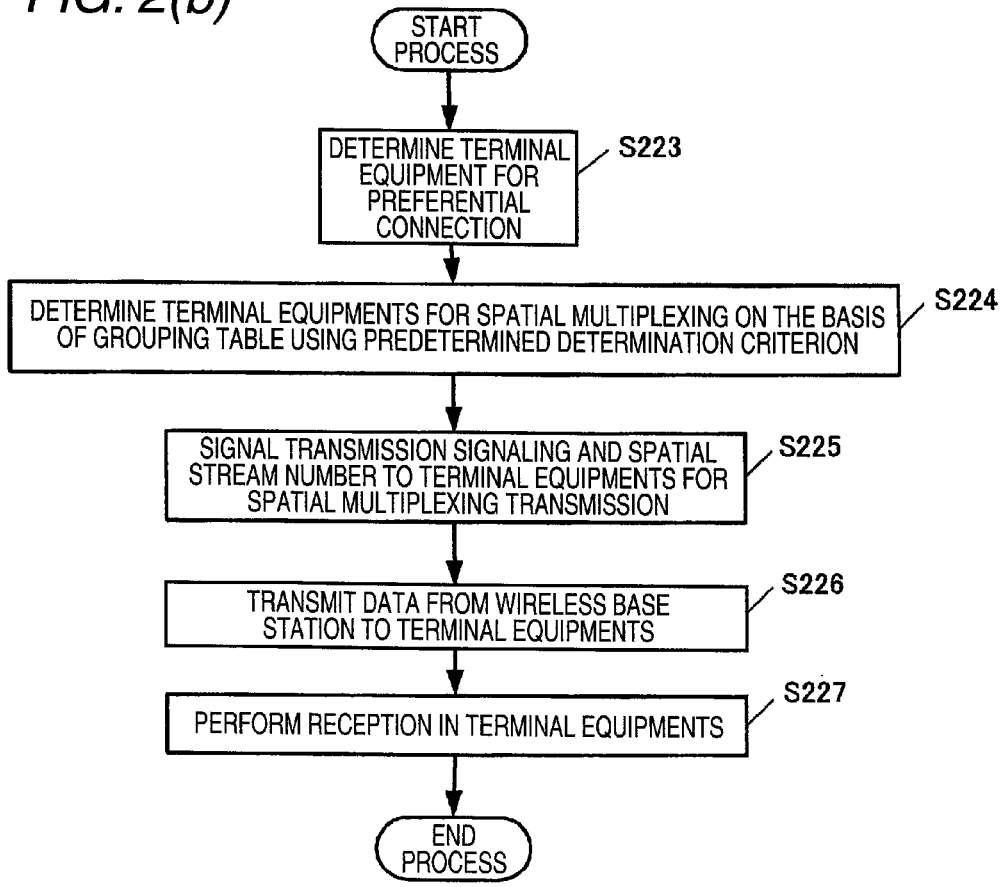
FIG. 2(b) is a flow chart showing an operation of spatial multiplexing transmission process of the wireless base station and the terminal equipment according to Embodiment 1 of the present invention in a downlink.
Figure 5:
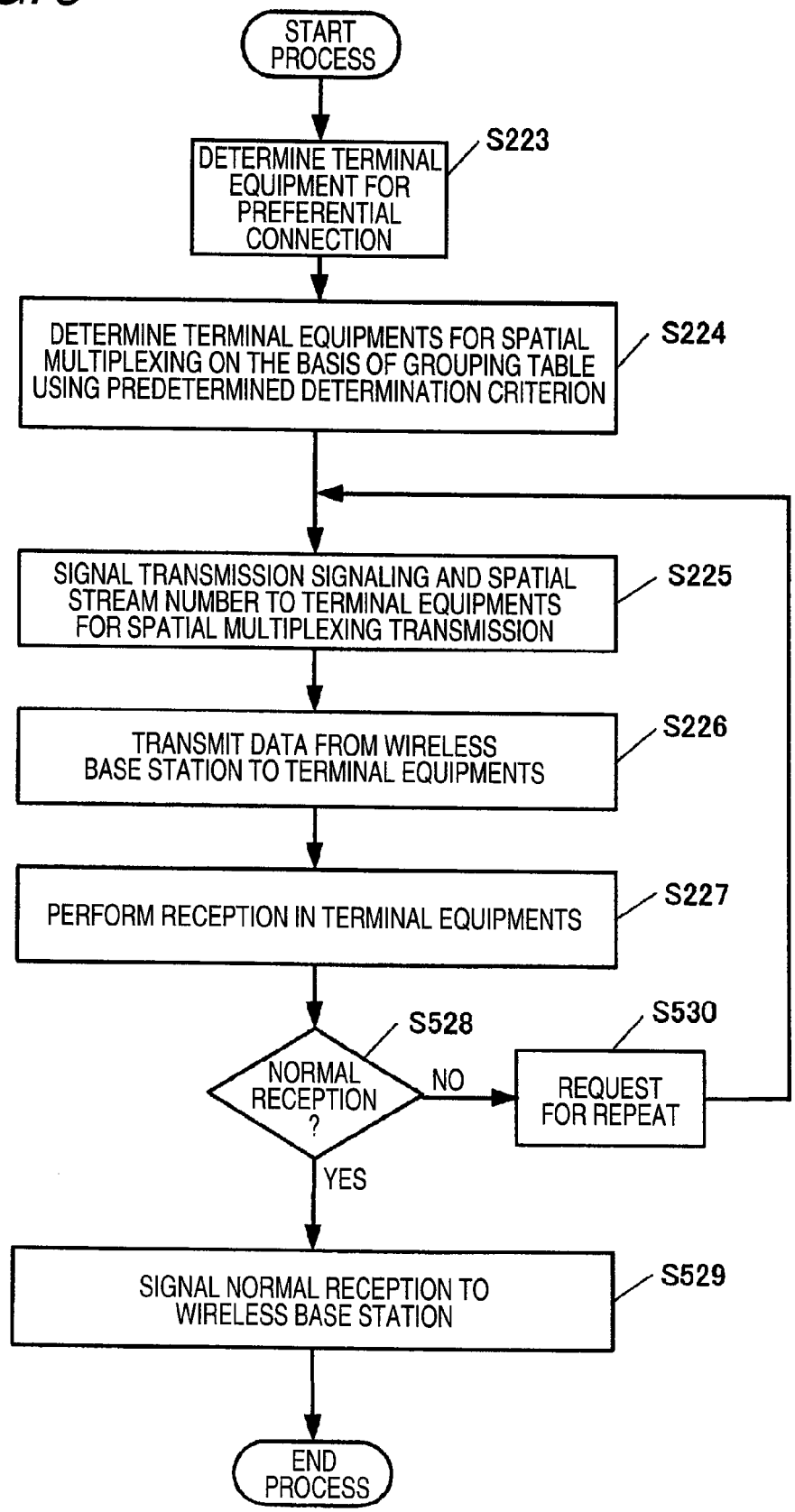
FIG. 5 is a flowchart for describing a re-transmission control operation according to Embodiment 1 of the present invention.

In Embodiment 1 of the invention, although a re-transmission control process is not included in FIG. 2(b), the re-transmission control process may be applied thereto. FIG. 5 is a flowchart showing a re-transmission control process. The difference between FIG. 2(b) and FIG. 5 is that steps S528 to S530 are added in FIG. 5. Since other operations are the same as those described above with reference to FIG. 2(b), the description for the operations are omitted here. Hereinafter, operations different from those of FIG. 2(b) will be described.

After the reception operation of the terminal equipment 12 (step S227), errors of reception data series that have been decoded by the terminal equipment 12 are detected by an error detection section which is not shown in the figure in units of frames (step S528). When it is determined that a normal reception process is performed without detection of any error, the result of the determination is signaled to the wireless base station 1 through the control channel or the signaling channel (step S529), and the process for the reception data series ends. Thereafter, a process for the next spatial multiplexing transmission is started subsequently.

When it is determined that a normal reception process could not be performed due to a detected error, a repeat request is performed to the wireless base station 1 (step S530). In other words, a repeat request signal is transmitted toward the transmission section 21 and is signaled to the wireless base station 1 through the control channel or the signaling channel.

When the repeat request information is detected by the control signal extracting unit 3 of the wireless base station 1, whereby it is determined that the repeat request has been performed, the spatial multiplexing controller 4 performs the following processes.

When the repeat request is performed less than a predetermined number of times, any one process among Process 3 to Process 5 described below is performed.

(Process 3)

A same spatial multiplexing stream as that of the previous transmission is retransmitted to the terminal equipment 12 that has requested for the re-transmission (Process 4)

The spatial multiplexing transmission is not performed, and signal transmission only to the terminal equipment 12 for preferential connection is performed.

(Process 5)

A spatial multiplexing transmission is performed by using a terminal equipment 12 that is also registered in a group having a group number larger than the group to which the terminal equipment 12 for preferential connection belongs and selecting a combination with a terminal equipment 12 other than the terminal equipment used in the previous transmission.

Here, for example, Hybrid ARQ disclosed in a document Eas Malakamami "et al," Performance of Hybrid ARQ Techniques for WCDM A High Date Rates" IEEEVCT2001, pp 2720-2724 can be applied.

When the number of times of the transmission requests exceeds a predetermined number, any process of Process 6 to Process 8 is performed.

(Process 6)

The spatial multiplexing transmission is not performed, and signal transmission only to the terminal equipment 12 for preferential connection is performed.

(Process 7)

The terminal equipment for preferential connection is left as it is, and the spatial multiplexing transmission is performed by using a terminal equipment 12 that belongs to a group having a same group number as the group including the terminal equipment 12 that has performed the previous spatial multiplexing transmission and selecting a combination with a terminal equipment 12 other than the terminal equipment used in the previous transmission.

(Process 8)

The modulation schemescheme are decreased and the encoding rate is decreased.

After the repeat request is performed, a signaling for performing data transmission and a signaling for spatial stream numbers 1 to n including data to be sent to the terminal equipments 12-1 to 12-n, that is, the number information of transmission antennas from which data to be sent to the terminal equipments 12-1 to 12-n is radiated among the wireless base station antennas 2-1 to 2-n are given again to the terminal equipments 12 for spatial multiplexing connection (Step S525).

Thereafter, the same process is repeated.

By using the above-described repeat control operation, even when a terminal equipment 12 having a high spatial correlation is selected as the terminal 12 for spatial multiplexing connection by the wireless base station 1, the reception characteristics of the terminal equipment 12 for preferential connection can be improved by changing a combination of the terminal equipments 12 for spatial multiplexing connection or not performing the spatial multiplexing transmission in accordance with the repeat control operation.

Figure 6:
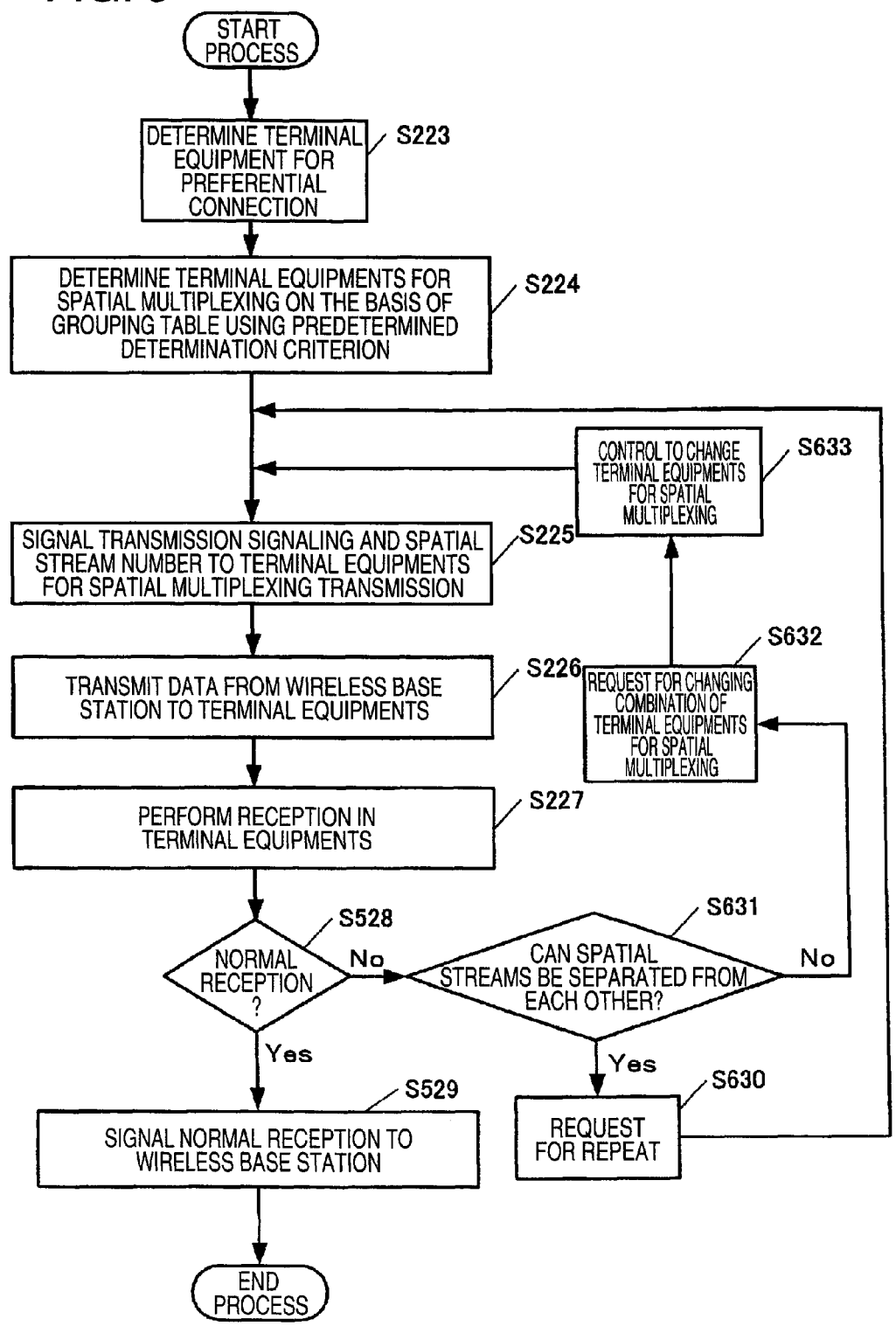
FIG. 6 is a flowchart for describing a second re-transmission control operation according to Embodiment 1 of the present invention.

A repeat control flow other than the repeat control flow shown in FIG. 5 may be applied to Embodiment 1 of the invention. FIG. 6 is a flowchart showing a second repeat control flow other than the repeat control flow shown in FIG. 5.

The difference between FIG. 5 and FIG. 6 is that steps S630 to S633 are added in FIG. 6. Since other operations are the same as those described above with reference to FIG. 5, the description for the operations are omitted here. Hereinafter, operations different from those shown in FIG. 5 will be described After the reception operation of the terminal equipment 12 (step S227), errors of reception data series that have been decoded by the terminal equipment 12 are detected by an error detection section which is not shown in the figure in units of frames (step S528). When it is determined that a normal reception process is performed without detection of any error, the result of the determination is signaled to the wireless base station 1 through the control channel or the signaling channel (step S529), and the process for the reception data series ends.

Thereafter, a process for the next spatial multiplexing transmission is started subsequently. When it is determined that a normal reception process could not be performed due to a detected error, it is determined whether the spatial streams can be separated (step S631).

Figure 9:
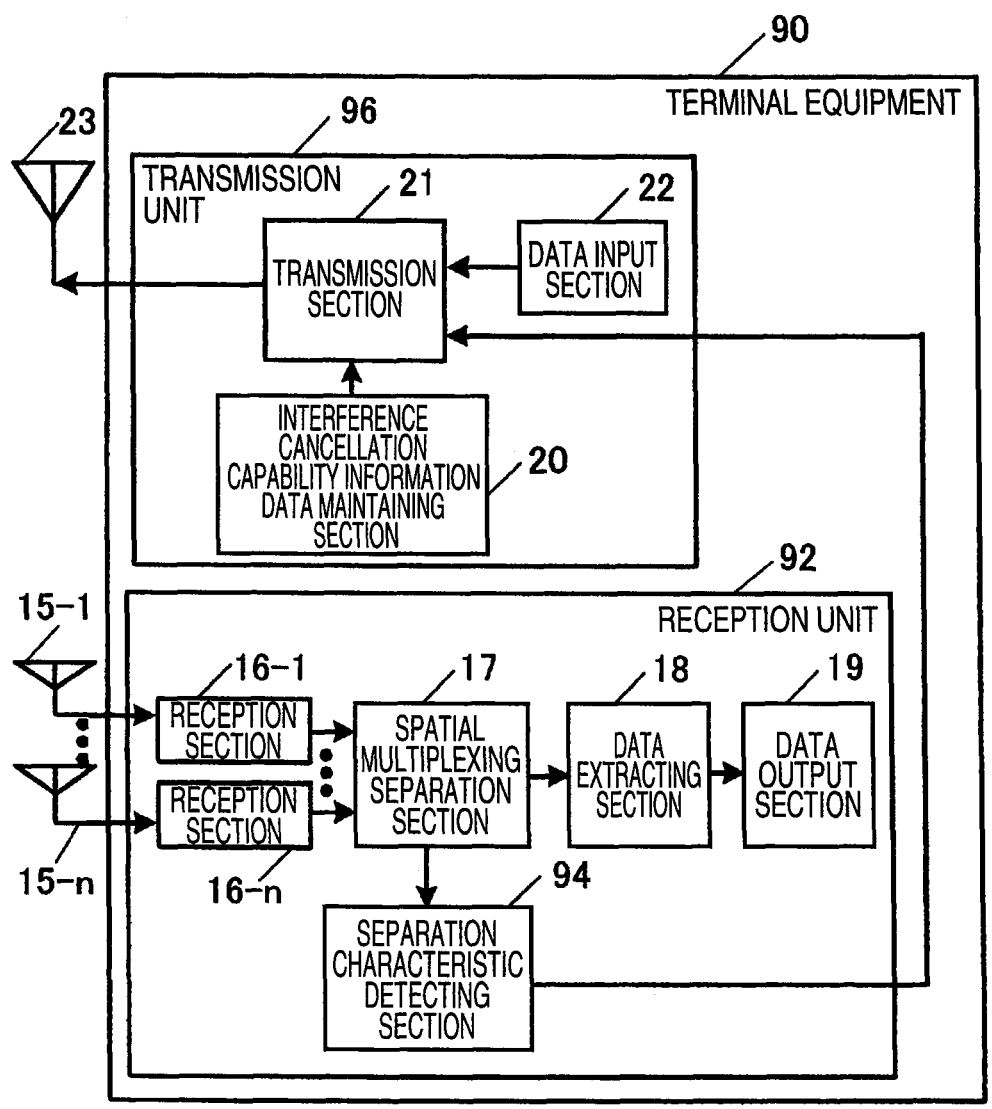
FIG. 9 is a diagram showing a configuration of a terminal equipment having a separation characteristic detecting unit according to Embodiment 2 of the present invention.

The determination on whether the spatial streams can be separated is performed by a separation property detection section 94, shown in FIG. 9, which is arranged separately from the data extracting section 18 in a rear end of the spatial multiplexing separation section 17 in a terminal equipment 90 shown in FIG. 9. The separation property detection section 94 determines whether the spatial streams can be separated by using a predetermined determination criterion.

The separation property detection section transmits a combination change request signal or a repeat request signal to the transmission section 21 on the basis of the result of the determination. The transmission unit 21 informs the received combination change request signal or repeat request signal to the wireless base station 1 through the control channel or the signaling channel.

As the determination criterion, the separation property detection section 94 uses any one between the following Determination Criterion 1 and Determination Criterion 2 which use a channel estimation matrix "Equation 6" represented in "Equation 7" for the m-th terminal equipment 12-$m$.
(Determination Criterion 1)

When the determinant of the channel estimation matrix "Equation 6" which has been normalized by the norm of the channel estimation matrix "Equation 6" is less than a predetermined value, it is determined that the separation of the spatial streams is impossible.

Alternatively, (1) the number of conditions of the channel estimation matrix (as the number decreases, spatial expansion increases) or (2) the magnitude of the minimum eigen value normalized by the maximum eigen value (as the magnitude decreases, spatial expansion increases) may be detected.
(Determination Criterion 2)

It is determined that the spatial streams cannot be separated when the reception quality of an extracted data signal included in the spatial stream transmitted to the terminal equipment 12 is deteriorated over a predetermined value when compared to a reception quality by the maximal ratio combining in a case where the spatial multiplexing connection is not performed.

Here, the reception SNR of the terminal equipment dedicated data reception signal "Equation 8" (where j=1, ..., Ns(m)) in the j-th reception unit antenna 15-$j$ and reception section 16-$j$ of the m-th terminal equipment 12-$m$ in a case where the ZF technique is used is acquired as "Equation 13" by calculating a square of a norm of a row vector V(Bm) including the Bm-th row of the inverse matrix "Equation 9" of "Equation 6."

$$1/\delta^2 \|V(Bm)\|^2 \qquad \text{[Equation 13]}$$

The reception quality by the maximum ratio combining in a case where the spatial multiplexing connection is not performed is acquired as "Equation 14" by calculating a square of a norm of a column vector h(Bm) including Bm-th column of "Equation 6."

$$\|h(Bm)\|^2/\delta^2 \qquad \text{[Equation 14]}$$

Therefore, according to the above-described Determination Criterion 2, when "Equation 15" is greater than a predetermined value, the deterioration degree of the spatial multiplexing is regarded to be high, whereby it is determined that the separation of the spatial streams is impossible.

$$\|V(Bm)\|^2 \times \|h(Bm)\|^2 \qquad \text{[Equation 15]}$$

Here, "Equation 16" denotes reception noise power of the terminal equipment 12, and $\|V(Bm)\|$ and $\|h(Bm)\|$ respectively denote the norms of a row vector or a column vector of V(Bm) and h(Bm).

$$\delta^2 \qquad \text{[Equation 16]}$$

On the basis of the above-described determination criterion, when it is determined that the separation of the spatial streams is impossible, the separation property detection section 94 transmits a combination change request signal for the terminal equipments for spatial multiplexing connection toward the transmission section 21 (step S632). The transmission section 21 informs the input combination change request signal to the wireless base station 1 through the control channel or the signaling channel (step S632).

On the other hand, when it is determined that the separation of the spatial streams is possible, the separation property detection section 94 transmits a repeat request signal toward the transmission section 21. The transmission section 21 informs the input repeat request signal to the wireless base station 1 through the control channel or the signaling channel (step S630).

Thereafter, the same operation as described in the flowchart representing the repeat control operation shown in FIG. 5 is performed.

Next, the operation at a time when the wireless base station 1 receives the combination change request signal for the terminal equipments 12 for spatial multiplexing connection will be described.

The combination change request signal for the terminal equipments 12 for spatial multiplexing connection is detected by the control signal extracting unit 3 of the wireless base station 1. When there is a combination change request for the terminal equipments 12 for spatial multiplexing connection, the spatial multiplexing controller 4 performs any one process between the following Process 9 and Process 10 (step S633).
(Process 9)

The spatial multiplexing transmission is not performed, and it is determined to perform signal transmission by only using the terminal equipment 90 for preferential connection.

(Process 10)

A combination of terminal equipments 90 which are also registered in a group having a group number greater than that of a group including the terminal equipment 90 for preferential connection and are different from those of terminal equipments 90 used for the previous transmission is selected to perform spatial multiplexing transmission.

Thereafter, as described with reference to FIG. 2(b), the operations of the step S225 and thereafter are repeated.

Even when the wireless base station 1 selects terminal equipments 90 having high spatial correlation with each other by the second repeat control flow, terminal equipments 90 for better spatial multiplexing connection which have low spatial correlation with each other can be re-selected, whereby the throughput of the system can be improved.

Figure 10:
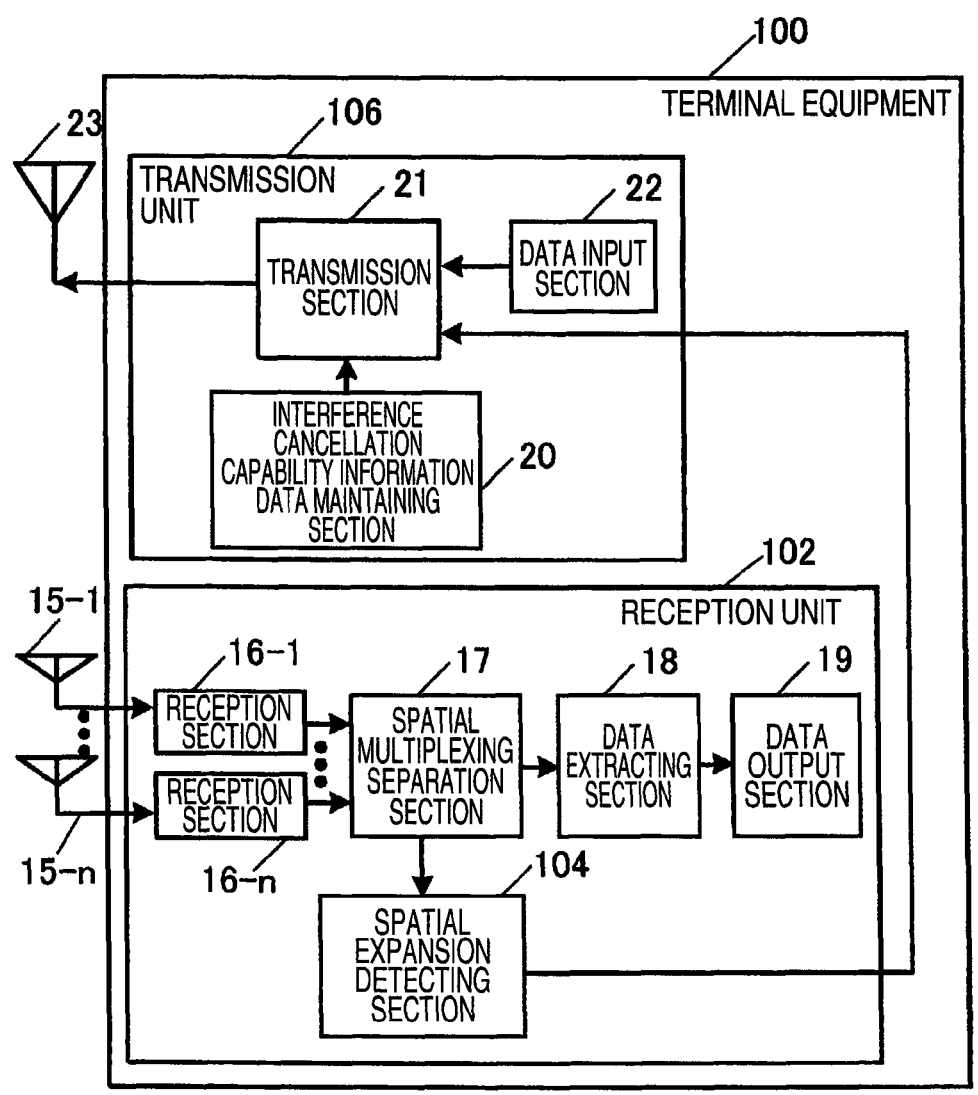
FIG. 10 is a diagram showing a configuration of a terminal equipment having a spatial expansion detecting unit according to Embodiment 2 of the present invention.

As shown in FIG. 10, when a plurality of spatial streams are to be assigned to the same terminal equipment 100, a method in which the terminal equipmentside is configured to have a function of detecting spatial expansion of an incoming wave by providing a spatial expansion detecting section 104 for detecting the expansion of the incoming wave in advance, the detection information is feedback to the wireless base station side, and a plurality of spatial streams are assigned to the same terminal equipment in a case where the spatial expansion is determined to be sufficiently large may be used.

At first, the operation of the terminal equipment 100 will now be described. FIG. 10 shows a configuration of the terminal equipment 100 in which a spatial expansion detecting section 104 separated from the data extracting section 18 is provided in a rear end of the spatial multiplexing separation section 17 for adding the above-described function to the terminal equipmentside. The spatial expansion detecting section 104 determines whether the spatial expansion of the incoming wave is larger/smaller than a predetermined value by using a predetermined criterion.

The spatial expansion detecting section transmits a control signal for directing whether a spatial transmission process for one terminal equipment 100 is performed or a spatial transmission process for a plurality of terminal equipments 100 is performed to the transmission section 21 on the basis of the result of the determination. The transmission section 21 informs the input control signal to the wireless base station 1 through the control channel or the signaling channel.

Since the spatial expansion detecting section 104 can perform detection on the basis of the channel estimation matrix for the terminal equipment 100 or the result of incoming direction estimation, any determination criterion of the following Determination Criterion 3 to Determination Criterion 7 may be used for each detection process.

(1) When Channel Estimation Matrix is Used
(Determination Criterion 3)

A channel estimation matrix (in a case where the terminal equipment 100 is connected using spatial multiplexing in transmission using a plurality of antennas) of the transmission (hereinafter, referred to as uplink) from the terminal equipment 100 toward the wireless base station 1 is estimated by the wireless base station 1 on the premise of the TDD, and a determinant of the channel estimation matrix "Equation 6" which is normalized by using the norm of the channel estimation matrix "Equation 6" is acquired. When the value of the determinant is larger than a predetermined value, it is determined that the spatial expansion is large.

(Determination Criterion 4)

A channel estimation matrix (in a case where the terminal equipment 100 is connected using spatial multiplexing in transmission using a plurality of antennas) of the uplink from the terminal equipment 100 toward the wireless base station 1 is estimated by the wireless base station 1 on the premise of the TDD, and the number of channel estimation matrix conditions of the channel estimation matrix is acquired. When the number is less than a predetermined value, it is determined that the spatial expansion is large.

(Determination Criterion 5)

A channel estimation matrix (in a case where the terminal equipment 100 is connected using spatial multiplexing in transmission using a plurality of antennas) of the uplink from the terminal equipment 100 toward the wireless base station 1 is estimated by the wireless base station 1 on the premise of the TDD, and the magnitude of the minimum eigen value normalized by the maximum eigen value of the channel estimation matrix is acquired.

When the magnitude is less than a predetermined value, it is determined that the spatial expansion is large.

(2) When Estimation Result of Incoming Direction of Electric Wave is Used
(Determination Criterion 6)

When the electric wave incoming direction in the uplink is estimated, an angle spectrum is detected. When the expansion of the spectrum is larger than a predetermined value denoting the expansion of spectrum, it is determined that the spatial expansion is large.

(Determination Criterion 7)

For incoming waves having reception levels larger than a predetermined value, one between 1) a variance value of incoming angles of the electric waves and 2) a value having the maximal absolute value of the differences of the incoming angles is calculated. When the calculated value is larger than a predetermined value, it is determined that the spatial expansion is large.

Next, the operations of the wireless base station 1 will be described. The spatial multiplexing separation section 17 selects whether to perform a spatial transmission process for one terminal equipment 100 or perform a spatial transmission process for a plurality of terminal equipments 100 on the basis of the result of detection of the spatial expansion.

As described above, in Embodiment 1 of the invention, by using a configuration having a control signal extracting section 3 extracting interference cancellation capability information data indicating interference cancellation capability of the terminal equipment 12 from the terminal equipment 12 and the spatial multiplexing controller 4 selecting one or more terminal equipments for spatial multiplexing connection on the basis of the interference cancellation capability information data, the selection of one or more terminal equipments 12 for spatial multiplexing connection is performed on the basis of the interference cancellation capability of the terminal equipment 12. As a result, since the detection of the spatial correlation coefficients is not needed, the process of selection of one or more terminal equipments 12 for spatial multiplexing connection can be simplified. In addition, accompanied to the simplification of the selection process, advantages that the configuration of the wireless base station 1 can be simplified and the processing time required for spatial multiplexing transmission control can be shortened are acquired.

In addition, when the spatial multiplexing controller 4 is configured to have functions of creating grouping information that divides one or more terminal equipments 12 into groups on the basis of the interference cancellation capability information data and selecting one or more terminal equipments 12 to be connected using spatial multiplexing to the wireless base station 1 using a predetermined selection criterion on the basis of the grouping information, it becomes possible to perform a selection process of the terminal equipments 12 in units of groups, and accordingly, an advantage that the processing time for spatial multiplexing transmission control can be shortened further.

When the spatial multiplexing controller 4 is configured to have functions of creating grouping information that divides one or more terminal equipments 12 into groups on the basis of the interference cancellation capability information data and selecting one or more second terminal equipments 12 to be connected to the wireless base station 1 using spatial multiplexing from a group to which a first terminal equipment 12 belongs along with the first terminal equipment 12 for preferential connection by using a predetermined selection criterion, it becomes possible to perform a selection process of terminal equipments 12 in a unit of the group to which the terminal equipment 12 for preferential connection belongs. Therefore, an advantage that the processing time for spatial multiplexing transmission control can be shortened still further while enabling the terminal equipment 12 for preferential connection and other terminal equipments 12 to perform spatial multiplexing transmission therebetween is acquired.

When grouping information that divides one or more terminal equipments 12 into groups on the basis of the interference cancellation capability information data is created and one or more second terminal equipments 12 to be connected to the wireless base station 1 using spatial multiplexing is selected from a first group to which a first terminal equipment 12 belongs along with the first terminal equipment 12 for preferential connection, if the spatial multiplexing controller 4 is configured to have a function of selecting one or more second terminal equipments 12 which are included in the first group and are included in a second group having interference cancellation capability of the terminal equipments 12 higher than that of the first group by using a predetermined selection criterion, it becomes possible to select the terminal equipments 12 having high information value with priority which indicates the interference cancellation capability of groups other than the group to which the terminal equipment for preferential connection. Consequently, advantages that the chance for the spatial multiplexing connection is increased and the communication quality is improved are acquired.

Moreover, when the selection criterion is that the total summation of the transmission streams to all the terminal equipments 12 for spatial multiplexing connection does not exceed the degree of freedom of antenna of a group having the lowest interference cancellation capability of the terminal equipments 12 in a case where one or more terminal equipments 12, in the first group including the terminal equipments 12 for spatial multiple connection, which are also included in a group other than the first group which has interference cancellation capability lower than that of the first group, an advantage that a spatial multiplexing transmission capable of removing the mutual interferences between a plurality of terminal equipments 12 for spatial multiplexing connection can be performed.

The spatial multiplexing controller 4 creates grouping information that divides one or more terminal equipments 12 into groups on the basis of the interference cancellation capability information data indicating the interference cancellation capability of the terminal equipments 12. When the spatial multiplexing controller has a configuration in which a spatial expansion detecting section 104 which detects the spatial expansion of the first terminal equipment 12 along with determining the first terminal equipment 12 for preferential connection to the wireless base station 1 is included and a selection function of selecting one between performing a signal transmission only to the first terminal equipment 12 or performing spatial multiplexing transmission to one or more second terminal equipments 12 together with the first terminal equipment 12 on the basis of the detected information acquired by the spatial expansion detecting section 104 is included is used, an advantage that an increase in the transmission rate or improvement of the system throughput can be acquired depending on the situation of the channel.

When the spatial multiplexing controller 4 has a function of selecting one or more second terminal equipments 12 to be connected to the wireless base station 1 using spatial multiplexing together with a first terminal equipment 12 for preferential connection from a second group having interference cancellation capability higher than a first group to which the first terminal equipment 12 for preferential connection belongs using a predetermined criterion for performing spatial multiplexing transmission to the terminal equipment 12 using a combination of terminal equipments 12 other than a combination used for previous spatial multiplexing transmission in a case where a repeat request is made from a terminal equipment 12 for spatial multiplexing connection after the spatial multiplexing transmission is performed on the terminal equipment 12 for spatial multiplexing connection by the wireless base station 1, the combination of the terminal equipments 12 for spatial multiplexing connection can be changed. Accordingly, an advantage that the reception quality of the terminal equipment 12 for preferential connection in re-transmission is improved can be acquired.

When the spatial multiplexing controller 4 has a function of determining to perform transmission only to a terminal equipment 12 for preferential connection without re-performing the spatial multiplexing transmission in a case where there is a repeat request from a terminal equipment 12 after the spatial multiplexing transmission from the wireless base station 1 to the terminal equipment 12 for spatial multiplexing connection, the signal transmission only to the terminal equipment 12 for preferential connection can be performed without performing the spatial multiplexing transmission, whereby an advantage that the reception quality in the re-transmission to the terminal: equipment 12 for preferential connection can be improved is acquired.

When the spatial multiplexing controller 4 has a function of selecting one or more second terminal equipments 12 for spatial multiplexing connection together with a first terminal equipment 12 for preferential connection from a second group having interference cancellation capability higher than a first group to which the first terminal equipment 12 for preferential connection belongs using a predetermined criterion for performing spatial multiplexing transmission using a combination of terminal equipments 12 other than a combination used for previous spatial multiplexing transmission in a case where a request for changing a combination of terminal equipments 12 is made from a terminal equipment 12 for spatial multiplexing connection after the spatial multiplexing transmission is performed on the terminal equipment 12 for spatial multiplexing connection by the wireless base station 1, the combination of the terminal equipments 12 for spatial multiplexing connection can be changed without increasing the number of times of re-transmissions even in a case where terminal equipments 12 having high spatial correlation with one another are selected for terminal equipments 12 for spatial multiplexing connection by the wireless base station 1, and accordingly, the reception quality in re-transmission is improved, whereby an advantage that the throughput of the system can be improved is acquired.

When the spatial multiplexing controller 4 is configured to have a function of determining to transmit only to the terminal equipment 12 for preferential connection without re-performing the spatial multiplexing transmission in a case where a request for changing the combination of the terminal equipments 12 for spatial multiplexing connection is made from a terminal equipment 12 for spatial multiplexing connection after a time when spatial multiplexing transmission is performed on the terminal equipment 12 for spatial multiplexing connection by the wireless base station 1, the mode can be switched to a mode in which the spatial multiplexing is not performed without increasing the number of times of re-transmissions even in a case where terminal equipments 12 having high spatial correlation with one another are selected for terminal equipments 12 for spatial multiplexing connection by the wireless base station 1, and accordingly, the reception quality in re-transmission is improved, whereby an advantage that the throughput of the system can be improved is acquired.

When a wireless base station 1 which performs spatial multiplexing transmission on a plurality of terminal equipments 12 for spatial multiplexing connection is configured to have a function of performing spatial multiplexing transmission using a combination of terminal equipments 12 other than a combination used for the previous spatial multiplexing transmission in a case where there are repeat requests of a predetermined number of times or more times from a terminal equipment 12 which has received a signal transmitted using spatial multiplexing, an advantage that the reception quality in the re-transmission of the terminal equipment 12 can be improved is acquired by changing the combination of the terminal equipments 12 for spatial multiplexing connection.

When a wireless base station 1 which performs spatial multiplexing transmissions for a plurality of terminal equipments 12 for spatial multiplexing connection, the wireless base station 12 comprising a spatial multiplexing controller which performs transmission only to a terminal equipment 12 for preferential connection without re-performing the spatial multiplexing transmission in a case where there are repeat requests of a predetermined number of times or more times from a terminal equipment 12 that has received a signal transmitted using the spatial multiplexing.

When a wireless base station 1 which performs spatial multiplexing transmission on a plurality of terminal equipments 12 for spatial multiplexing connection is configured to have a function of performing spatial multiplexing transmission using a combination of terminal equipments 12 other than a combination used for the previous spatial multiplexing transmission in a case where there is a request for changing the combination of the terminal equipments 12 for spatial multiplexing connection from a terminal equipment 12 that has received a signal transmitted using the spatial multiplexing, the combination of terminals 12 for spatial multiplexing connection can be changed, and accordingly, an advantage that the reception quality of the terminal equipments 12 in re-transmission can be improved is acquired.

When a wireless base station 1 which performs spatial multiplexing transmission on a plurality of terminal equipments 12 for spatial multiplexing connection is configured to have a function of performing transmission only to a terminal equipment 12 for preferential connection without re-performing the spatial multiplexing transmission in a case where there is a request for changing a combination of terminal equipments 12 for spatial multiplexing connection from a terminal equipment 12 that has received a signal transmitted using the spatial multiplexing, a mode in which the spatial multiplexing transmission is not performed can be switched to without increasing the number of times of re-transmissions, and accordingly, the reception quality in re-transmission can be improved even in a case where terminal equipments 12 having high spatial correlation with one another are selected for terminal equipments 12 for spatial multiplexing connection by the wireless base station 1, whereby an advantage that the throughput of the system can be improved is acquired.

When the terminal equipment 12 is configured to have an interference cancellation capability information data maintaining unit which maintains the interference cancellation capability information data indicating the interference cancellation capability of the terminal equipment 12, an advantage that spatial multiplexing transmission of the wireless base station 1 can be performed with the interference cancellation capability of the terminal equipments 12 considered is acquired.

When the terminal equipment 12 is configured to have a spatial multiplexing separation unit 17 which receives/outputs a desired signal sent to the terminal equipment 12 by suppressing a spatially multiplexed signal toward the other terminal equipments 12 on the basis of a spatial stream number signaled from the wireless base station 1 and known signals added to each spatial stream that has been transmitted using spatial multiplexing, an advantage that the terminal equipments 12 can effectively suppress interference signals from other terminal equipments 12 is acquired.

When the terminal equipment 12 is configured to have a spatial multiplexing separation unit 17 which outputs a desired signal while suppressing a spatially multiplexed signal toward the other terminal equipments 12 on the basis of a spatial stream number and modulation format information which are signaled from the wireless base station 1 and known signals added to each spatial stream that have been transmitted using spatial multiplexing, an advantage that the terminal equipments 12 can effectively suppress interference signals from other terminal equipments 12 is acquired.

When the terminal equipment 90 is configured to have a separation characteristic detecting unit 94 detecting a separation characteristic among spatial streams which are transmitted using spatial multiplexing and to have a function of requesting for changing in a combination of terminal equipments 12 for spatial multiplexing connection to the wireless base station 1, the combination of other terminal equipments 12 for spatial multiplexing connection can be changed without increasing the number of times of re-transmission, and accordingly, the reception quality in re-transmission can be improved even in a case where terminal equipments 12 having high spatial correlation with one another are selected for terminal equipments 12 for spatial multiplexing connection by the wireless base station 1, whereby an advantage that the throughput of the system can be improved is acquired.

When the separation characteristic detecting unit 94 is configured to have a function of detecting a separation characteristic on the basis of a channel estimation matrix which is used for separately receiving spatial multiplexing streams, the status of spatial expansion can be detected, and accordingly, an advantage that a request for changing spatial multiplexing can be made in a case where the status of spatial expansion is insufficient is acquired.

In addition, when the separation characteristic detecting unit 94 is configured to have a function of detecting a separation characteristic on the basis of the channel estimation matrix which is used for separately receiving spatial multiplexing streams, the spatial multiplexing characteristic on the basis of channel capacity can be detected, and accordingly, an advantage that a request for changing spatial multiplexing can be made even in a case where the status of spatial expansion is insufficient is acquired.

When the separation characteristic detecting unit 94 is configured to have a function of requesting for change of the combination of terminal equipments 12 for spatial multiplexing connection in a case where the deterioration amount of the reception quality of the desired signal in the spatial multiplexing transmission is larger than a predetermined value, compared to the reception signal quality in a case where the spatial multiplexing transmission is not performed in which the maximum ratio combining is used, there is an advantage that a request for changing spatial multiplexing can be made even in a case where the deterioration amount in quality is larger than a predetermined value.

In the embodiment, when the interference cancellation capability information of the terminal equipment 12 performing transmission is larger than "1," it may be determined that the reception diversity gain for the transmission signal from the wireless base station 1 is acquired, and a wireless signal may be transmitted with the transmission power lowered.

As another embodiment, when the interference cancellation capability information of the terminal equipment performing transmission is larger than "1," the transmission data frame generating unit 5 may determine that the reception diversity gain for the transmission signal is acquired from the wireless base station 1 and perform transmission with the modulation multi-level increased. Accordingly, the transmission speed of the terminal equipment 12 in a case where the interference cancellation capability information is high.

As another embodiment, when the interference cancellation capability information of the terminal equipment performing transmission is larger than "1," the transmission data frame generating unit 5 may determine that the reception diversity gain for the transmission signal is acquired from the wireless base station 1 and perform transmission with the encoding rate increased. Accordingly, the transmission speed of the terminal equipment 12 in a case where the interference cancellation capability information is high.

As another embodiment, when the interference cancellation capability information of the terminal equipment performing transmission is larger than "1," the transmission data frame generating unit 5 may determine that the reception diversity gain for the transmission signal is acquired from the wireless base station 1 and perform transmission with a transmission mode which is determined by a modulation mode and a decoding rate changed to a higher mode. Accordingly, the transmission speed of the terminal equipment 12 in a case where the interference cancellation capability information is high.

As another embodiment, when the interference cancellation capability information of the terminal equipment performing transmission is larger than "1" in a case where a signal is transmitted using an OFDM signal, the transmission data frame generating unit 5 may determine that the reception diversity gain for the transmission signal is acquired from the wireless base station 1 and a received delayed wave having a long delay time can be removed, and accordingly, the transmission is performed with a guard interval of the OFDM signal shortened. Accordingly, the decrease in a transmission efficiency can be reduced by inserting the guard interval of the OFDM signal, whereby the transmission speed can be improved.

As another embodiment, when the interference cancellation capability information of the terminal equipment performing transmission is larger than "1," the transmission data frame generating unit 5 may determine that the reception diversity gain for the transmission signal is acquired from the wireless base station 1 and perform transmission of a wireless signal with the spatial multiplexing number increased. Accordingly, the transmission speed of the terminal equipment 12 in a case where the interference cancellation capability information is high.

Embodiment 2

Figure 7:
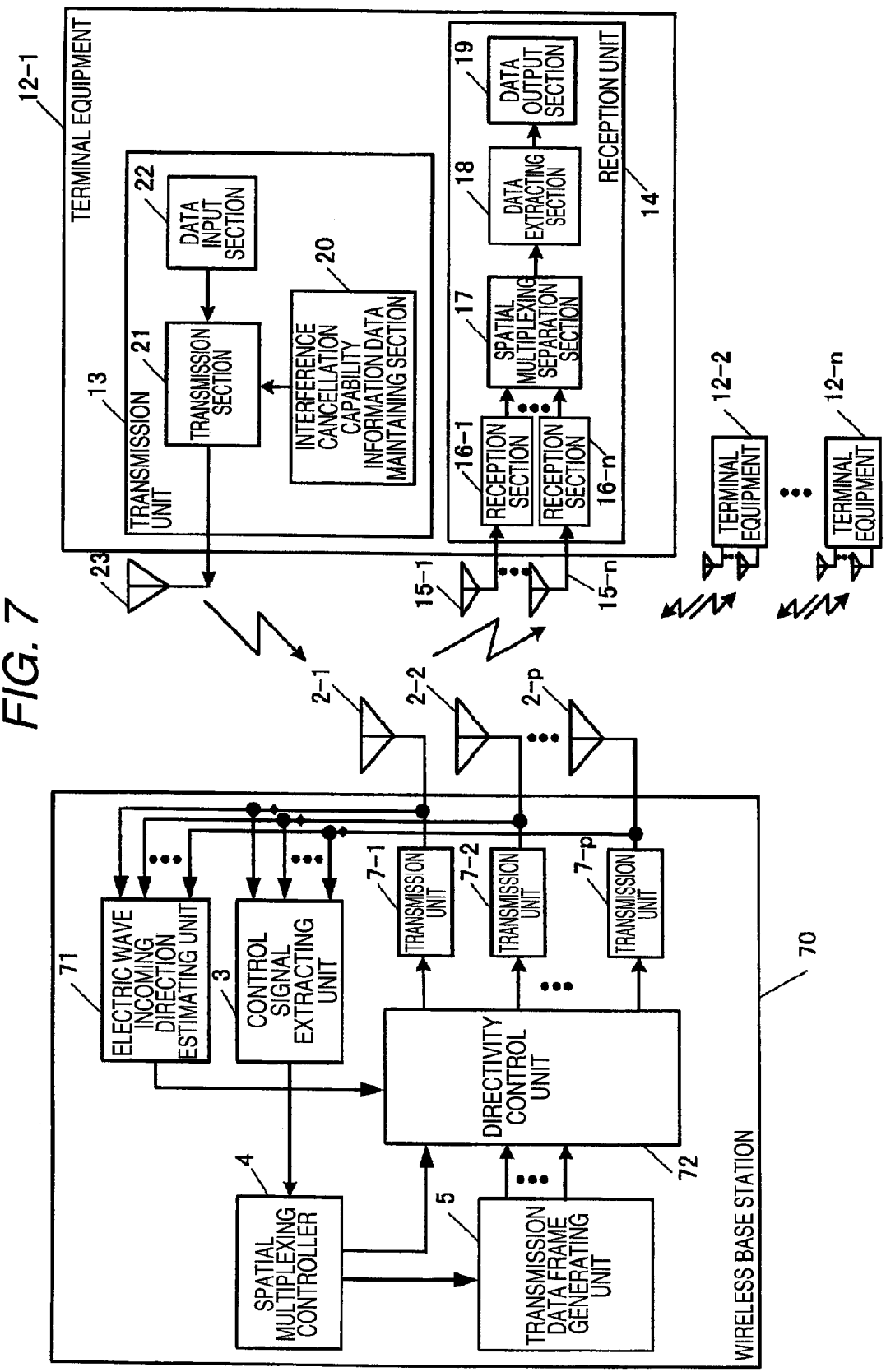
FIG. 7 is a diagram showing a configuration of a wireless base station and a terminal equipment according to Embodiment 2 of the present invention.

FIG. 7 is a diagram showing a configuration of a wireless base station 70 according to Embodiment 2 of the present invention. Parts different from the configuration of the wireless base station 1 shown in FIG. 1 is that an incoming direction estimation unit 71 estimating the incoming direction of the electric wave from the terminal equipment 12 using a uplink signal transmitted from the terminal equipment 12 to the wireless base station 70 is added and the transmission series selecting unit 6 is replaced with a directivity control unit 72 controlling the directivity of the wireless base station antenna 2 on the basis of incoming direction information of the estimated electric wave as shown in FIG. 7. Hereinafter, operations different from those of the wireless base station 1 will be primarily described.

The initial setting operation is the same as that of Embodiment 1 of the invention, and the description is omitted here.

Figure 8:
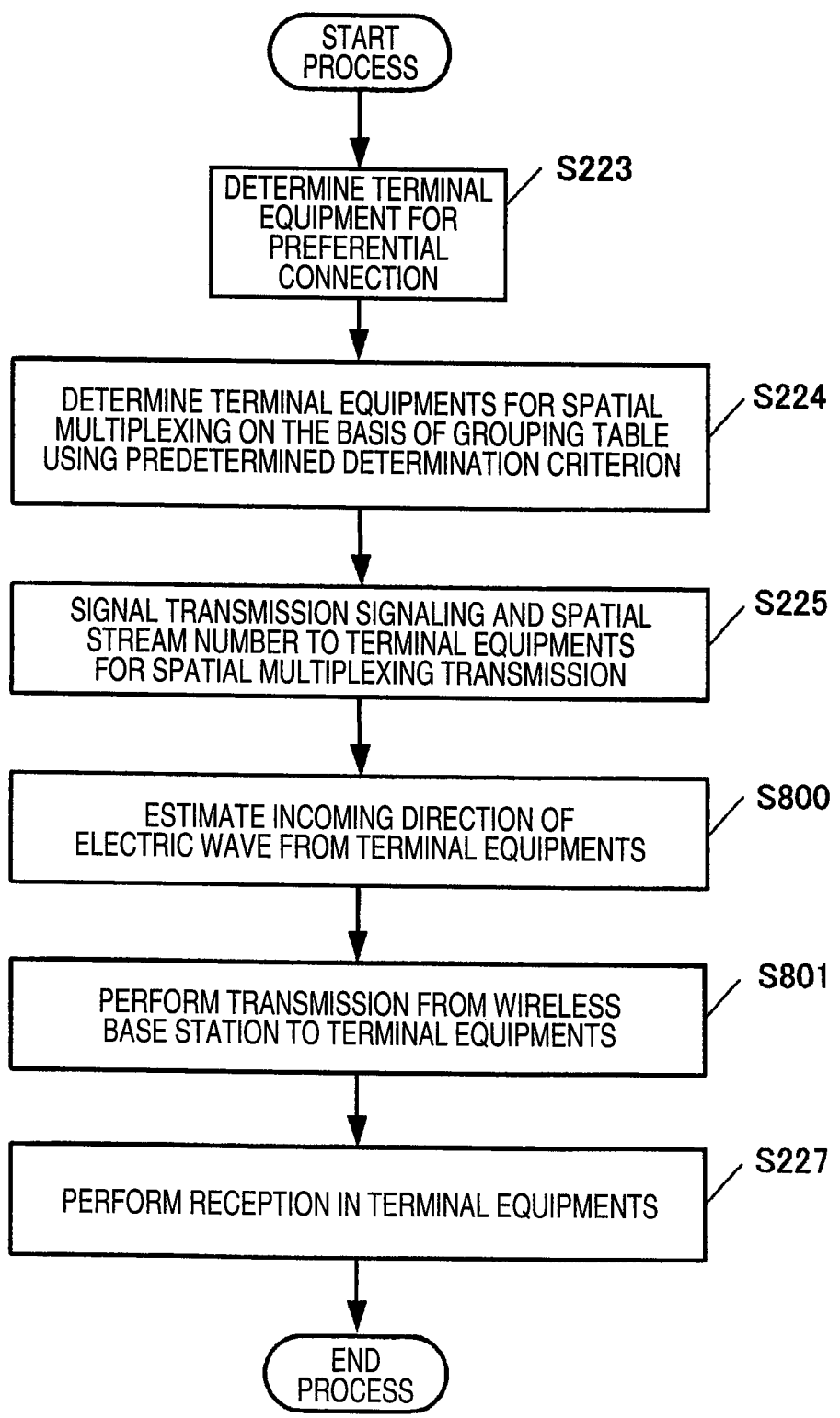
FIG. 8 is a flowchart for describing a spatial multiplexing transmission operation according to Embodiment 2 of the present invention.

Next, spatial multiplexing transmission operation in a downlink will be described with reference to FIG. 8.

At first, the operations of steps S223 to S225 are performed. The operations up to the step S225 are the same as those of Embodiment 1 shown in FIG. 2(b), and accordingly, the description thereof is omitted. An estimation operation of incoming directions of electric waves (step S800) and a data transmitting operation (step S801) from the wireless base station 70 to the terminal equipment 12 will be described.

At first, the operation (step S800) of estimating the electric wave incoming direction from the terminal equipment 12 will be described. At first, the estimation of the incoming directions of electric waves transmitted from a first terminal equipment 12 for preferential connection and one or more terminal equipments 12 selected as second terminal equipments 12 for spatial multiplexing connection to the wireless base station 70 is performed.

The electric wave incoming direction estimation unit 71 estimates the incoming direction of the electric wave from the terminal equipment 12-$m$ using an uplink signal transmitted from the m-th terminal equipment 12-$m$ to the wireless base station 70 (step S800).

The estimation of the electric wave incoming direction can be performed on the basis of phase differences between the signals received by a plurality of the wireless base station antennas 2-1 to 2-$m$. For example, a Fourier beam method, an eigen value decomposition method such as a Capon method, a MUSIC method, or an ESPRIT method, a technique using an inverse matrix operation of a correlation matrix, or the like which are disclosed in "Adaptive Signal Processing by using an array Antenna," published by "Kagaku Gijutsu Shuppan," written by Kikuma, etc. may be applied.

When the Fourier beam method is used, an angle spectrum is calculated by changing θ by a predetermined angle step Δθ in an incoming direction estimating and evaluating function F(θ) shown in "Equation 17," and the maximum peak direction of the angle spectrum is detected and is set as the estimated value θm of the electric wave incoming direction.

$$F(\theta) = |a(\theta)^H R a(\theta)| \qquad \text{[Equation 17]}$$

In "Equation 17," R denotes "Equation 18."

[Equation 18]

$$R = \frac{1}{N} \sum_{k=1}^{N} x(k) x^H(x)$$

Here, a(θ) is a direction vector determined by the element disposition of the wireless base station antenna 2, and for example, when the antennas forms a straight line array having equal element gaps of d, a(θ) can be represented as in "Equation 19."

[Equation 19]

$$a(\theta) = \begin{bmatrix} 1 \\ \exp\{-j2\pi d \cdot 1 \cdot \sin\theta/\lambda\} \\ \vdots \\ \exp\{-j2\pi d \cdot (M-1) \cdot \sin\theta/\lambda\} \end{bmatrix}$$

In "Equation 17" to "Equation 19," λ is a wavelength of a carrier of a received electric wave, θ denotes an angle formed with a normal of the array, and "θ=0 degree" is defined to denote a same direction as the normal of the array. A superscript "H" denotes a complex conjugate transpose. In addition, x(k) is a received vector signal constituted by a column vector having elements of complex base band signals received from a plurality of wireless base station antennas 2.

As described above, the electric wave incoming direction estimation unit 71 transmits the estimated information to the directivity control unit 72. The wireless base station 70 performs data transmission to the one or more terminal equipments 12 for spatial multiplexing connection (step S801).

In the step S801, an operation of generation of transmission data frame series is the same as the operation of generation of the transmission data frame series to which a known spatial stream dedicated pilot signal series have been added in accordance with a spatial stream number in the transmission data frame generating unit 5 in Embodiment 1 described above.

The incoming direction estimation information which is estimated by the electric wave incoming direction estimating unit 71 is input to the directivity control unit 72. The directivity control unit 72 generates a transmission weight vector Vm which is used for forming a directional beam directed to the incoming direction θm of an electric wave from the m-th terminal equipment 12-m for spatial multiplexing connection and respectively inputs Na data signals resulting from multiplying the transmission data frame series, which is an output from the transmission data frame series generating unit 5, transmitted to the m-th terminal equipment 12-m by a transmission weight vector Wm to the transmission units 7. Here, the transmission weight vector Wm is a vector having elements of Na which is the same number as the number of the wireless base station antennas, and may be set to "Equation 20" using a direction vector a(θ) shown in FIG. 19. In "Equation 20," the superscript "H" denotes a complex conjugate transpose.

$$Wm = a^H(\theta) \quad \text{[Equation 20]}$$

The transmission unit 7 performs digital/analog conversion on the transmission data frame series signal which is a modulated symbol data of the base band and performs an amplification process on the converted signal with the band being limited, and outputs a high-frequency signal, which is frequency-converted into a carrier frequency band to the Wireless base station antenna 2.

A high-frequency signal is radiated from the wireless base station antenna 2. In other word, an electric wave is radiated with the directivity of the wireless base station antenna 2 controlled such that the beam gain becomes maximal in the incoming direction of the electric wave, that is a direction of the terminal equipment 12 for spatial multiplexing connection.

The reception operation (step S227) of the terminal equipment 12 for the signal transmitted from the wireless base station 70 can be implemented to be the same as the operation in Embodiment 1 of the invention by performing channel estimation for each spatial stream.

By the operations described above, it becomes possible to transmit a directional beam on the basis of the electric wave incoming direction estimation result information in Embodiment 2 of the invention, whereby the improvement of the directional gain can be achieved in addition to the advantages of Embodiment 1. Moreover, depending on the incoming direction of the electric waves of the plurality of terminal equipments 12 selected as terminal equipments for spatial multiplexing, the interference between spatial streams of adjacent terminal equipments 12 can be decreased markedly, when compared with a case where directional transmission is not performed, whereby the reception quality can be improved still further.

Figure 11A:
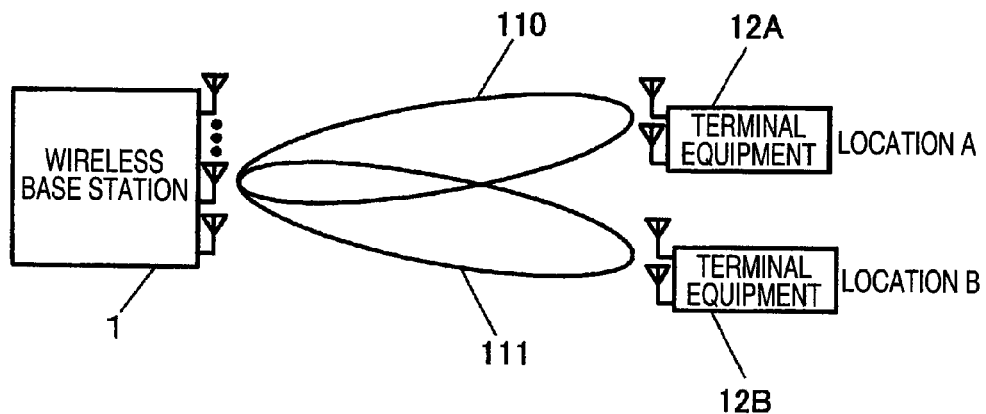
FIG. 11(a) is a diagram for describing an advantage in a case where a directional transmission according to Embodiment 2 of the present invention is performed.

In other words, in FIG. 11(a), reception qualities in a terminal equipment 12A and a terminal equipment 12B differ markedly depending on whether there is directivity or not in the shape of a first beam 110 schematically representing the distribution of the intensity of an electric wave transmitted to a first terminal equipment 12A located at a location A from the wireless base station 1 and a second beam 111 representing the distribution of the intensity of an electric wave transmitted to a second terminal equipment 12B located at a location B close to the location A.

Figure 11B:
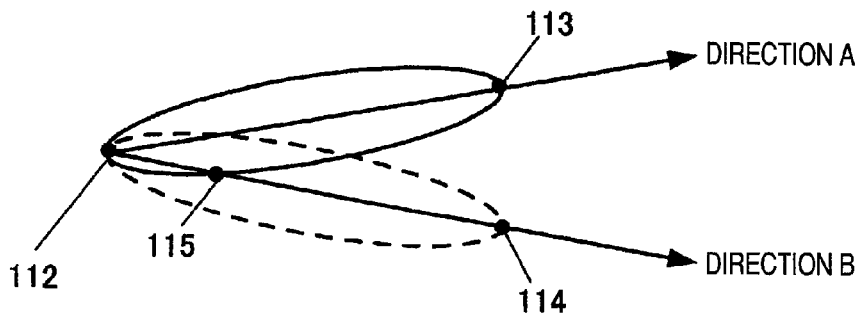
FIG. 11(b) is a schematic diagram for describing the degree of interference of unnecessary electric waves in the transmission of a directional beam.
Figure 11C:
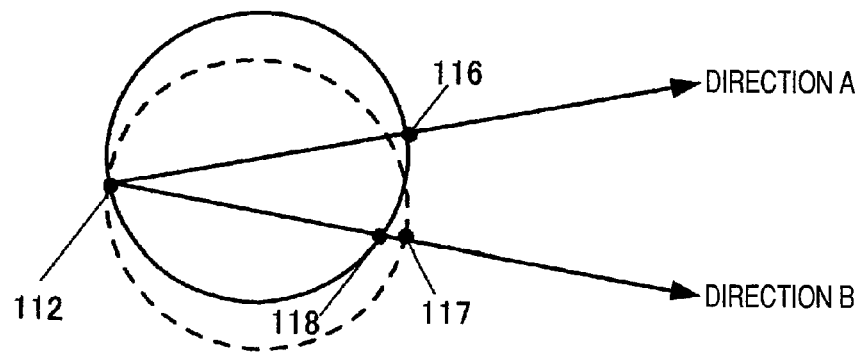
FIG. 11(c) is a schematic diagram for describing the degree of interference of unnecessary electric waves in the transmission of a non-directional beam.

The aspect will be described with reference to FIGS. 11(b) and 11(c). In FIGS. 11(b) and 11(c), Direction A denotes a direction from the wireless base station 1 in which the first terminal equipment 12A is located and Direction B denotes a direction from the wireless base station 1 in which the second terminal equipment 12B is located.

FIG. 11(c) shows the shape of a beam that does not have directivity. In FIG. 11(c), a solid line shows the shape of a beam in Direction A, and a dotted line shows the shape of a beam in Direction B. In addition, a point 112 denotes a location of the wireless base station 1, and the length of a straight line from the point 112 to a point 116 schematically indicates the reception intensity at the first terminal equipment 12A. In other words, as the length of the straight line increases, the reception intensity becomes high.

Likewise, the length of a straight line from the point 112 to a point 117 schematically indicates the reception intensity at the second terminal equipment 12B and is almost the same as the length of the straight line from the point 112 to the point 116 in FIG. 11(c), indicating almost the same reception intensity as the first terminal equipment 12A.

The electric wave toward the first terminal equipment 12A is also received at the second terminal equipment 12B, and the reception intensity of the electric wave is schematically represented as the length of a straight line from the point 112 to a point 118.

FIG. 11(b) shows the shape of a beam that has directivity. In FIG. 11(b), a solid line schematically represents the shape 113 of a beam toward the first terminal equipment 12A, and a dotted line schematically represents the shape 114 of a beam toward the second terminal equipment 12B. Due to the directivity, the lengths of the straight line from the point 112 to the point 113 and the straight line from the point 112 to the point 114 are lengthened, and the reception intensity at the terminal equipments 12A and 12B are increased in that degree.

In this case, the length of a straight line from the point 112 to a point 115 which indicates the intensity of an unnecessary electric wave in the second terminal equipment 12B is smaller than the length of the straight line from the point 112 to the point 118 shown in FIG. 11(c). In other words, it can be known that the interference from an unnecessary electric wave can be sufficiently suppressed.

In addition, in Embodiment 2 of the present invention, equal power transmission or control of transmission power for each spatial stream may be applied to the transmission power for each spatial stream in the range that the total transmission power of the spatial multiplexing streams is within a normal value.

The application of the control of the transmission power for each spatial stream can be implemented by feedbacking the reception quality of the terminal equipment 12 which becomes the recipient of each spatial stream to the wireless base station 70 and performing power distribution in proportion to the reception quality within the range of the total normal transmission power.

Embodiment 2 of the present invention may be applied to both the single carrier transmission and the multi carrier transmission. In a case where the multi carrier transmission is used, a data signal included in a desired spatial stream can be extracted from the spatial multiplexing stream by calculating estimated channel values of the propagation channel for each sub-carrier.

As described above, according to Embodiment 2 of the invention, by using the above-described configuration, a directional beam is transmitted to the terminal equipments 12 selected by the spatial multiplexing controller 4 on the basis of estimation result of the electric wave incoming directions of the terminal equipments 12, an advantage that the directivity gain toward one or more terminal equipments 12 for spatial connection is improved is acquired.

Moreover, depending on the incoming direction of the electric waves of the one or more terminal equipments 12 for spatial multiplexing, the mutual interference of spatial streams can be decreased, whereby an advantage that the reception quality can be improved still further is acquired.

Embodiment 3

Figure 12:
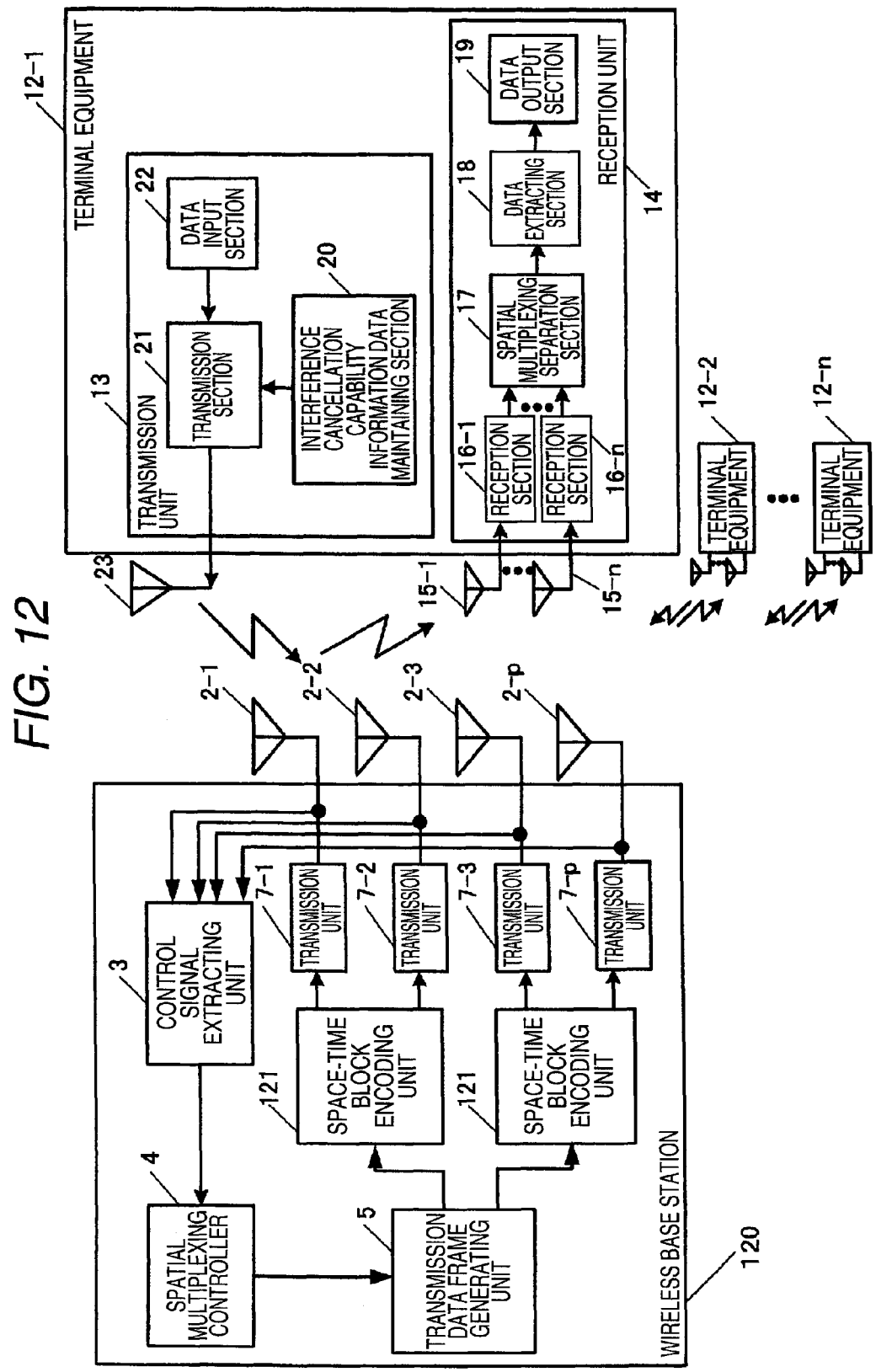
FIG. 12 is a diagram showing a configuration of a wireless base station and a terminal equipment according to Embodiment 3 of the present invention.

FIG. 12 is a diagram showing a configuration of a wireless base station 120 according to Embodiment 3 of the present invention. Parts in FIG. 12 different from the configuration of the wireless base station 1 shown in FIG. 1 is that one or more space-time block encoding units 121 for space-time block encoding instead of the transmission series selecting unit 6 are added to the rear end of the transmission data frame generating unit 5.

The space-time block encoding units 121 perform space-time block encoding on the dedicated data series D1 to Dn except for spatial stream dedicated pilot signal series of the transmission data frame series which is input as a modulation symbol. Here, Nt space-time block encoding units 121 are used for the number Nt of spatial streams.

The space-time block encoding units 121 perform space-time block encoding on the dedicated data series D1 to Dn of the input modulation symbols in units of Nb symbols, output No symbol data series, and input the symbol data series to the transmission units 7.

Although an example in a case where number of spatial streams Nt=2, symbol unit Nb=2, and number of symbol data series No=2 is shown in FIG. 12, the present invention is not limited thereto. In Embodiment 3 of the invention, the number of spatial streams Nt is selected such that a condition of Nt×No≤Na is satisfied. Here, Na is the number of the wireless base station antenna.

It is assumed that a space-time block code disclosed in a document S. M. Alamouti, "A simple transmit diversity technique for "wireless communications," IEEE Journal Select. Areas Commnun., vol. 16, no. 8, pp. 1451-1458, October 1998, etc. is used as the space-time block code. Hereinafter, the parts of operations different from that of Embodiment 1 of the invention will be described.

The initial setting operation of Embodiment 3 of the invention is the same as an operation in the flowchart indicating the initial setting operation shown in FIG. 2 used for description of Embodiment 1 of the invention. Since the operations other than the operation (step S226) of transmission from the wireless base station 1 to the terminal equipment 12 and the operation (step S227) of reception in the terminal equipment 12 are the same as those of Embodiment 1 of the invention, the description for the same operation steps will be omitted here.

Hereinafter, the transmission operation of the wireless base station performing data transmission to one or more terminal equipments 12 is denoted as a step S226B instead of the step S226, the reception operation of the terminal equipments 12 is denoted as a step S227B instead of the step S227, and parts of operations different from the operations shown in FIG. 2(b) will be described.

At first, the operation (step S226B) of transmission from the wireless base station 120 to the terminal equipments 12 will be described. The transmission data frame generating unit 5 generates transmission data frame series obtained by adding known spatial stream dedicated pilot signal series of which number is No, that is the number of streams output from the space-time block encoding unit 121, to the transmission data series for the one or more terminal equipments 12 for spatial multiplexing connection in accordance with spatial stream numbers.

In this case, different spatial stream dedicated pilot signal series are transmitted for each spatial stream number such that the spatial stream dedicated pilot signal series can be separately received by the terminal equipment 12 side. The dedicated data series are configured to be the same modulation symbol data.

In addition, the transmission data generating unit 5 performs on the transmission data frame series error-correction/encoding by using a transmission line encoding unit which is not shown in the figure and an interleaving process by using an interleaving unit which is not shown in the figure. Thereafter, the transmission data generating unit generates modulation symbol data of the base band modulated by a modulation unit, which is not shown in the figure, using a predetermined modulation method.

The encoding rate in performing error correction/encoding and the modulation schemescheme in the modulation unit may be fixed or be adaptively changeable in accordance with the propagation environment. In the case where the encoding rate and the modulation schemescheme are adaptively changeable, a configuration in which the propagation environment information indicated by a reception SIR, a CIR, an SNR, or a DUR in the terminal equipments 12 is feedback in advance may be used. In the case where the encoding rate and the modulation schemescheme are changeable, information on the modulation scheme such as the encoding rate and the modulation multi levels is signaled to the terminal equipments 12.

Figure 13:
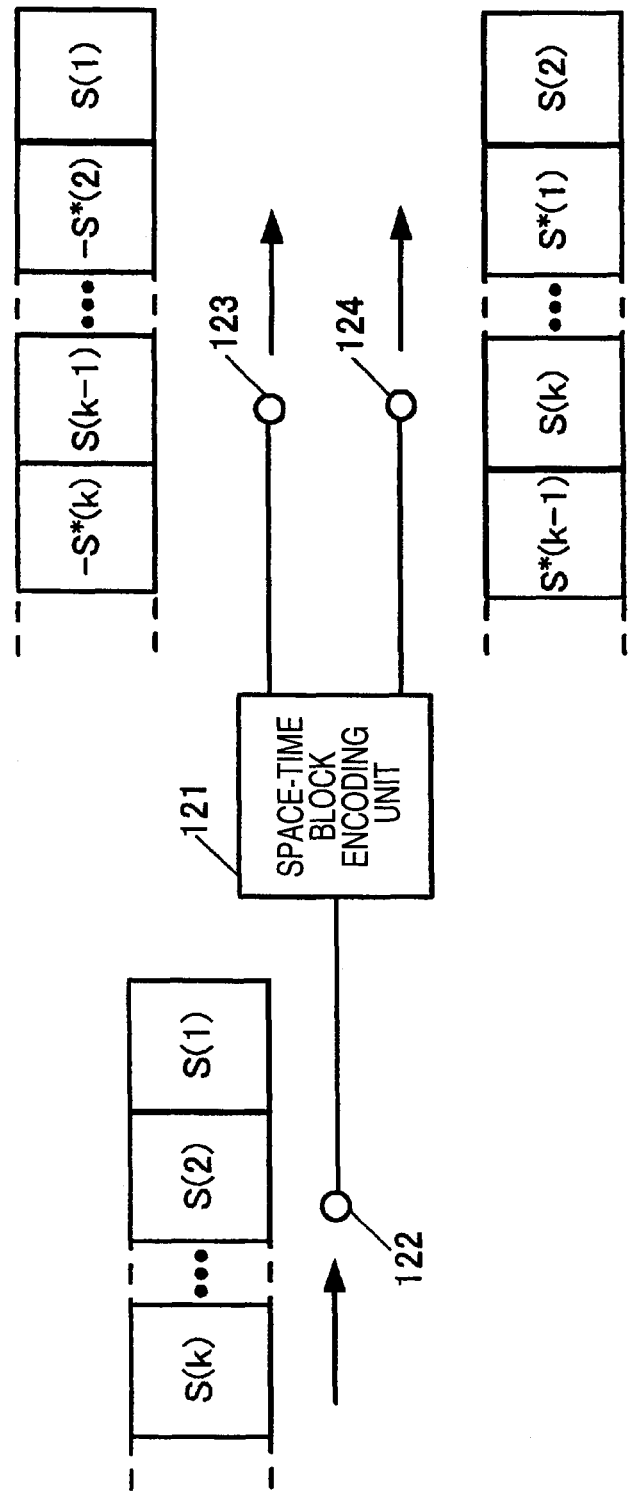
FIG. 13 is a diagram for describing input/output operations of a space-time block encoding unit according to Embodiment 3 of the present invention.

The space-time block encoding unit 121 receives modulation symbol series of one spatial stream as input and outputs modulation symbol series to which No space-time blocks have been encoded. FIG. 13 shows the change in the modulation symbol series before/after the space-time block encoding in the space-time block encoding unit 121.

When the modulation symbol of dedicated data series input to an input terminal 122 of the space-time block encoding unit is denoted as S(k), the space-time block encoding is performed such that S(2m−1) and −S*(2m) are output from the first output terminal 123 as the modulation symbol output after space-time block encoding and S(2m) and S*(2m−1) are output from the second output terminal 124 as the modulation symbol output after space-time block encoding. Here, the superscript "*" is a phase conjugate operator in a complex phase plane, k=1, . . . , K, and m=1, . . . , K/2 where K is a natural number.

The transmission units 7 perform digital/analog conversion on digital data which are modulation symbol series of the base band, perform an amplification process on the transmission data frame series with the band limited, and output high-frequency signals on which frequency conversion into a carrier frequency band has been performed to the wireless base station antennas 2. The high-frequency signals are radiated from the wireless base station antennas 2.

Next, the reception operation (step S227B) of the terminal equipments 12 will be described. Hereinafter, the synchronization, that is, frame synchronization and symbol synchronization, is assumed to be established between the wireless base station 120 and the terminal equipments, and the operation after the establishment of synchronization will be described.

At first, the high-frequency signals received by the reception unit antennas 15-1 to 15-m are input to the reception sections 16-1 to 16-m, respectively. The reception sections 16-1 to 16-m filter a desired band from the high-frequency signals, perform frequency conversion on the filtered signals using a detected orthogonal base band signal, and output complex base band signals by digital/analog conversion, respectively.

The spatial multiplexing separation section 17 outputs a data signal of a spatial stream number signaled to the terminal equipment from one or more input complex base band signals and the following operation is performed for suppressing data signals of spatial numbers other than spatial stream numbers transmitted to the terminal equipment, that is, interference signals up to a necessary and sufficient degree.

At first, all the Nt×No spatial stream dedicated pilot signals which are respectively added to spatial streams are separated and extracted to calculate a channel estimation value of the propagation channel.

Here, the number No of spatial streams is the number of symbol data series, and the m-th terminal equipment 12-$m$ which receives a signal transmitted using spatial multiplexing is supposed to have Ns(m) antennas 15 and Ns(m) reception sections 16.

The channel estimation value "Equation 4" of the propagation channel is calculated as shown in "Equation 3" by performing a correlation operation of "Equation 2" (where j=1, . . . , Ns(m)) which is an output signal obtained by receiving the k-th spatial stream dedicated pilot signal "Equation 1" by the j-th reception unit antenna 15-$j$ and $j$-th reception section 14-$j$ of the m-th terminal equipment 12-$m$ and "Equation 1" which is a same signal as the j-th spatial stream dedicated pilot signal generated inside the terminal equipment 12-$m$.

Np is the number of symbols of the pilot signal series, and the superscript "*" is an operator that calculates a complex conjugate. In addition, the results of plural times of receptions of the spatial stream dedicated pilot signals "Equation 1" may be preserved, and an averaging process may be performed on the reception results. In this case, when the moving speed of the terminal equipment 12 is sufficiently low, the effect of noises can be reduced, whereby the channel estimation quality can be improved.

Finally, the total Nt×Ns(m) channel estimation values "Equation 5" are calculated as the channel estimation values of the propagation channel estimated by the m-th terminal equipments 12-$m$. Here, Nt is the number of spatial streams, and Ns(m) is the number of reception unit antennas of the m-th terminal equipment 12-$m$. Here, the channel estimation matrix "Equation 6" for the terminal equipment 12-$m$ is defined as "Equation 7."

Next, the separation of spatial multiplexing channels is performed using the acquired channel estimation matrix "Equation 6." As the separation method, MMSE (Minimum Mean Square Error) or ZF (Zero Forcing) that is a method using an inverse matrix of the estimated channel matrix may be used for separate reception.

By the above-described operations, since a space-time block encoding process is performed in the wireless base station 120 in Embodiment 3 of the invention, a diversity effect can be acquired, whereby the improvement of the reception quality of the terminal equipments 12 can be achieved in addition to the advantages of Embodiment 1 of the invention.

In addition, in Embodiment 3 of the present invention, equal power transmission or control of transmission power for each spatial stream may be applied to the transmission power for each spatial stream in the range that the total transmission power of the spatial multiplexing streams is within a normal value.

The application of the control of the transmission power for each spatial stream can be implemented by feedbacking the reception quality of the terminal equipment 12 which becomes the recipient of each spatial stream to the wireless base station 120 and performing power distribution in proportion to the reception quality within the range of the total normal transmission power.

Embodiment 3 of the present invention may be applied to both the single carrier transmission and the multi carrier transmission. In a case where the multi carrier transmission is used, a data signal included in a desired spatial stream can be extracted from the spatial multiplexing stream by calculating estimated channel values of the propagation channel for each sub-carrier.

According to Embodiment 3 as described above, by using the above-described configuration, space-time encoding is performed on a signal to be transmitted to the terminal equipment 12 selected by the spatial multiplexing controller unit 4. Accordingly, the diversity effect in the transmission can be acquired, whereby an advantage that the reception quality is improved is acquired.

In addition, by having a configuration in which space-time block codes are used as space-time codes, the increase in the size of hardware is suppressed and the diversity effect in transmission can be acquired, whereby advantages that the increase in the size of the hard is suppressed and the reception quality is improved are acquired.

Embodiment 4

Embodiment 4 is appropriate for a network communication environment primarily constituting a wireless LAN. Here, a configuration for upward communication from a terminal equipment to a wireless base station and a communication method between a wireless base station and a terminal equipment using SDMA will be described.

A wireless base station 1001 in Embodiment 4 of the invention measures the interference cancellation capability information in the wireless base station 1001 and informs the interference cancellation capability information to terminal equipments in the communication area, whereby it becomes possible to perform space division multiple access (SDMA: Space Division Multiple Access) in which a plurality of terminal equipments simultaneously transmit wireless signals to the wireless base station 1001.

Figure 14:
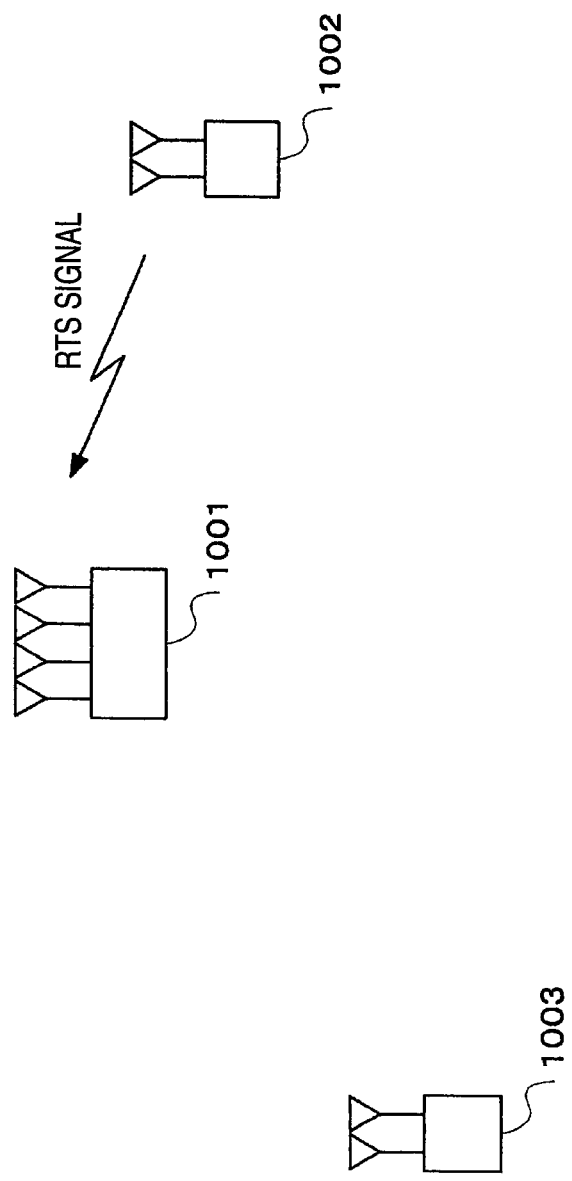
FIG. 14 is a diagram showing the disposition of a wireless base station and terminal equipments and a status in the transmission of an RTS signal according to Embodiment 4 of the present invention.

FIG. 14 is a diagram showing the disposition of the wireless base station 1001 and terminal equipments 1002 and 1003 and a status in the transmission of an RTS signal according to Embodiment 4. In FIG. 14, it is assumed that the wireless base station 1001 and terminal equipments 1002 and 1003 perform access control in accordance with CSMA/CA (Carrier Sense Multiple Access/Collision Avoidance). The wireless base station 1001 and terminal equipments 1002 and 1003 respectively include N antennas, M antennas, and L antennas. Here, it is assumed that N is an integer equal to or greater than two, each M and L is an integer equal to or greater than one, and a condition N≥M is satisfied. In FIG. 14, N=4 and M=L=2, but the present invention is not limited thereto. In the embodiment of the invention, although the number of the terminal equipments is described as two, the present invention is not limited thereto, and the invention may be applied to a case where the number of the terminal equipments is two or more.

Figure 15:
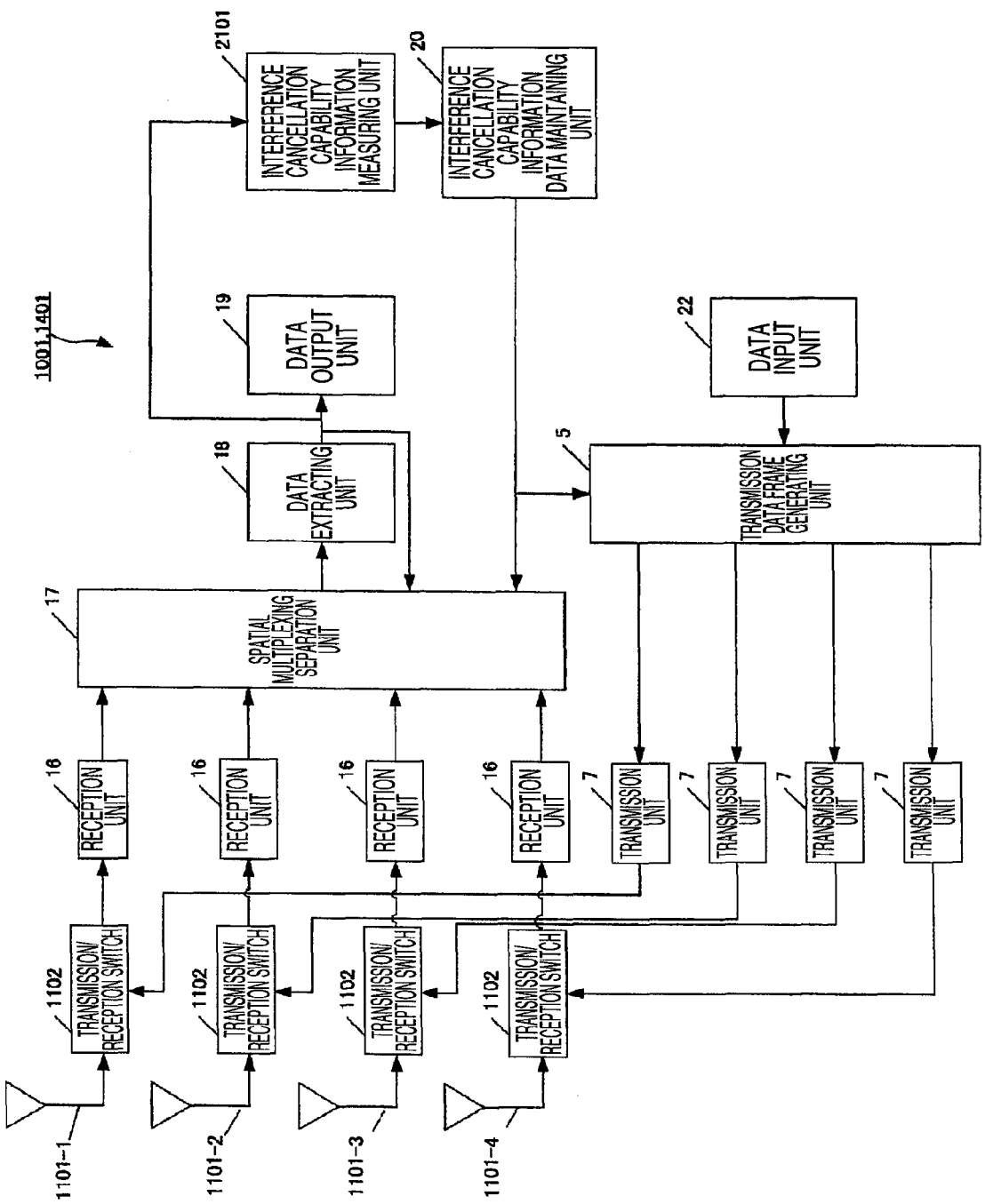
FIG. 15 is a diagram showing a configuration of a wireless base station according to Embodiment 4 of the present invention.

FIG. 15 is a diagram showing a configuration of a wireless base station 1001 according to Embodiment 4 of the present invention. The wireless base station 1001 includes a plurality of wireless base station antennas 1101-1 to 1101-4, a transmission/reception switch 1102, reception units 16, a spatial multiplexing separation unit 17, a data extracting unit 18, a data output unit 19, an interference cancellation capability information measuring unit 2101, an interference cancellation capability information data maintaining unit 20, a transmission unit 7, a transmission data frame generating unit 5, and a data input unit 22.

In FIG. 15, the plurality of wireless base station antennas 1101 transmit or receive high-frequency signals. The transmission/reception switch 1102 switches to one between an operation of inputting high-frequency signals which are transmitted from the terminal equipments 1002 and 1003 and received by the wireless base station antennas 1001 to the reception unit 16 and an operation of outputting signals transmitted from the transmission unit 7 to the plurality of wireless base station antennas 1101. Accordingly, the wireless base station antennas 1101 can be commonly used for transmission and reception.

The reception units 16 convert the high-frequency signals received by the plurality of wireless base station antennas 1101 into complex digital base band signals including I signals and Q signals after analog/digital conversion to which orthogonal detection has been performed and output the complex digital base band signals to the spatial multiplexing separation unit 17. The spatial multiplexing separation unit 17 removes/suppresses an interference signal from the plurality of complex digital base band signals when there is a spatial multiplexing signal transmitted from a desired terminal equipment or other terminal equipment. When there is not a spatial multiplexing signal, the spatial multiplexing separation unit synthesizes a desired signal from the plurality of complex digital base band signals such that the desired signal has the maximum power and outputs the desired signal.

The data extracting unit 18 performs a modulation process and a decoding process on the output from the spatial multiplexing separation unit 17, whereby restoring the desired signal into reception data series. The restored reception data series is output to another device through the output unit 19, or the information on the restored reception data series is delivered to a user using the terminal. The interference cancellation capability information measuring unit 2101 measures the interference capability information on the basis of the output from the data extracting unit and preserves the result of the measurement in the interference cancellation capability information data maintaining unit 20. The information to be transmitted by the wireless base station 1001 is transmitted from the data input unit 22, passes through the transmission data frame generating unit 5, the transmission unit 7, and the transmission/reception switch 1102, and transmitted through the wireless base station antennas 1101.

Figure 16:
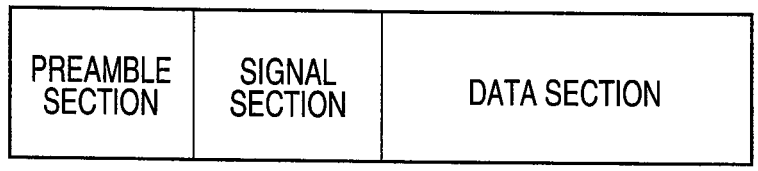
FIG. 16 is a diagram showing a frame format of a transmission packet as a configuration of a transmission data frame.

Here, the transmission data frame generating unit 5 generates transmission data frame series and transmits the transmission data frame series to the transmission units 7. FIG. 16 is a diagram showing a frame format of a transmission packet as a configuration of a transmission data frame. The transmission data frame obtained by adding a preamble part including known pilot signal series and a signal section including signaling data series which are encoded and modulated notice information (signaling) from the base station system to a data part including transmission data series. Each transmission unit 7 performs digital/analog conversion on the transmission data frame series signal which is modulation symbol data of the base band and performs an amplification process on the converted transmission data frame series signal with a band being limited. Thereafter, each transmission unit outputs a high-frequency signal on which frequency conversion into the carrier frequency band has been performed through the transmission/reception switch 1102 to the wireless base station antenna 1101.

Figure 17:
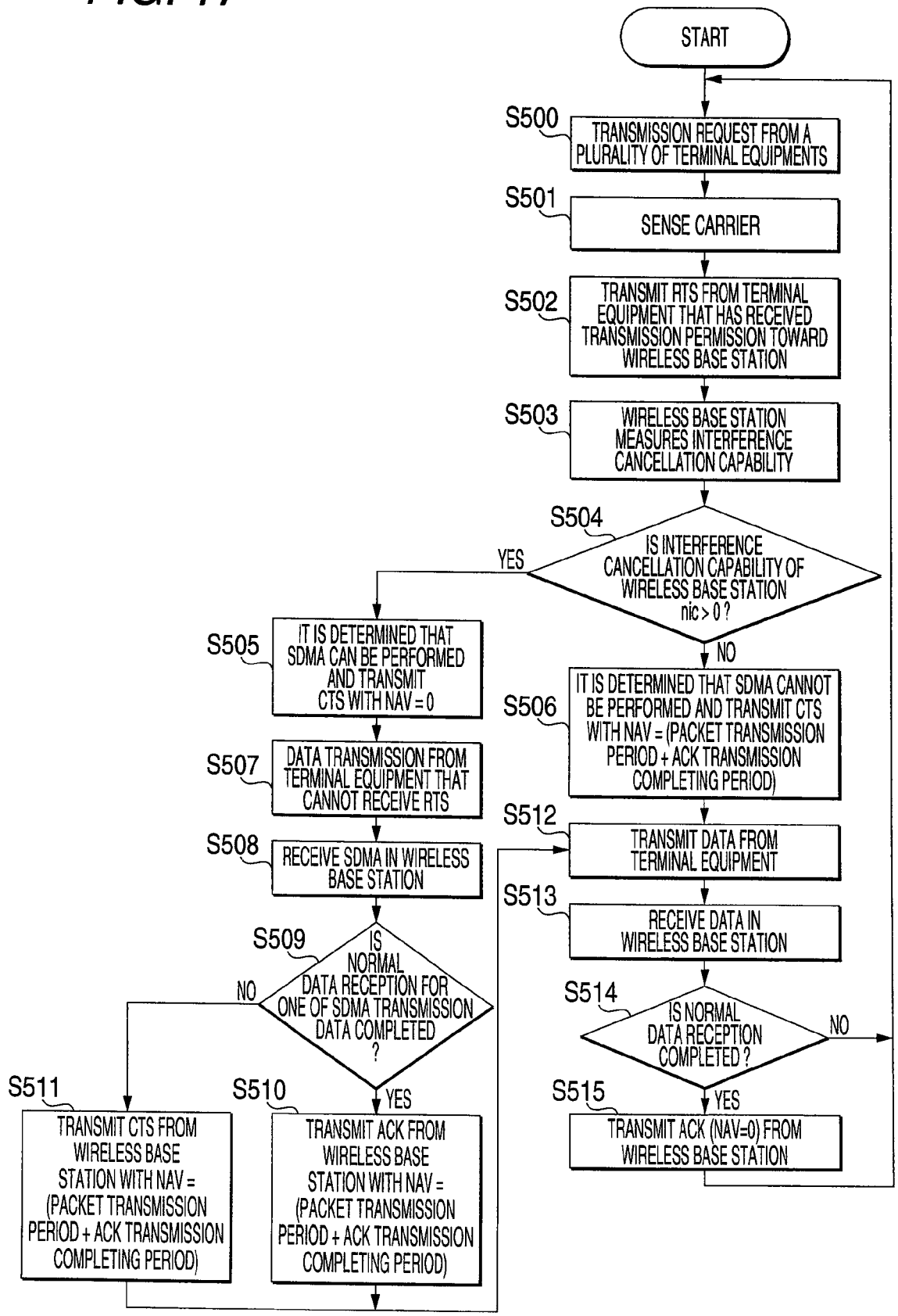
FIG. 17 is a flowchart showing detailed communication operations between the wireless base station and the terminal equipments according to Embodiment 4 of the present invention.
Figure 18:
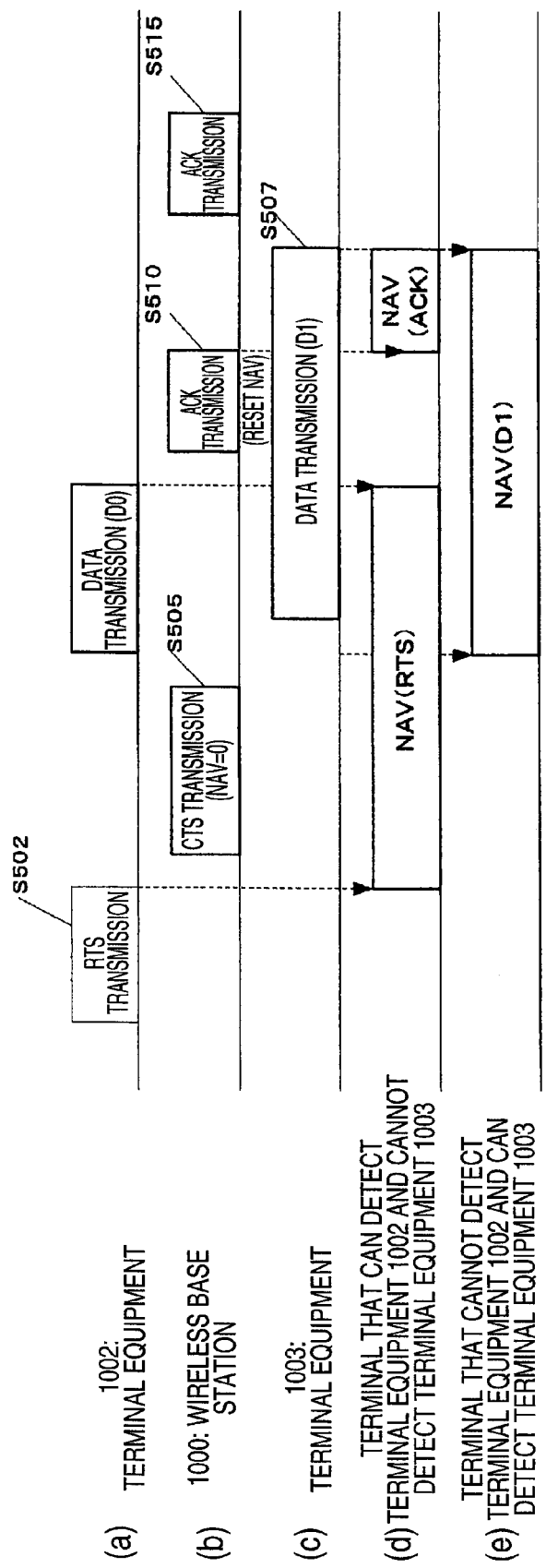
FIG. 18 is a schematic diagram of communication sequence in the operations shown in FIG. 17.

FIG. 17 is a flowchart showing detailed communication operations between the wireless base station and the terminal equipments according to Embodiment 4. FIG. 18 is a schematic diagram of communication sequence in the operations shown in FIG. 17. Hereinafter, the operations will be described with reference to FIGS. 17 and 18.

At first, as an example of the plurality of terminal equipments (here, as an example, the terminal equipment 1002 and the terminal equipment 1003) performs a send request of a wireless signal to the wireless base station 1001 (S500). The terminal equipments 1002 and 1003 checks whether it is possible to send a wireless signal to the wireless base station 1001 by performing carrier sensing (S501). Here, a case where the terminal equipment 1002 acquires a right to send a wireless signal to the wireless base station 1001 on the basis of CSMA/CA by exchanging wireless signals (RTS signal and CTS signal) and the terminal equipment 1003 is in a send standby mode. The terminal equipment 1002, as shown in FIG. 14, sends an RTS (Request To Send) signal to the wireless base station 1001 (S502).

Figure 19A:
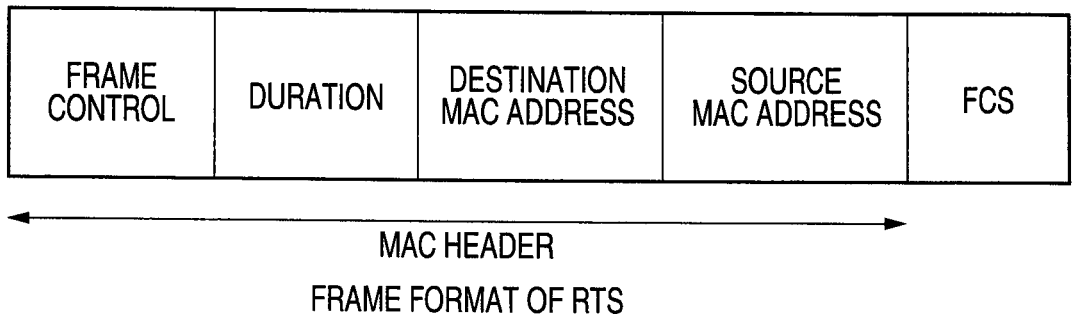
FIG. 19(a) is a diagram showing a configuration of a frame format of an RTS signal.
Figure 19B:
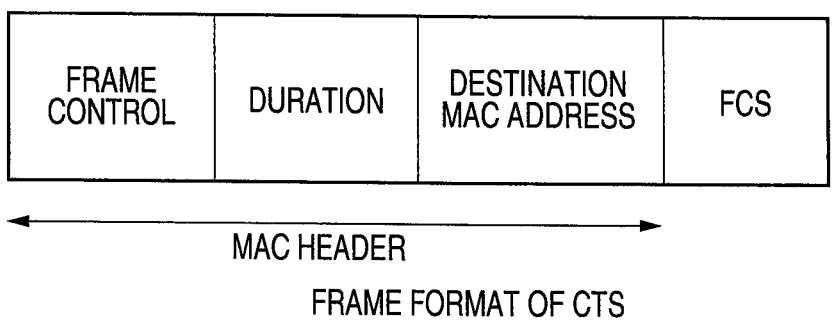
FIG. 19(b) is a diagram showing a configuration of a frame format of a CTS signal.

FIG. 19(*a*) is a diagram showing a configuration of a frame format of an RTS signal. An MAC header of the RTS signal includes a frame control field, a duration field, a destination MAC address, a source MAC address. After the MAC header, a FCS (Frame Check Sequence: frame error check) field is followed. In the duration field of the MAC header, a period, called NAV (Network Allocation Vector), during which transmission from other terminals are prohibited is described. Wireless base stations 1001 other than the wireless base station 1001 that has received the RTS signal or the terminal equipment 1003 stop the transmission of a wireless signal during the period described in the NAV. In the destination MAC address, an MAC address (here, the MAC address of the wireless base station 1001) that is a destination address of the RTS signal is described. In the source MAC address, an MAC address (here, the MAC address of the terminal equipment 1002) of a terminal equipment that sends the RTS signal is described.

In the wireless base station 1001 that has received the RTS signal, the interference cancellation capability information measuring unit 2101 measures interference cancellation capability of the wireless base station 1001 using the output of the data extracting unit 18 (S503). The interference cancellation capability information measuring unit 2101, at first, measures the number of transmission antennas used by the terminal equipment 1002 for wireless signals. As a method of measuring the number of transmission antennas ntx used by the terminal equipment 1002 for the transmission of wireless signals, the following methods can be used.

(1) a method in which the terminal equipment 1002 informs the number of antennas used by the terminal equipment 1002 for wireless signals to the wireless base station 1001 in advance in the authentication of a terminal performed before starting the wireless data communication and the number of transmission antennas is referenced at a time when the RTS signal is received (2) a method in which the number of transmission antennas used in previous communication session is stored and the stored number of the transmission antennas is referenced at a time when the RTS signal is received (3) a method in which the number of transmission antennas is written in a header part in the physical layer of the RTS signal and the transmission antenna number information is read by a reception side (4) a method in which the terminal equipment 1002 describes the number of transmission antennas in a header in the MAC layer of the RTS signal to be sent and the interference cancellation capability information measuring unit 2101 reads the number of the transmission antennas Next, the interference cancellation capability information measuring unit 2101 estimates the number of antennas nrx of the wireless base station 1001 required to receive the wireless signals from the terminal equipment 1002. As an example of the estimation method of the number of the antennas nrx required for the reception, the following methods can be applied.

(1) a method in which a value predetermined in advance that is equal to or greater than the number of transmission antennas used by the measured terminal equipment 1002 for the transmission is set to the number of antennas required for the reception (2) a method in which a signal to interference noise power ratio (SINR: Signal-to-Interference plus Noise Power Ratio) is calculated from a reception signal and the minimal number of reception antennas satisfying the required SINR is set to the number of antennas required for the reception Next, the interference cancellation capability information measuring unit 2101 calculates the interference cancellation capability information nic in accordance with "Equation 21."

$$nic = nrx - ntx \qquad \text{[Equation 21]}$$

The interference cancellation capability information nic indicates the capability of the wireless base station 1001 for receiving wireless communication signals from other terminal equipments 1003 and is stored in the interference cancellation capability information data maintaining unit 20.

Next, in the wireless base station 1001, the transmission data frame generating unit 5 determines whether the interference cancellation capability information nic is greater than "0" (S504). Here, when the interference cancellation capability information nic is equal to or greater than "1," it is determined that the SDMA can be performed, and thus, the wireless base station sends a signaling of giving a chance for transmission to other terminal equipment 1003 by transmitting a CTS signal for permitting the SDMA (S505). On the other hand, when the interference cancellation capability information nic is "0," it is determined that the SDMA cannot be performed, and thus, the wireless base station sends a signaling of not giving a chance for transmission to other terminal equipment 1003 by transmitting a CTS signal for prohibiting the SDMA (S506).

When interference cancellation capability information nic is equal to or greater than "1" and thus, the SDMA can be performed, the wireless base station 1001 can receive a wireless signal from other terminal equipment using the interference cancellation capability of nic along with a wireless signal from the terminal equipment 1002 during receiving the wireless signal from the terminal equipment 1002. Accordingly, in the step S505, the wireless base station 1001 performs the following process for implementing the SDMA in CSMA/CA. In other words, the wireless base station 1001 that has received the RTS signal transmits a CTS (Clear To Send) signal to the terminal equipment 1002 that has sent the RTS signal for signaling that a wireless signal can be received.

FIG. 19(*b*) is a diagram showing a configuration of a frame format of a CTS signal. An MAC header of the CTS signal includes a frame control field, a duration field, and a destination MAC address. In the duration field of the MAC header of the CTS signal, a period during which transmission from other terminals and the wireless base station 1001 are prohibited is described as a NAV, like the RTS signal. In the destination MAC address, an MAC address (here, the MAC address of the terminal equipment 1002) of a terminal equipment that sends the RTS signal is described. Here, the wireless base station 1001 transmits a CTS signal in which the value of NAV is set to "0" when nic wireless signals can be received along with the wireless signal from the terminal equipment 1002, that is, when nic is not "0."

On the other hand, when the interference cancellation capability information nic is "0" and thus, the SDMA cannot be performed, the wireless base station 1001 performs the following process so as not to perform the SDMA in CSMA/CA in the step S506. When the wireless base station 1001 that has received the RTS signal notifies that a wireless signal can be received to the terminal equipment 1002 that has sent the RTS signal, the wireless base station 1001 transmits a CTS signal with a new NAV setting value set to a period obtained by adding an ACK transmission completing period (or CTS transmission completing period) to a packet transmission period of the terminal equipment that has not completed data transmission. Accordingly, the access from terminal equipments (terminal equipment 1003, etc.) other than the terminal equipment 1002 can be prohibited only for the period that the data transmission is being completed.

Figure 20:
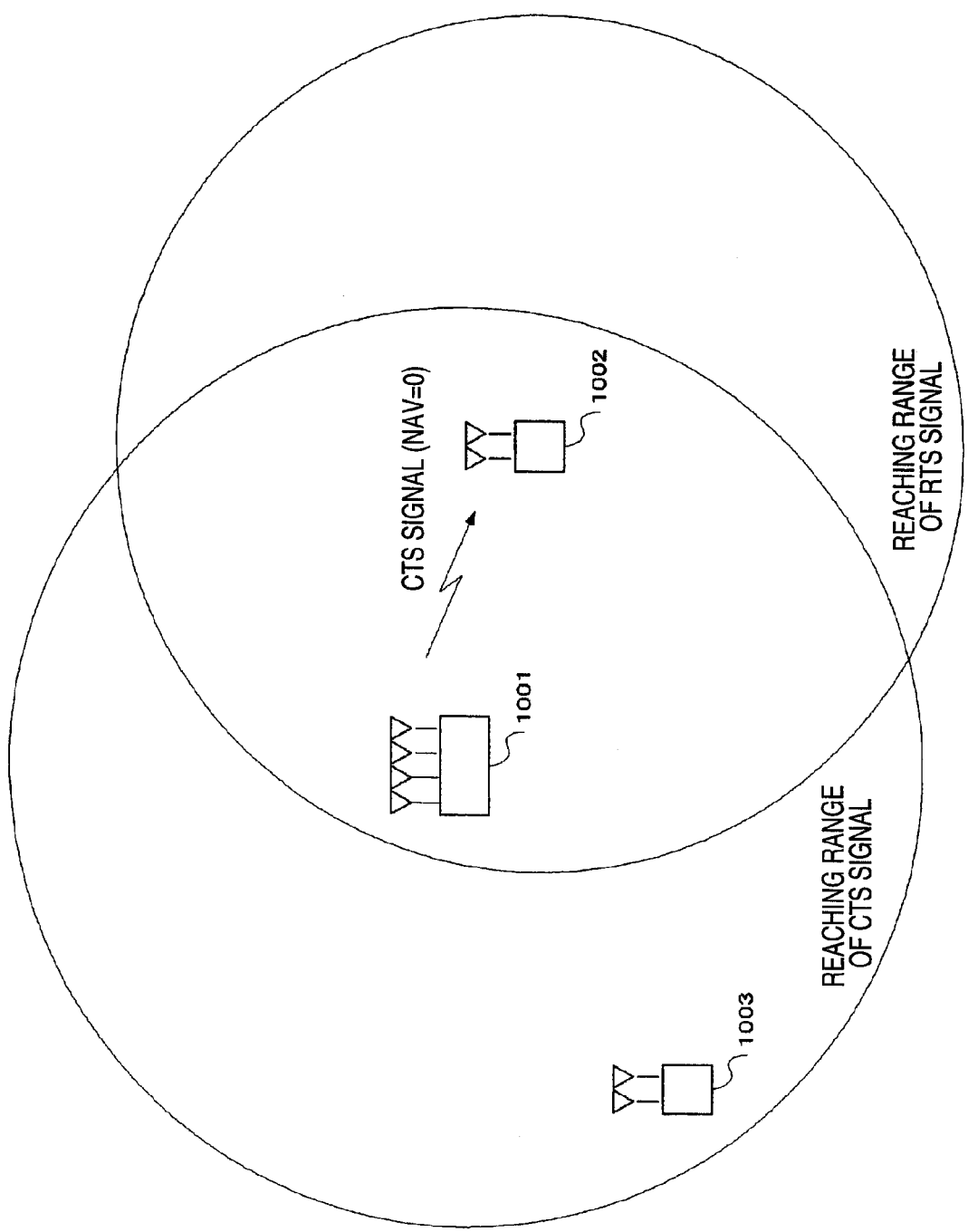
FIG. 20 is a diagram showing a disposition of a wireless base station and a terminal equipment 1 and a status in the transmission of a CTS signal according to Embodiment 4 of the present invention.

FIG. 20 is a diagram showing a disposition of the wireless base station 1001 and the terminal equipments 1002 and 1003 and a status in the transmission of a CTS signal according to Embodiment 4. Here, it is assumed that the wireless base station 1001 is in a status that the SDMA can be performed after the step S505 and the value of NAV of the CTS signal is "0." The terminal equipments (in FIG. 20, terminal equipments (not shown) in the range that the RTS signal can reach) that have received the RTS signal are prohibited from transmission during a period of NAV described in the RTS signal (See FIGS. 18 (*a*) and (*d*)). On the other hand, since the terminal equipments (in FIG. 20, terminal equipments 1002 and 1003 in the range that the CTS signal reaches) that has received the CTS signal have an NAV value of "0," the terminal equipments are not prohibited from transmission (See FIGS. 18 (a) and (c)). In other words, the terminal equipment 1003 that receives the CTS signal and does not receive the RTS signal can transmit a wireless signal to the wireless base station 1001. Accordingly, the data transmission to the wireless base station 1001 is performed from the terminal equipment 1003 that cannot receive the RTS signal (S507).

In other words, while terminal equipments located in such near positions that the RTS signal from a terminal equipment can be received are prohibited from transmission, a plurality of terminal equipments which are in the range that the CTS signal from the wireless base station can be received are permitted for data transmission, whereby SDMA communication in an upward direction is implemented.

As described above, the wireless base station 1001 separately receives the transmission signals spatially-multiplexed in accordance with SDMA from the terminal equipments 1002 and 1003 using a plurality of antennas (S508). In this case, since the plurality of terminal equipments that perform data transmission at the same time stand spatially apart from one another to some degree, the separation process of the reception data in the wireless base station 1001 can be easily performed.

When data transmission from one terminal equipment has been completed, it is determined whether the data extracting unit 18 has been able to normally receive data, included in the transmitted data in accordance with SDMA, which is transmitted from the terminal equipment (S509). Here, when the data from the terminal has been able to be correctly received, the transmission data frame generating unit 5 sends an ACK signal (S510). On the other hand, when the data from the terminal has not been able to be correctly received, the transmission data frame generating unit 5 sends a CTS signal (S511).

Figure 19C:
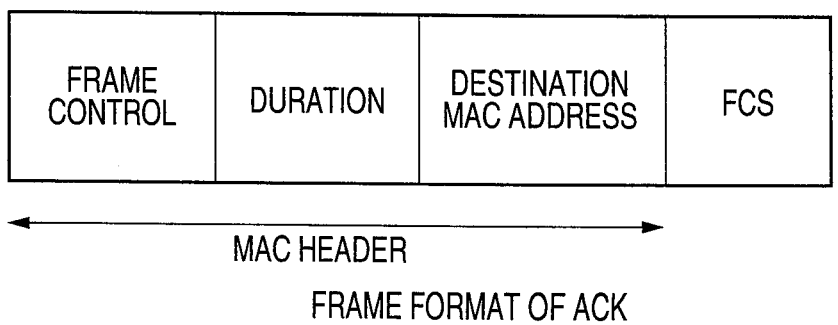
FIG. 19(c) is a diagram showing a configuration of a frame format of an ACK signal.

FIG. 19(c) is a diagram showing a configuration of a frame format of an ACK signal. An MAC header of the ACK signal includes a frame control field, a duration field, and a destination MAC address. In the duration field of the MAC header of the ACK signal, a time during which transmission from other terminals and the wireless base station 1001 are prohibited is described as a NAV, like the RTS signal. In the destination MAC address, an MAC address (here, the MAC address of the terminal equipment 1002 or 1003) of a terminal equipment that sends data is written.

In the steps S510 or S511, like the RTS signal, in the duration field of the MAC header of the ACK signal (or CTS signal), a time during which the transmission of other terminal equipments and the wireless base station 1001 is prohibited is described as NAV. However, in this case, a new NAV setting value is set to a period obtained by adding an ACK transmission completing period (or CTS transmission completing period) to a packet transmission period of the terminal equipment that has not completed data transmission.

In the embodiment, as shown in FIG. 18, by setting the NAVs of the RTS signal, the CTS signal, and the ACK signal appropriately, the transmission from terminal equipments that can receive the CTS signal from the wireless base station is permitted while the transmission of other terminal equipments that can receive the RTS signal from a terminal equipment is prohibited, whereby SDMA communication in an upward direction is implemented. S502 and the like shown in FIG. 18 correspond to the steps shown in FIG. 17.

At this time, the access from a terminal equipment (hidden terminal equipment from the terminal equipment 1002 or hidden terminal equipment from the terminal equipment 1003) located in the range that a transmission signal from the terminal equipment 1002 or the terminal equipment 1003 cannot reach can be prohibited for the period that the data transmission is being completed (See FIGS. 18 (d) and (e)).

In addition, the wireless base station 1001 proceeds the data transmission and data reception from spatially multiplexed terminal equipments when transmitting the ACK signal (or CTS signal) (S512, S513), and the wireless base station determines whether data can be received normally in the data extraction unit 18 when the data transmission from the terminal equipments is completed finally (S514). When the normal data reception is performed, the NAV is set as NAV=0, and the wireless base station sends an ACK signal (S515).

Figure 21:
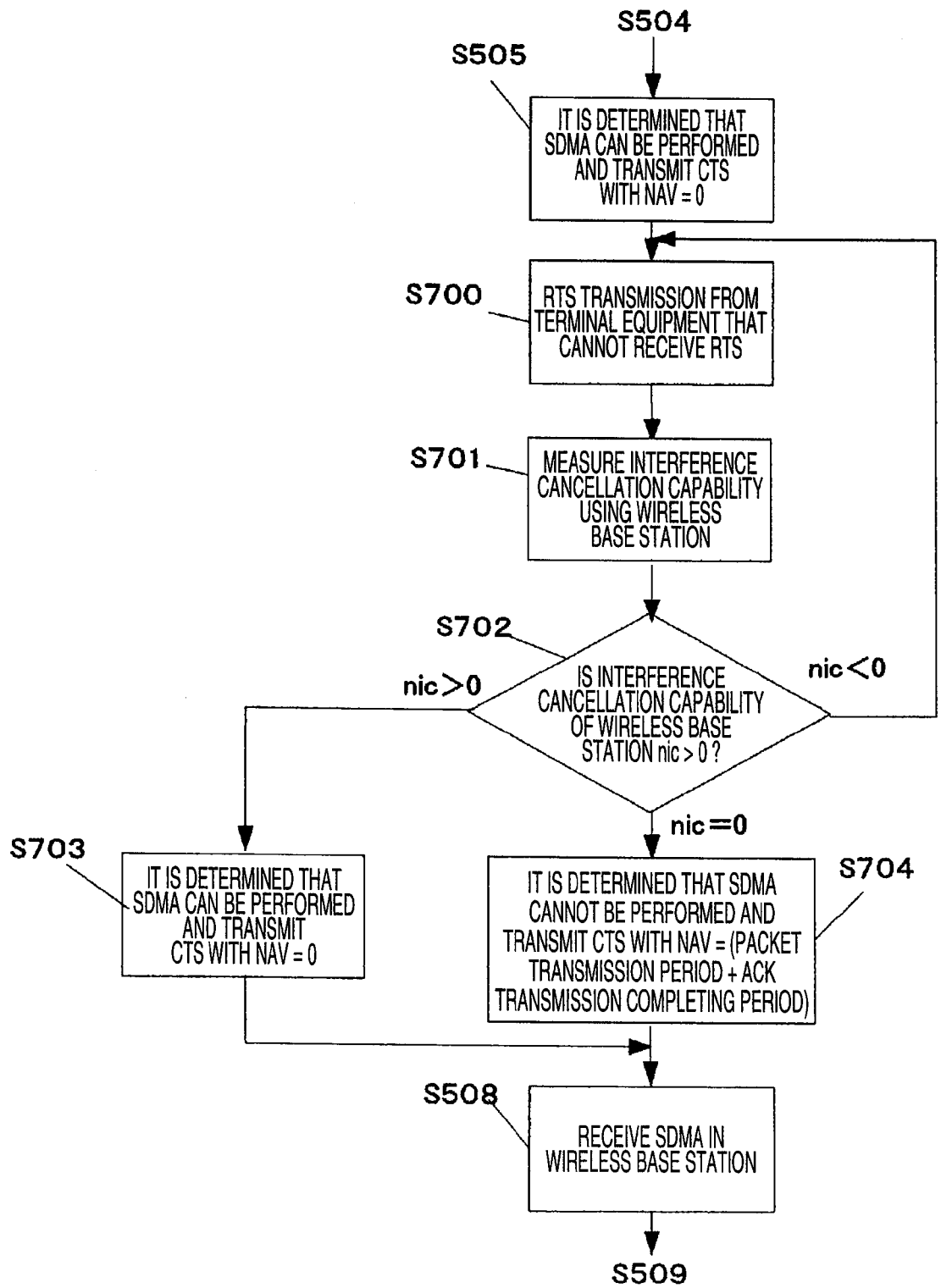
FIG. 21 is a flowchart showing a sequence of communication operations between a wireless base station and a terminal equipment according to a first modified example of Embodiment 4.

Alternatively, a technique other than a flowchart shown in FIG. 17 may be applied. FIG. 21 is a flowchart showing a sequence of communication operations between the wireless base station and the terminal equipment according to a first modified example. FIG. 21 shows only extracted parts different from the operations of the flowchart shown in FIG. 17. Hereinafter, the operation of a first modified example will be described with reference to FIG. 21. In the first modified example, the parts different from the sequence shown in FIG. 17 are operations S505 and thereafter.

In the step S505, when a terminal equipment 1003 that cannot receive an RTS signal from the terminal equipment 1002 accesses for SDMA connection after a CTS signal is transmitted from the wireless base station 1001 with NAV=0, the wireless base station sends an RTS signal, at first (S700). Accordingly, new accesses from terminal equipments (that is, hidden terminals from the terminal equipment 1001 and the terminal equipment 1002) that cannot receive signals from the terminal equipment 1001 and the terminal equipment 1002 can be prohibited. Next, the wireless base station 1001 that has received the RTS signal from the terminal equipment 1003 measures the interference cancellation capability that the wireless base station 1001 has using the output of the data extraction unit 18 in the interference cancellation capability information measuring unit 2101 (S701). The interference cancellation capability information measuring unit 2101, at first, measures the number of transmission antennas required to receive the signals from the terminal equipment 1002 and the terminal equipment 1003.

Next, the interference cancellation capability information measuring unit 2101 performs the determination described below for a value of the interference cancellation capability information nic on the basis of the measured cancellation capability information nic using the transmission data frame generating unit (S702). Then, the interference cancellation capability information measuring unit 2101 generates a transmission data frame to perform CTS transmission or waits for the CTS transmission on the basis of the determination result.
(1) When the interference cancellation capability information nic is larger than "1," the wireless base station permits SDMA by sending a CTS with the NAV set as NAV=0 and performs signaling to other terminal equipments (S703).
(2) When the interference cancellation capability information nic is "0," the wireless base station determines that SDMA with the terminal equipment 1003 can be performed but SDMA cannot be performed further, and accordingly, the wireless base station performs a process (S704) for not providing a chance for transmission from other terminal equipments. In other words, the CTS signal is transmitted with the NAV set to (packet transmission period+ACK transmission completing period).
(3) When the interference cancellation capability information nic is less than "0," the wireless base station 1001 determines that SDMA with the terminal equipment 1002 and the terminal equipment 1003 cannot be performed and waits for a connection request from other terminal equipment without transmitting a CTS signal (step S700).

The operations thereafter are the same as those shown in FIG. 17, and thus, the description thereof is omitted. By the operations of the first modified example, although there is an SDMA request from a terminal equipment requiring interference cancellation capability of more than an assumed level, the connection is not permitted by adding the operation of a step S702, whereby the deterioration of communication quality between the terminal equipment 1001 with which the wireless base station has been communicated and the wireless base station does not happen.

Figure 22:
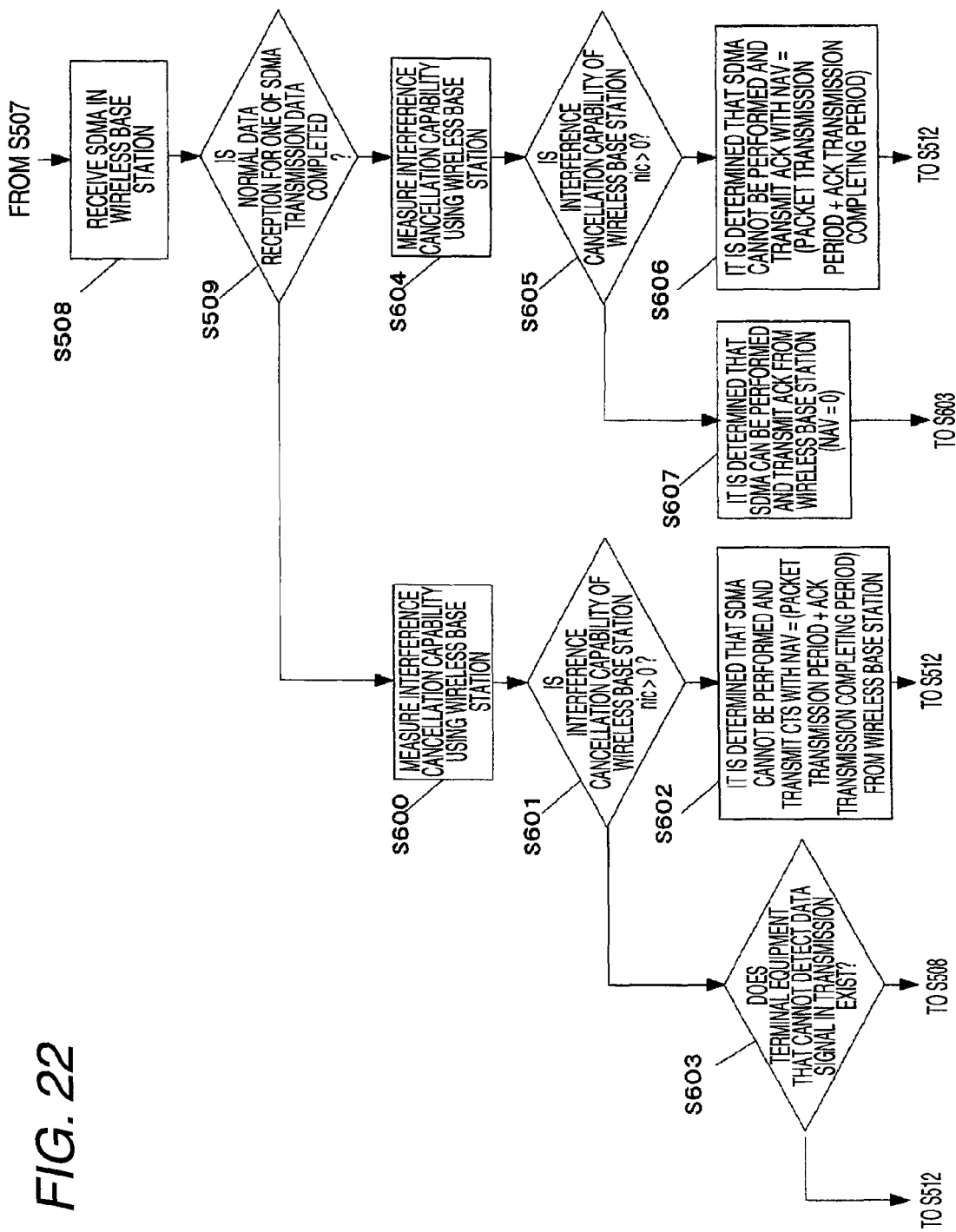
FIG. 22 is a flowchart showing a sequence of communication operations between a wireless base station and a terminal equipment according to the second modified example of Embodiment 4.

A second modified example, as a different technique, which is different from the flowchart shown in FIG. 17 is shown in FIG. 22. FIG. 22 is a flowchart showing a sequence of communication operations between the wireless base station and the terminal equipment according to the second modified example. FIG. 22 shows only extracted parts different from the operations of the flowchart shown in FIG. 17. Hereinafter, the operation of the second modified example will be described with reference to FIG. 22. In the second modified example, the parts different from the sequence shown in FIG. 17 are operations S509 and thereafter.

In the step S509, when the transmission of data, included in data transmitted in accordance with SDMA, from one terminal equipment is completed, the operations as below are performed on the basis of whether the data from the terminal equipment could be normally received.

When data could be received correctly from the terminal equipment, the wireless base station system sends an ACK signal. However, before the transmission of the ACK signal, the wireless base station system measures the interference cancellation capability of the wireless base station 1001 for the reception of data from a terminal equipment for which data transmission has not been completed (S604). Then, the wireless base station 1001 determines whether the interference cancellation capability nic has a positive value (S605). When the interference cancellation capability nic is equal to or greater than "1," it is determined that SDMA transmission can be performed, and thus, the wireless base station 1001 sends an ACK signal with NAV=0 (S607). Then, it is determined whether there is a terminal equipment (hidden terminal equipment) that the transmission signal from the terminal equipment which has been communicated with the wireless base station system cannot be received (S603). By this operation, when there is a terminal equipment that the transmission signal from the terminal equipment which has been communicated with the wireless base station system cannot be received, the data transmission form the terminal equipment is permitted, and thus, the SDMA reception of the wireless base station 1001 can be performed again (S508).

On the other hand, in the step S605 when the interference cancellation capability nic=0 and thus, it is determined that SDMA can not be performed, the ACK signal is sent with new NAV setting value set to a period obtained by adding an ACK transmission completing period to a packet transmission period of the terminal equipment that has not completed data transmission (S606). By this operation, the access from a terminal equipment (hidden terminal equipments from the terminal equipment 1002 or hidden terminal equipments from the terminal equipment 1003) located in the range that a transmission signal from the terminal equipment 1002 or the terminal equipment 1003 cannot reach can be prohibited for the period that the data transmission is being completed.

When data could not be received correctly from the terminal equipment in the step S509, the wireless base station system measures the interference cancellation capability of the wireless base station 1001 for the reception of data from a terminal equipment for which data transmission has not been completed (S600). Then, the wireless base station determines whether the interference cancellation capability nic has a positive value (S601). When the interference cancellation capability nic is equal to or greater than "1," it is determined that SDMA transmission can be performed, and thus, the process proceeds to the step S603 without sending a CTS signal, and it is determined whether there is a terminal equipment (hidden terminal equipment) that the transmission signal from the terminal equipment which has been communicated with the wireless base station system cannot be received. By this operation, when there is a terminal equipment that the transmission signal from the terminal equipment which has been communicated with the wireless base station system cannot be received, the data transmission form the terminal equipment is permitted, and thus, the SDMA reception of the wireless base station 1001 can be performed again (S508).

On the other hand, in the step S601 when the interference cancellation capability nic=0 and thus, it is determined that SDMA can not be performed, the CTS signal is sent with new NAV setting value set to a period obtained by adding an ACK transmission completing period to a packet transmission period of the terminal equipment that has not completed data transmission (S602). By this operation, the access from a terminal equipment (hidden terminal equipments from the terminal equipment 1002 or hidden terminal equipments from the terminal equipment 1003) located in the range that a transmission signal from the terminal equipment 1002 or the terminal equipment 1003 cannot reach can be prohibited for the period that the data transmission is being completed.

As described above, according to Embodiment 4, the wireless base station 1001 determines whether SDMA can be performed on the basis of the interference cancellation capability information that indicates the remaining capability of interference cancellation of the plurality of antennas included in the wireless base station 1001. When there is remaining capability in the interference cancellation capability, a CTS signal or an ACK signal is transmitted with the NAV value of the CTS signal or the ACK signal set to "0" so as to permit the SDMA for other terminal equipments. Accordingly, the terminal equipment 1002 and the terminal equipment 1003 can simultaneously transmit wireless signals, and consequently, the throughput of the whole system can be improved.

In a case where a terminal equipment performs transmission using an RTS signal, there are many cases that the transmission of a long packet of which size is larger than a predetermined value is performed, and thus, the base station system is shared by one terminal equipment for a long time and other terminal equipments cannot access the base station system, thereby increasing the standby time. Regarding this problem, since the SDMA can be performed in the wireless base station 1001 on the basis of the interference cancellation capability information in the embodiment, it is possible to correct the above-described unfairness in the transmission chance.

By the exchange of an RTS signal and a CTS signal which is specified in general wireless LAN standards (IEEE802.11a, 11b, and 11g), the terminal equipment can implement the SDMA with the wireless base station 1001. Accordingly, the compatibility with WLAN terminal equipments that are currently available in the market is not damaged, and accordingly, there is a merit that the system can be built at a low cost.

In Embodiment 4, when there is remaining capability in the interference cancellation capability, the NAV setting value is set to "0" so as to permit the SDMA for other terminal equipments, but the NAV setting value may be set to a predetermined value larger than "0." In this case, the time for the reception of a preamble part in the wireless base station 1001 is set to an estimated value so as to avoid the preamble part included in a wireless signal transmitted from the terminal equipment 1002. Accordingly, the reception process of a preamble part in a transmitted wireless signal in the wireless base station 1001 can be performed in a status that there is not an interference signal from other terminal equipments. Accordingly, the operations (processes for AGC, AFC, FFT time synchronization, channel estimation value, and equalization) for a reception process required for data decoding which is performed using a signal of the preamble part can be performed stably, whereby the advantage that the deterioration of reception performance for the terminal equipment 1002 is suppressed is acquired.

According to Embodiment 4, the SDMA is performed with terminal equipments that are located in the range that the RTS signal transmitted from a terminal equipment cannot be received or with terminal equipments that cannot receive a signal from a terminal that has performed data transmission, that is, the SDMA is performed between terminal equipments which are in a positional relationship that the one terminal equipment is hidden from the other terminal equipment. This means that the request for SDMA transmission from an adjacently located terminal equipment is blocked and acts very advantageously in a case where spatial interference cancellation using a plurality of antennas is performed in the wireless base station 1001. When the SDMA is performed between terminal equipments in spatially adjacent locations, the spatial correlation becomes high, and a case where sufficient interference cancellation capability can not be ensured may occur. However, in the embodiment, the case can be avoided in advance, thereby the improvement of the system capacity can be achieved stably.

In Embodiment 4, the wireless base station 1001 may describe the interference cancellation capability information in the CTS signal to be transmitted. Accordingly, the terminal equipment that receives the CTS signal can determine the number of transmission antennas on the basis of the interference cancellation capability information.

In Embodiment 4, the wireless base station 1001 may configure a synchronization reference signal to be included in the CTS signal to be transmitted. Accordingly, the terminal equipment 1002 and the terminal equipment 1003 can synchronize the timing for the transmission of wireless signals to the wireless base station 1001, and thus, the wireless base station 1001 is not required to perform synchronization detection for each terminal equipment when receiving the SDMA. Therefore, a reception process can be performed on the basis of the synchronization in the terminal equipment 1001 that is connected in a status that there is not an interference signal. Accordingly, simplification of the configuration of the wireless base station 1001 can be achieved and improvement of the reception performance thereof can be achieved.

In Embodiment 4, although a configuration in which the value of the NAV of the CTS signal is set to "0" on the basis of the interference cancellation capability information, the interference cancellation capability information may be included in polling signals that are transmitted on a regular time base from the wireless base station 1001. Accordingly, terminal equipments adjacent to the wireless base station 1001 can acquire the interference cancellation capability information of the wireless base station 1001.

In Embodiment 4, the wireless base station 1001 may describe the interference cancellation capability information in the ACK signal to be transmitted. Accordingly, the terminal equipment that receives the ACK signal can determine the number of transmission antennas on the basis of the interference cancellation capability information.

In Embodiment 4, the wireless base station 1001 may configure a synchronization reference signal to be included in ACK signal to be transmitted. Accordingly, the terminal equipment 1002 and the terminal equipment 1003 can synchronize the timing for the transmission of wireless signals to the wireless base station 1001.

Embodiment 5

A wireless base station 1301 in Embodiment 5 includes a configuration for detecting/receiving a wireless signal transmitted from a second terminal equipment 1303 while communicating with a first terminal equipment 1302. Hereinafter, description for parts common to Embodiments 4 and 5 is omitted, and only the configuration of the wireless base station for detecting/receiving a wireless signal transmitted from a second terminal equipment during communication between the first terminal equipment and the wireless base station will be described.

Figure 23:
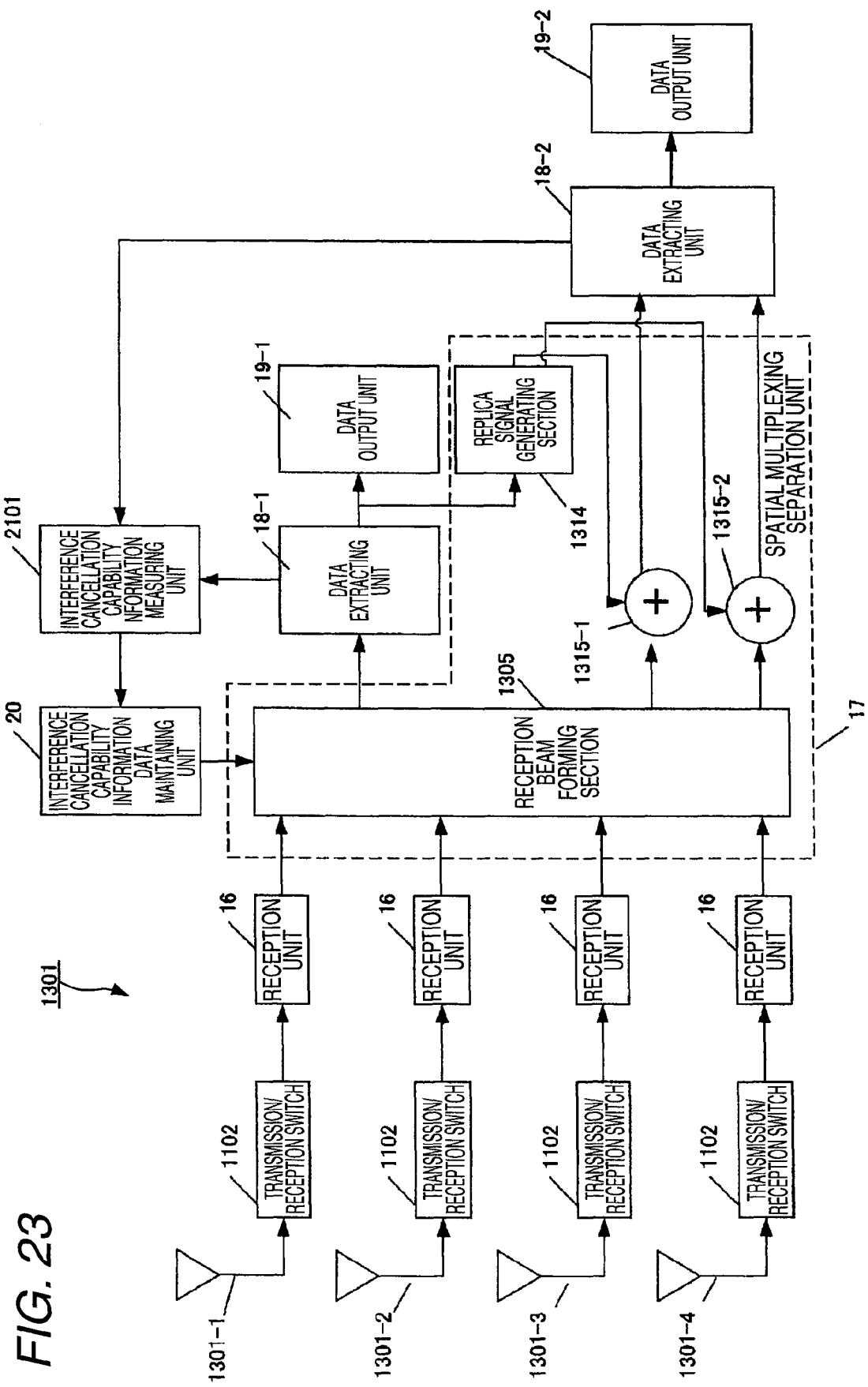
FIG. 23 is a diagram showing a configuration of a wireless base station according to Embodiment 5 of the present invention.

FIG. 23 shows a configuration of the wireless base station 1301 according to Embodiment 5. The wireless base station 1301 is assumed to have four wireless base station antennas. In addition, it is assumed that the first terminal equipment 1302 has transmitted a wireless signal using two transmission antennas. The signals transmitted from a plurality of (here, two) transmission antennas may be transmitted using spatial multiplexing transmission transmitting different data series or may be transmitted using transmission diversity transmission transmitting the same data series. Although it is configured that the number of wireless base station antennas in the wireless base station 1301 is four and the number of transmission antennas of the first and second terminal equipments 1302 and 1303 is two, but the embodiment is not limited thereto. In the embodiment, the number of terminal equipments is described as two, but the embodiment is not limited thereto and may be applied to a case where two or more terminal equipments are used.

The wireless base station 1301 receives signals transmitted from two transmission antennas of the first terminal equipment 1302 in four wireless base station antennas 1311-1 to 1311-4. The transmission/reception switches 1102 respectively input high-frequency signals received in the wireless base station antennas 1101 to the reception units 16. The reception units 16 convert each high-frequency signal received in the plurality of wireless base station antennas 1101 into a complex digital base band signal including orthogonally detected I and Q signals after analog/digital conversion and respectively output the complex digital base band signal to the spatial multiplexing separation unit 17.

The spatial multiplexing separation unit 17 includes a reception beam forming section 1305, a replica signal generating section 1314, and a subtractor 1315. The spatial multiplexing separation unit 17 removes/suppresses interference signals from the input plurality of complex digital base band signals when there is a spatial multiplexing signal transmitted from a desired terminal equipment or other terminal equipments. On the other hand, when there is not a spatial multiplexing signal, the spatial multiplexing separation unit 17 synthesizes a desired signal from the plurality of complex digital base band signals such that the desired signal has the maximum power and outputs the desired signal.

Hereinafter, the operation of the spatial multiplexing separation unit 17 will be described in detail. Hereinafter, operations after an AGC process, a frequency synchronization process, a frame synchronization process, and a symbol synchronization process which use known pilot signals included in the preamble sections of the transmitted signals are completed will be described.

The reception beam forming section 1305 of the spatial multiplexing separation unit 17 acquires a channel estimation value using a pilot signal of a preamble part of a signal transmitted from the first terminal equipment.

Here, a reception signal vector y(k) in the wireless base station 1301 at discrete time k obtained by passing a transmission series vector $x(k)=[x_1(k), \ldots, x_{nt}(k)]^T$ including transmission series $x_n(k)$ which are transmitted from Nt antennas of the first terminal equipment 1302 through a flat fading propagation channel is represented as "Equation 22" shown below.

$$y(k)=H_1(k)x(k)+I(k)+n(k) \quad \text{[Equation 22]}$$

The super subscript T of x(k) is a vector transpose operator, and y(k) in "Equation 22" is a column vector including as elements reception signals in N wireless base station antennas 1311 which are used for reception and a signal $y_m(k)$ received in the wireless base station antennas 1311-1 becomes the m-th element.

$H_1$ is a channel response matrix representing a change in the propagation channel which is received by transmission series x(k) of the desired first terminal equipment 302. Here, $H_1$ is a matrix including the row N of the number of the wireless base station antennas X the column of the number Nt of transmission antennas of the desired first terminal equipment 1, and a matrix element $h_{ij}$ at the i-th row and j-th column represents the change in the propagation channel for a case where a signal $x_j(k)$ transmitted from the j-th transmission antenna of the desired first terminal equipment 1302 is received in the i-th wireless base station antenna 1311-i of the wireless base station 1301. In addition, n(k) is an added noise component vector at a time of reception in N wireless base station antennas 1311 of the wireless base station 1301.

I(k) is an interference signal component which is transmitted from the second terminal equipment. When the SDMA is not permitted, a transmission signal from the second terminal equipment dose not exist, and accordingly, I(k)=0.

The reception signal vector y(k) of the wireless base station 1301 described above is input to the spatial multiplexing separation section 17.

The reception beam forming section 1305 of the spatial multiplexing separation unit 17 separately receives transmission series $x_n(k)$ transmitted from the desired first terminal equipment 1 by calculating $WD_n^H y(k)$ using a desired signal separation reception antenna weight $WD_n$. Here, n is a natural number which is equal to or less than Nt, and Nt≥1. When Nt>1, the SDM reception operation for separately receiving a transmission signal which is transmitted using spatial multiplexing from the first terminal equipment 1302 is performed. At this time, "Equation 23" is calculated as the desired signal separation reception antenna weight.

$$WD=H_e R_n^{-1} \quad \text{[Equation 23]}$$

In "Equation 23," WD includes a matrix of N rows×Nt columns, and the n-th row includes $WD_n$. $R_n$ is calculated using "Equation 24" as below. In addition, $H_e$ is an estimated value of the propagation channel response matrix $H_1$ which is received by the transmission series x(k) of the first terminal equipment 1302. The estimated value $H_e$ of the propagation channel response matrix $H_1$ is obtained from known signal series of a training signal section in the packet signal transmitted to the wireless base station. dt is a sampling time interval, $t_0$ is sampling start time, and Ns is the number of sampled data.

[Equation 24]

$$R_n = \frac{1}{Ns}\sum_{k=1}^{Ns} y(t_0 + k \times dt) y^H(t_0 + k \times dt)$$

The above-described method is a signal separation method on the basis of MMSE (Minimum Mean Square Error), but the signal separation method is not limited thereto, and a technique such as a ZF, an MLD (Maximum likelihood Detection) interference canceller, and a MAP (Maximum a Posteriori) demodulator can be applied.

Next, data of the signal separated by the reception beam forming section 1305 is extracted by the data extracting unit 18-1. The data extracting unit 18-1 restores a desired signal to reception data series by performing demodulation and decoding processes on the output from the spatial multiplexing separation unit 17. The reception data series restored by the data extracting unit 18-1 are sent to the data output unit 19-1 in one side, and the reception data series are input to the replica signal generating section 1314 in the other side. The data output unit 19-1 outputs the restored reception data series to another device or a display section of the terminal equipment, whereby the information is delivered to the user using the terminal equipment.

The replica signal generating section 1314 generates replicas of reception signals received by the reception antennas 1311-3 and 1311-4 on the basis of the estimated transmission signal and the propagation channel estimation value "He." Next, the replicas are subtracted from the reception signals by the subtractors 1315-1 and 1315-2. As a result, the signal component transmitted from the first terminal equipment 1302 is not detected from the outputs from the subtractors 1315-1 and 1315-2.

By the above-described operations, even when the second terminal equipment 1303 transmits a wireless signal during the reception of a wireless signal from the first terminal equipment 1302, the wireless signal transmitted from the second terminal equipment 1303 which is spatially multiplexed in accordance with the SDMA can be detected by using the reception antennas 1311-3 and 1311-4 that do not include a signal component of the first terminal equipment 1302. The data extracting unit 18-2 performs data extraction by using the outputs from the subtractors 1315-1 and 1315-2. The extracted data signal is sent to the data output unit 19-2.

According to Embodiment 5, since a signal of the second terminal equipment 1303 can be detected during the reception of a signal from the first terminal equipment 1302, the SDMA between the first terminal equipment 1302 and the second terminal equipment 1303 can be implemented.

Although the spatial multiplexing separation unit 17 has a configuration in which a replica is generated by using the decoding result of the transmission signal from the first terminal equipment 1302 and the transmission signal from the second terminal equipment 1303 is received by subtracting the generated replica from the reception signal, other configurations may be considered. As a modified example, a configuration in which a transmission signal from the second terminal equipment 1303 is received by forming a beam null for minimizing the reception power for the first terminal equipment 1302 for the reception of the transmission signal from the second terminal equipment 1303 by using the reception beam forming unit 1305.

In this case, at first, a correlation matrix $R_n$ for the transmission signal from the first terminal equipment 1302 which is calculated by using "Equation 25" shown below is calculated. Here, δ denotes a noise power estimation value, and $E_{Nt}$ denotes a square matrix with order Nt (where M is the number of antenna branches of the wireless base station 1301). In addition, the noise power estimation value δ is obtained from known signal series of a training signal section in the packet signal transmitted to the wireless base station.

$$R_n = H_e^H H_e + \sigma E_{Nt} \qquad \text{[Equation 25]}$$

Next, an weight vector $WI_n$ of a reception antenna receiving a transmission signal from the second terminal equipment 1303 is calculated, a product sum operation on the weight vector with the reception signal vector y(k) is performed as shown in "Equation 26," and signal components $z_n(k)$ transmitted from the transmission antennas of the second terminal equipment 1303 is extracted. Here, n denotes a natural number equal to or less than the number NI of transmission antennas used for the transmission of the second terminal equipment, and the superscript H demotes a vector conjugate transpose operator.

$$z_n(k) = WI_n^H y(k) \qquad \text{[Equation 26]}$$

Here, a technique as below is used for the calculation of the weight vector $WI_n$ of reception antenna. The following "Equation 27" is used for calculating the interference signal reception antenna weight vector $WI_n$. Here, $U_k^{(n)}$ is obtained by extracting eigen values among N eigen values obtained by performing an eigen value decomposition on the correlation matrix $R_n$ in a descending order from the k-th eigen value in accordance with the number Nt of transmission antennas used for transmission in the first terminal equipment 1302 and has corresponding eigen vector in its column vector component. Here, k=1, . . . , Nt.

$$WI_n = U_k^{(n)} \qquad \text{[Equation 27]}$$

According to the order of the above-described modified example, the transmission signal from the second terminal 1303 can be received, so that the power of the transmission signal from the first terminal equipment 1302 is minimized.

Embodiment 6

A wireless base station 1401 in Embodiment 6 switches the transmission methods of a terminal equipment by measuring the interference cancellation capability information and informing the interference cancellation capability information to the terminal equipment. Hereinafter, the description for parts common to Embodiment 4 will be omitted, and only the function of switching the transmission methods of terminal equipments will be described.

Figure 24:
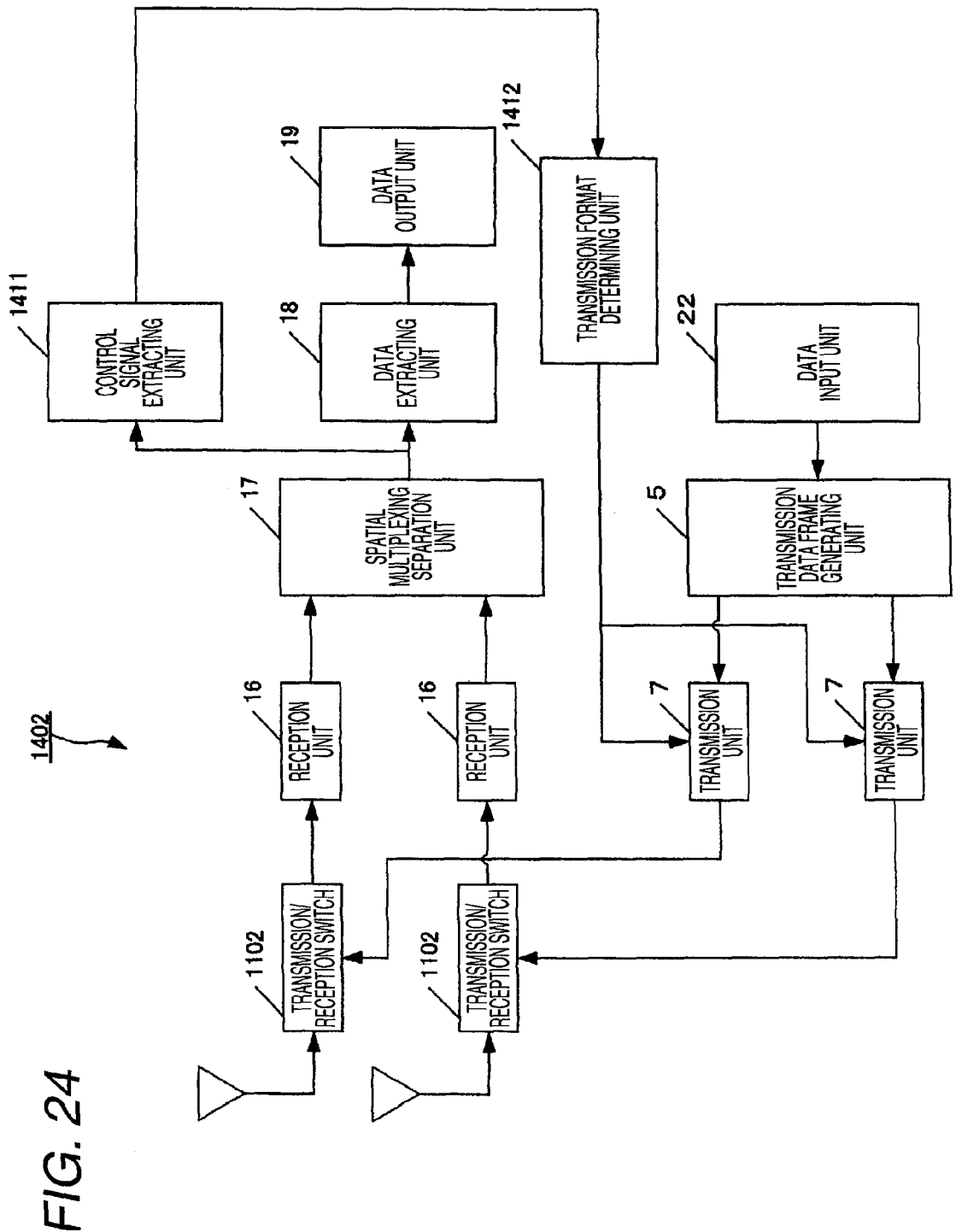
FIG. 24 is a diagram showing a configuration of a terminal equipment 1402 according to Embodiment 6 of the present invention.

The configuration of the wireless base station 1401 in Embodiment 6 is the same as that in Embodiment 4 shown in FIG. 15. FIG. 24 is a diagram showing a configuration of a terminal equipment 1402 in Embodiment 6. In Embodiment 6, the terminal equipment 1402 includes a control signal extracting unit 1411 and a transmission format determining unit 1412.

After receiving a signal from the terminal equipment 1402, the wireless base station 1401 measures the interference cancellation capability information by using a method described in Embodiment 4 described above or the like. The wireless base station 1401 transmits a response signal including the interference cancellation capability information as a response signal for the transmission signal from the terminal equipment 1402. The response signal is formed by generating a data frame included as a part in a signal section as signaling data from the wireless base station on the basis of the interference cancellation capability information data maintaining section 20 by using the transmission data frame generating unit.

The terminal equipment 1402 that has received the wireless signal from the wireless base station 1401 detects the interference cancellation capability information included in the response signal by using the control signal extracting unit 1411. The interference cancellation capability information nic is sent to the transmission format determining unit 1412.

When the interference cancellation capability information nic is larger than "1," the transmission format determining unit 1412 determines that a reception diversity gain is acquired in signal reception of the wireless base station 1401 and thus, sends a direction for lowering the transmission power to the transmission unit 7.

According to Embodiment 6, when the interference cancellation capability information nic of the wireless base station 1401 is large, the terminal equipment 1402 can acquire a reception diversity effect, and thus, the transmission power can be lowered. As a result, the power consumption of the terminal equipment can be reduced.

In Embodiment 6, a configuration in which a reception diversity gain is determined to be acquired in signal reception of the wireless base station 1401 in a case where the interference cancellation capability information nic is larger than "1" and a wireless signal is transmitted with the transmission power lowered is used, but several modified examples may be considered. The configuration of the terminal equipment in the modified examples of Embodiment 6 is shown in FIG. 25. In the modified examples, the output of the transmission format determining unit 1412 is sent to the transmission data frame generating unit 5.

In the first modified example, in the configuration shown in FIG. 25, the transmission format determining unit 1412 determines to increase modulation schemescheme in a case where the interference cancellation capability information nic is larger than "1" and sends a direction for increasing the modulation scheme to the transmission data frame generating unit 5. By the above-described operations, the transmission speed of the wireless base station 1401 can be increased in a case where the interference cancellation capability information is large.

In the second modified example, the transmission format determining unit 1412 sends a direction for increasing the encoding rate to the transmission data frame generating unit 5 in the configuration shown in FIG. 25, in a case where the interference cancellation capability information nic is larger than "1." By the above-described operations, the transmission speed can be increased in a case where the interference cancellation capability information is large.

In the third modified example, the transmission format determining unit 1412 sends a direction for switching the transmission mode that is determined by a modulation method and an encoding rate to a mode with a higher speed to the transmission data frame generating unit 5 in the configuration shown in FIG. 25, in a case where the interference cancellation capability information nic is larger than "1." By the above-described operations, the transmission speed can be increased in a case where the interference cancellation capability information is large.

In the fourth modified example, in the configuration shown in FIG. 25, when the terminal equipment 1402 transmits a signal using an OFDM signal, the transmission format determining unit 1412 sends a direction for shortening the guard interval of the OFDM signal to the transmission data frame generating unit 5 in a case where the interference cancellation capability information nic is larger than "1." When the terminal equipment 1402 transmits a signal using the OFDM signal, the wireless base station 1401 can eliminate a delayed signal having a long delay time in reception of the signal in a case where the interference cancellation capability information nic of the wireless base station 1401 is larger than "1," and accordingly, the terminal equipment 1402 can shorten the guard interval of the OFDM signal. By the above-described operation the decrease in the transmission efficiency due to the insertion of the guard interval of the OFDM signal can be reduced, whereby the transmission speed can be improved.

In the fifth modified example, when the number of the transmission antennas of the terminal equipment 1402 can be increased, the terminal equipment 1402 may send a wireless signal with the number of the transmission antennas increased in a case where the interference cancellation capability information nic of the wireless base station 1401 is larger than "1." By the above-described operation, the number of signals that can be simultaneously transmitted can be increased, whereby the transmission speed can be improved.

In the sixth modified example, when the number of the spatial multiplexing of the terminal equipment 1402 can be increased, the terminal equipment 1402 may send a wireless signal with the number of the spatial multiplexing increased in a case where the interference cancellation capability information nic of the wireless base station 1401 is larger than "1." By the above-described operation, the number of signals that can be simultaneously transmitted can be increased, whereby the transmission speed can be improved.

Embodiment 7

A wireless base station 1501 according to Embodiment 7 measures the interference cancellation capability information and changes a processing method for reception signals on the basis of the interference cancellation capability information. Hereinafter, description for parts common to Embodiments 4 and 7 is omitted, and only the switching function of the processing method for reception signals will be described.

FIG. 26 shows a diagram of the configuration of the wireless base station 1501 according to Embodiment 7. The wireless base station 1501 measures the interference cancellation capability information nic by using a method described in Embodiment 4 or the like in the reception of a spatial multiplexing signal.

The interference cancellation capability information data maintaining unit 20 sends the interference cancellation capability information nic to a spatial multiplexing separation unit 1511. When the interference cancellation capability information nic is larger than "1," that is, when the number of reception antennas of the wireless base station 1501 is more than the number of transmission antennas of the terminal equipment, a reception diversity gain can be acquired, and accordingly, the spatial multiplexing separation unit 1511 changes the separation method for spatial multiplexing signals: which is performed by the spatial multiplexing separation unit 17 to a simple one.

For example, when the spatial multiplexing signal separation is performed by using the MLD technique which has a good reception characteristic and requires much calculation amount, the spatial multiplexing separation unit increases the number of reception antennas and switches to the signal separation method using the MMSE or ZF technique which has a reception characteristic worse than that of the MLD technique and can be performed with calculation amount less than that in the MLD technique. In this case, since there is a reception diversity gain, a reception characteristic sufficient for receiving wireless signals can be acquired even in a case where a signal separation method having a relatively bad reception characteristic is used. In addition, the calculation time required for a reception process can be shortened. In addition, since the simple spatial multiplexing separation method can decrease the scale of a circuit, the decrease in the power consumption is predicted.

On the other hand, when the interference cancellation capability information nic is required to be increased, the spatial multiplexing separation unit 1511 decreases the number of reception antennas and switches to a method that requires complex calculations and has a good reception characteristic. For example, when the wireless base station 1501 having four antennas receives a spatial multiplexing signal transmitted from two transmission antennas by using the MMSE technique using three reception antennas, the interference cancellation capability information nic is "1." Here, when more interference cancellation capability information nic is required for simultaneously receiving a wireless signal from other terminal equipment, the wireless base station 1501 switches the spatial multiplexing signal separation method from the MMSE technique using three reception antennas to the MLD technique using two reception antennas. By performing the above-described operation, the interference cancellation capability information can be set to "2."

According to Embodiment 7, the wireless base station 1501 can change the spatial multiplexing signal separation method on the basis of the interference cancellation capability information nic, whereby access control can be performed with the reception characteristic, the calculation amount, the number of multiple access terminals being considered.

In Embodiment 7, although a configuration in which the spatial multiplexing separation unit 1511 increases the number of reception antennas and switching to a simple spatial multiplexing signal separation method by increasing the number of reception antennas in a case where there is remaining capacity of the interference cancellation capability information nic is used, a configuration in which the reception antennas in use are changed to reception antennas which are not currently in use may be used. By the above-described operation, the spatial multiplexing signal separation can be performed using a reception antenna having a different reception characteristic, whereby there is a possibility that the characteristic of spatial multiplexing signal separation can be improved in as case where the characteristic of spatial multiplexing signal separation is bad.

In Embodiment 7, although a configuration in which the spatial multiplexing separation unit 1511 changes the spatial multiplexing signal separation method on the basis of the interference cancellation capability information nic is used, the spatial multiplexing signal separation method may be changed with the priority of data included in a reception signal, importance, Qos level being considered. By the above-described operation, for example, a control operation in which the number of reception antennas is increased to improve the reception characteristic in a case where high importance data is received and the number of the reception antennas is decrease to keep remaining capability in the interference cancellation capability information nic can be performed.

While the present invention has been described in detail with reference to specific embodiments thereof, it is apparent to those skilled in the art that various changes or modifications may be made therein.

This application is based on Japanese Patent Application (Japanese Patent Application 2005-018083) filed on Jan. 26, 2005 and Japanese Patent Application (Japanese Patent Application 2006-010170) filed on Jan. 18, 2006, and the contents of which are incorporated herein by reference.

INDUSTRIAL APPLICABILITY

A wireless base station and a terminal equipment according to an embodiment of the invention can select a terminal equipment to be connected using spatial multiplexing on the basis of interference cancellation capability information data indicating the interference cancellation capability of a terminal equipment signaled from the terminal equipment and can perform appropriate repeat control for the spatial multiplexing. Accordingly, since the simplification of the wireless base station and the reduction of the processing delay can be achieved and the improvement of the system capacity can be achieved, the wireless base station and the terminal equipment are useful in a wireless communication field using spatial multiplexing transmission.

The invention claimed is:

1. A terminal equipment which performs communication with a wireless base station controlling other terminal equipments for spatial multiplexing connection by using interference cancellation capability information included in reception signals from the other terminal equipments, the terminal equipment comprising:
   an interference cancellation capability information data maintaining unit which maintains interference cancellation capability information data indicating capabilities for cancelling, by the terminal equipment, interference suffered by the terminal equipment due to communication from the base station device to other terminal equipments;
   a transmission unit which transmits the interference cancellation capability information data of the terminal equipment to the wireless base station device;
   a reception unit which receives a transmission signal that was transmitted from the wireless base station by a spatial multiplexing connection to the terminal equipment and the other terminal equipments that were selected by the wireless station based on the interference cancellation capability information data;
   wherein the interference cancellation capability information data is the number of interference signals which can be cancelled by the terminal equipment, and is indicated by a degree of antenna, and the degree of freedom of antenna is determined based on a quantity of antennas included by the terminal equipment; and
   wherein the selected other terminal equipments have higher degree of freedom of antenna than that of the terminal equipment.

2. The terminal equipment according to claim 1, wherein the other terminal equipments are terminals selected from a terminal equipment group that is grouped based on the interference cancellation capability information data.

3. The terminal equipment according to claim 1, the selected other terminal equipments and the terminal equipment are respectively assigned with different numbers of spatial streams.

* * * * *